(12) United States Patent
Kakutani

(10) Patent No.: US 7,436,547 B2
(45) Date of Patent: Oct. 14, 2008

(54) IMAGE PROCESSING SYSTEM, IMAGE PROCESSING DEVICE, IMAGE OUTPUTTING DEVICE AND METHOD FOR SAME

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 576 days.

(21) Appl. No.: 11/102,578

(22) Filed: Apr. 8, 2005

(65) Prior Publication Data

US 2006/0181737 A1 Aug. 17, 2006

(30) Foreign Application Priority Data

Apr. 12, 2004 (JP) ............................. 2004-116793

(51) Int. Cl.
- G06F 15/00 (2006.01)
- G06K 1/00 (2006.01)
- H04N 1/60 (2006.01)
- B41C 1/02 (2006.01)

(52) U.S. Cl. .......................... 358/1.9; 358/1.2; 358/3.03

(58) Field of Classification Search ................. 358/1.9, 358/1.13, 1.14, 1.18, 3.03, 536, 1.2
See application file for complete search history.

(56) References Cited

U.S. PATENT DOCUMENTS

| | | | | |
|---|---|---|---|---|
| 7,164,502 B2 * | 1/2007 | Nose et al. | .................. | 358/3.03 |
| 7,268,919 B2 | 9/2007 | Katsuyama | | |
| 7,362,473 B2 * | 4/2008 | Kakutani | ................... | 358/3.04 |
| 2007/0279454 A1 * | 12/2007 | Sato et al. | | |

FOREIGN PATENT DOCUMENTS

| | | |
|---|---|---|
| JP | 2002-185789 | 6/2002 |
| JP | 2003-0698119 | 3/2003 |
| JP | 2003-219168 | 7/2003 |

OTHER PUBLICATIONS

Abstract of Japanese Patent Publication No. 2002-185789, Pub. Date: Jun. 28, 2002, Patent Abstracts of Japan.
Abstract of Japanese Patent Publication No. 2003-069819, Pub. Date: Mar. 7, 2003, Patent Abstracts of Japan.
Abstract of Japanese Patent Publication No. 2003-219168, Pub. Date: Jul. 31, 2003, Patent Abstracts of Japan.

* cited by examiner

*Primary Examiner*—Douglas Q Tran
(74) *Attorney, Agent, or Firm*—Martine Penilla & Gencarella, LLP

(57) ABSTRACT

A computer serving as an image processing device produces pixel groups by assembling a plurality of adjacent pixels among the plurality of pixels forming the image data, and determines the pixel group tone value for each pixel group. Number data corresponding to the pixel tone values of the pixel groups is then obtained based on a predetermined correspondence. At that time, tone errors occurring during the conversion of the pixel group tone value to number data are diffused to the surrounding pixel groups so as to be reflected in the calculation of the pixel group tone values. The computer outputs the resulting number data to a printer. The printer, which serves as an image generating device, determines the position of the pixels by which the dots are formed in the pixel groups based on the number data that has been obtained, and drives a printing head to form dots in those positions. The number data allows smaller amounts of data to be handled more rapidly, and the number data can be produced rapidly by referencing a producing table. The picture quality can be improved by the diffusion of errors. High quality images can thus be rapidly output by a simple process.

25 Claims, 35 Drawing Sheets

Fig.8a

| 97 | 97 | 98 | 98 | 98 | 98 | 98 | 98 |
|----|----|----|----|----|----|----|----|
| 97 | 97 | 97 | 97 | 97 | 97 | 98 | 98 |
| 97 | 97 | 97 | 97 | 97 | 97 | 97 | 97 |
| 96 | 96 | 97 | 97 | 97 | 97 | 97 | 97 |

Fig.8b

| 1 | 177 | 58 | 170 | 70 | 186 | 79 | 161 |
|---|-----|----|----|----|-----|----|-----|
| 255 | 109 | 212 | 42 | 242 | 5 | 223 | 48 |
| 123 | 33 | 127 | 181 | 83 | 155 | 105 | 140 |
| 219 | 91 | 237 | 22 | 121 | 198 | 61 | 188 |

| 3 | 4 |
|---|---|
| 3 | 2 |

Fig.9a
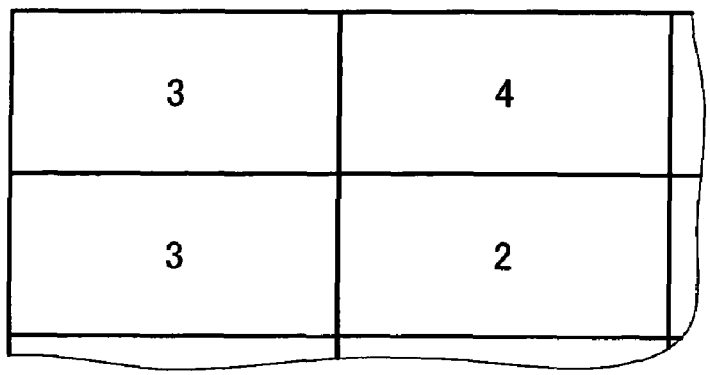
Fig.9b
| 1 | 177 | 58 | 170 | 70 | 186 | 79 | 161 |
|---|---|---|---|---|---|---|---|
| 255 | 109 | 212 | 42 | 242 | 5 | 223 | 48 |
| 123 | 33 | 127 | 181 | 83 | 155 | 105 | 140 |
| 219 | 91 | 237 | 22 | 121 | 198 | 61 | 188 |
Fig.9c
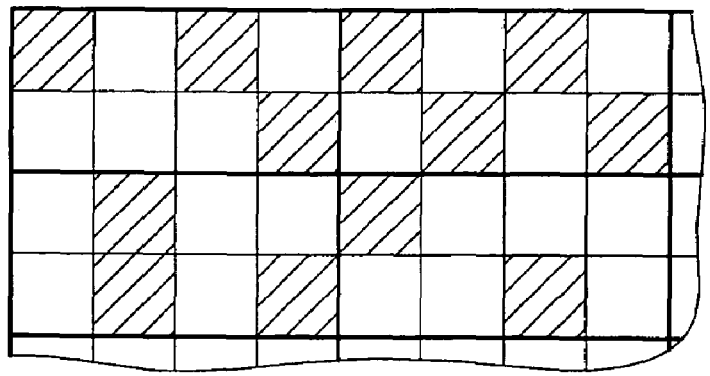
Fig.9d
| 1 | 6 | 3 | 5 | 3 | 6 | 4 | 5 |
|---|---|---|---|---|---|---|---|
| 8 | 4 | 7 | 2 | 8 | 1 | 7 | 2 |
| 4 | 2 | 5 | 6 | 2 | 6 | 3 | 5 |
| 7 | 3 | 8 | 1 | 4 | 8 | 1 | 7 |

Fig.11

$$DTrp = \frac{\sum_{i=1}^{n} DTpx(i)}{n} + ERdf$$

Fig.13a
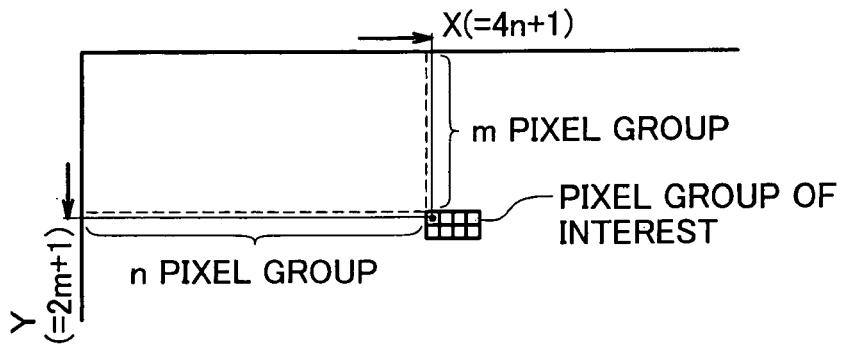
Fig.13b
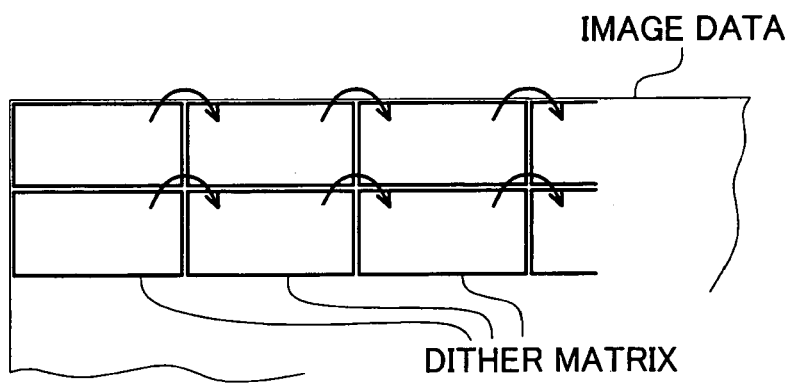
Fig.13c
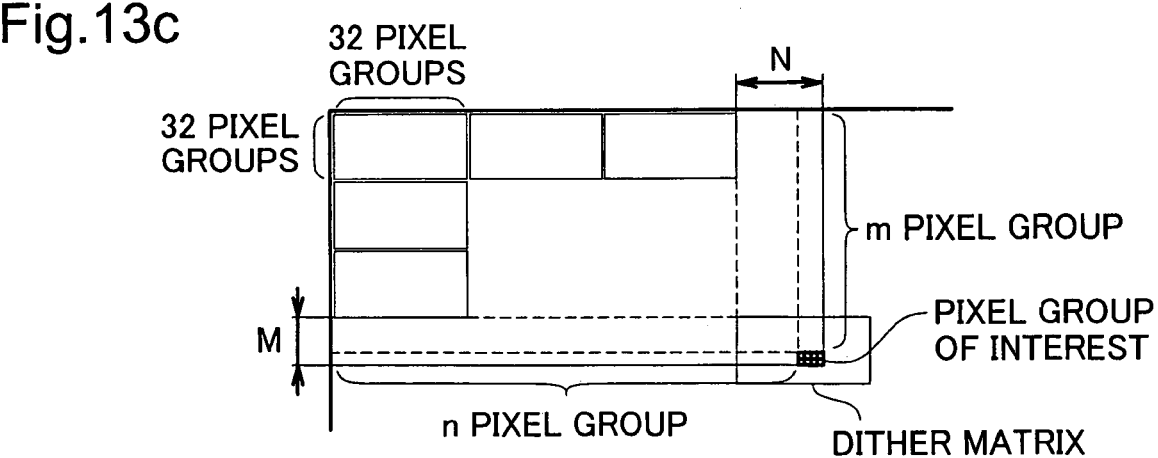
Fig.13d
$$\begin{cases} N = n - \text{int}(n/32) \times 32 + 1 \\ M = m - \text{int}(m/32) \times 32 + 1 \end{cases}$$

Fig.14

(a) X : [1][2][3][4][5][6][7][8][9][10]
  ⟩ SHIFT 2 BITS TO RIGHT
(b) n : [0][0][1][2][3][4][5][6][7][8]
  ⟩ SHIFT 5 BITS TO RIGHT
(c) int (n/32) : [0][0][0][0][0][0][0][1][2][3]
  ⟩ SHIFT 5 BITS TO LEFT
(d) int (n/32) × 32 : [0][0][1][2][3][0][0][0][0][0]

(e) n − int (n/32) × 32 : [0][0][0][0][0][4][5][6][7][8]

(f) MASK DATA : [0][0][0][0][0][1][1][1][1][1]

(g) MASK DATA : [0][0][0][1][1][1][1][1][0][0]

TO 1024th

Fig.16a BLOCK 1
| 1 | 177 | 58 | 170 |
|---|-----|----|-----|
| 255 | 109 | 212 | 42 |
Fig.16b PIXEL GROUP TONE VALUE: 0
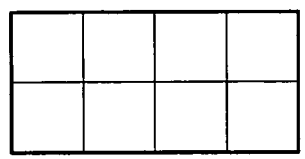
NUMBER DATA: 0
Fig.16c PIXEL GROUP TONE VALUE: 1
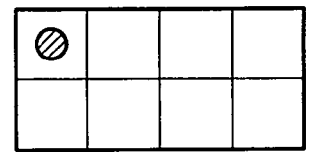
NUMBER DATA: 1
Fig.16d PIXEL GROUP TONE VALUE: 2
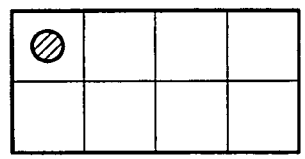
NUMBER DATA: 1
Fig.16e PIXEL GROUP TONE VALUE: 100
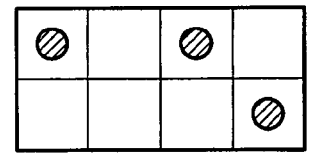
NUMBER DATA: 3
Fig.16f PIXEL GROUP TONE VALUE: 200
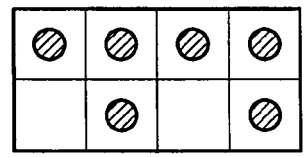
NUMBER DATA: 6
Fig.16g PIXEL GROUP TONE VALUE: 255
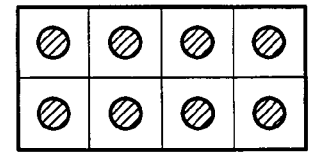
NUMBER DATA: 8

Fig.26

| (LARGE, MEDIUM, SMALL) =(1,2,1) | (0,4,0) | (0,3,1) |
|---|---|---|
| (0,3,0) | (0,2,1) | (1,1,0) |
| (0,2,3) | (1,2,1) | (0,3,0) |

Fig.27

| NUMBER OF DOTS | | | ENCODED NUMBER DATA |
|---|---|---|---|
| LARGE | MEDIUM | SMALL | |
| 0 | 0 | 0 | 0 |
| 0 | 0 | 1 | 1 |
| 0 | 0 | 2 | 2 |
| 0 | 0 | 3 | 3 |
| 6 | 2 | 0 | 160 |
| 7 | 0 | 0 | 161 |
| 7 | 0 | 1 | 162 |
| 7 | 1 | 0 | 163 |
| 8 | 0 | 0 | 164 |

Fig.29

| CLASSIFICATION CODES | PIXEL GROUP TONE VALUE DTrp/TONE ERROR ER | | | | | | | 253 | 254 | 255 |
|---|---|---|---|---|---|---|---|---|---|---|
| | 0 | 1 | 2 | 3 | 4 | 5 | ····· | | | |
| 1 | 0/0 | 1/-11 | 1/-10 | 2/-21 | 2/-20 | 2/-19 | | 163/11 | 163/12 | 164/-20 |
| 2 | 0/0 | 0/1 | 0/2 | 0/3 | 1/-8 | 1/-7 | | 163/22 | 164/-10 | 164/-9 |
| 3 | 0/0 | 0/1 | 1/-10 | 1/-9 | 1/-8 | | | 163/10 | 164/-21 | 164/-20 |
| 4 | 0/0 | 0/1 | 1/-10 | 1/-9 | | | | | 163/12 | 164/-20 |
| 5 | 0/0 | 0/1 | 0/2 | 1/ | | | | | 164/-4 | 164/-3 |
| 6 | 0/0 | 1/-10 | 1/-9 | | | | | | 163/9 | 164/-23 |
| 7 | 0/0 | 0/1 | | | | | | | | |
| 8 | 0/0 | | | | | | | | | |
| 9 | 0/0 | | | | | | | | | |
| 10 | | | | | | | | | | |

| ENCODED NUMBER DATA | NUMBER OF DOTS | | |
|---|---|---|---|
| | LARGE | MEDIUM | SMALL |
| 0 | 0 | 0 | 0 |
| 1 | 0 | 0 | 1 |
| 2 | 0 | 0 | 2 |
| 3 | 0 | 0 | 3 |
| 160 | 6 | 2 | 0 |
| 161 | 7 | 0 | 0 |
| 162 | 7 | 0 | 1 |
| 163 | 7 | 1 | 0 |
| 164 | 8 | 0 | 0 |

Fig.33

| ENCODED NUMBER DATA | NUMBER OF DOTS | | |
|---|---|---|---|
| | LARGE | LARGE + MEDIUM | LARGE + MEDIUM + SMALL |
| 0 | 0 | 0 | 0 |
| 1 | 0 | 0 | 1 |
| 2 | 0 | 0 | 2 |
| 3 | 0 | 0 | 3 |
| 160 | 6 | 8 | 8 |
| 161 | 7 | 7 | 7 |
| 162 | 7 | 7 | 8 |
| 163 | 7 | 8 | 8 |
| 164 | 8 | 8 | 8 |

IMAGE PROCESSING SYSTEM, IMAGE PROCESSING DEVICE, IMAGE OUTPUTTING DEVICE AND METHOD FOR SAME

CLAIM OF PRIORITY

The present application claims priority from Japanese Application P2004-116793A filed on Apr. 12, 2004, the content of which is hereby incorporated by reference into this application.

BACKGROUND

The invention relates to a technique for outputting images based on image data, and in particular to a technique for outputting images by implementing a certain image process on image data to form dots at the appropriate density.

Image output devices for outputting images by the formation of dots on various types of output media such as printing media and liquid crystal screens are widely used as output devices in various types of image machines. In these image output devices, the images are handled while subdivided into small areas referred to as pixels, the dots being formed by the pixels. When the dots are formed with the pixels, it naturally cannot be made out whether or not dots have been formed by looking at the pixels one by one. However, when viewed in an area of a certain width, the crude density can be made out by the density of the dots that are formed, and the dot formation density can be varied to output images multiple tones. When, for example, black ink dots are formed on printing paper, areas where the dots are densely formed look black, whereas areas where the dots are sparsely formed look white. When bright spot dots are formed on liquid crystal screens, areas where the spots are densely formed look brighter, and areas where they are sparsely formed look dark. Images with multiple tones can thus be formed by suitably controlling the density with which dots are formed. Data for control the formation of dots so as to obtain suitable formation density are thus produced by implementing a certain image process on the image intended for output.

Recently there has been increasing demand for image output devices which output images of higher quality and greater size. Dividing images into finer pixels is an effective way to address the demand for higher image quality. Making pixels smaller allows the picture quality to be improved because the dots formed by the pixels do not stand out. The demand for larger images is addressed by increasing the number of pixels. The output image can be enlarged by enlarging the individual pixels, but as that would lead to lower picture quality, increasing the number of pixels is a more effective way to address demand for greater size.

Of course, when the number of pixels forming the image is increased, image processes take a longer time, making it difficult to output images rapidly. Techniques allowing image processes to be implemented more rapidly have thus been proposed (such as Japanese Unexamined Patent Application (Kokai) 2002-185789).

However, even though image processes can be implemented more rapidly, the transmission of image data or the transmission of processed image data takes more time, naturally limiting the ability to speed up image output.

Recently there has also been demand for directly outputting images by directly supplying data of images taken by digital cameras or the like to image output devices such as printing devices. In such cases, the image process cannot be carried out using an image processing device equipped with a high processing capacity such as what are referred to as personal computers. There is thus a need for a simple image process which could be handled by an image output device and/or image photographic device such as a digital camera.

SUMMARY

In order to address the above problems, an object of the invention is to provide a simple image processing technique which is capable of rapidly implementing an image process and data transmission while preserving satisfactory output picture quality, and which is capable of doing so without the use of a machine having a high processing capacity such as a personal computer for the image process.

The first aspect of the image processing system comprises an image processing device for implementing a certain image process on image data, and an image generating device for outputting images by forming dots based on the results of the image process.

The image processing device comprises:
pixel group tone value determining unit that determines pixel group tone values representing individual pixel groups, each of pixel groups is composed of a plurality of mutually adjacent pixels;
number data producing unit that produces number data for each of pixel groups based on a predetermined correspondence between the pixel group tone value and the number data representing the number of dots formed in the pixel group;
error diffusing unit that diffuses a tone error, which occurs between the pixel group tone value and the tone value represented by the number data, among pixel groups for which number data has been not produced yet; and
control data output unit that outputs the produced number data as a control data which is used to control the formation of dots by the image generating device which forms images.

The image generating device, on the other hand, comprises:
pixel position determining unit that specifies an order in which dots are formed for each of pixels in the pixel groups, and determines dot position formed in each of the pixel groups based in the specified order and the number data of the pixel groups extracted from the control data that has been provided; and
dot forming unit that forms dots based on the determined pixel positions.

The present invention can also be grasped as an image outputting method corresponding to the above image processing system.

In the image processing system and image outputting method of the present invention, pixel groups are constructed by assembling a plurality of pixels, and number data representing the number of dots formed in the pixel groups is produced and provided to the image generating device. Here, a pixel group may always be those assembled with the same number of pixels, but they may also be different numbers of pixels assembled according to a certain pattern or a certain principle, for example. The expression "represents the number of dots" may be anything allowing the number of dots formed in a pixel group to be specified, and need not directly represent the number of dots. The dot forming order is then specified for the pixel group, and the position of the pixels by which the dots are formed in the pixel groups is then determined based on the number data of the pixel groups and the order specified for the pixel group. The dot forming order of pixel group may be determined by pre-recording a suitable order and reading in the order. Different orders may also be recorded for each pixel group. Images are thus output by forming dots according to the pixel positions which have been determined on the basis of the number data and order. For example, dots can be formed on media such as printing media or liquid crystal screens to allow images to be output on such media.

Although described in greater detail below, data representing the number of dots in each pixel group can be in the form of far less data than data representing the dot on-off state on a per-pixel basis. When number data is thus provided to the image generating device, the data can be provided more rapidly, and the images can be output more rapidly.

When the number data is produced, the number data is produced for each pixel group based on the correspondence between the pixel group tone values and the number data representing the number of dots formed in the pixel groups. As will be described in greater detail below, because the pixel group tone values of the pixel groups is extremely easy to determine, when the number data is produced based on such a correspondence, the number data for the pixel groups can be rapidly produced.

Because the tone error produced in the pixel groups when the number data is produced is diffused to pixel groups for which number data has been not produced yet, the tone error produced in the pixel groups can be readily eliminated, allowing the picture quality to be improved all the more.

The image processing device and image generating device in the image processing system can also be integrated to form an image output device combining the image processing function and image output function. The aspect of the invention can thus be grasped as an image outputing device of the following type. That is, the image outputing device of the present invention is for forming dots according to image data so as to output images corresponding to the image data, comprising:

pixel group tone value determining unit that determines pixel group tone values representing individual pixel groups, each of pixel groups is composed of a plurality of mutually adjacent pixels;

number data producing unit that produces number data for each of pixel groups based on a predetermined correspondence between the pixel group tone value and the number data representing the number of dots formed in the pixel group;

error diffusing unit that diffuses a tone error, which occurs between the pixel group tone value and the tone value represented by the number data, among pixel groups for which number data has been not produced yet;

pixel position determining unit that specifies an order in which dots are formed for each of pixels in the pixel groups, and determines dot position formed in each of the pixel groups based in the specified order and the number data of the pixel groups; and dot forming unit that forms dots based on the determined pixel positions.

In this type of image outputing device as well, pixel group number data can be produced instead of data representing the dot on-off state on a per-pixel basis, allowing less data to be handled more rapidly. Because the number data can also be produced rapidly by a simple process, the image process can be carried out more rapidly. Tone error occurring in pixel groups can also be diffused, allowing the errors to be rapidly eliminated. High quality images can thus be output more rapidly.

In the image processing system, image outputing method, and image outputing device of the present application, the number data representing the number of dots formed in the pixel groups and the combination of classification codes given to the pixel groups and pixel group tone values may correspond to a number data producing table, and the table may be referenced to produce the number data for the pixel groups.

The appropriate number data can be simply produced when the number data is produced by referencing the number data producing table based on the classification codes and the pixel group tone values. In cases where the classification codes have been pre-assigned to the pixel groups, and even in cases where the classification codes must be determined, they can be readily defined in the following manner, making the process of producing the number data an extremely simple process. Number data can thus be produced rapidly, and images can be output more rapidly.

Although described in greater detail below, the process for producing number data from the pixel group tone values can be considered a type of process for producing multiple values. However, the number data is determined by the combination of pixel group classification codes and pixel group tone values, where different number data will be produced for the same pixel group tone values when the pixel group classification codes are different. It will thus be possible to always obtain consistent picture quality, without any danger of multiple values being repeated in a constant pattern as happens in general multiple value processes.

The pixel group tone values for each pixel group may also be determined based on image data for each pixel in the pixel groups. For example, the mean value of the image data of the pixels may be calculated, and the resulting mean value may be used as the pixel group tone value, or the image data given to the most pixels in the pixel group may be used as the pixel group tone value, or the image data of pixels in certain positions in the pixel groups may be used as the pixel group tone value. The pixel group tone value can thus be appropriately determined when based on image data for the pixels in the pixel groups.

The pixel group tone value may also be determined based on the number data of pixels in the pixel groups and the tone error diffused among the pixel groups. When the pixel group tone value is determined in this manner, the picture quality can be improved even more because the tone error occurring in other pixel groups can be rapidly eliminated when taking the tone error into consideration.

In order to address at least some of the above problems in the prior art, the image processing device of the present invention can take the following form. That is, the gist is an image processing device for adding a certain image process to image data representing an image to produce control data that is used to control the formation of dots by an image outputing device for forming dots to output images, comprising:

pixel group tone determining unit that assembles certain numbers of mutually adjacent pixels which are handled as pixel groups for a plurality of pixels forming the image, and determining the tone value representing individual pixel group for each of pixel groups;

number data producing unit that produces number data for each of pixel groups based on a predetermined correspondence between the pixel group tone value and the number data representing the number of dots formed in the pixel group;

error diffusing unit that diffuses a tone error, which occurs between the pixel group tone value and the tone value represented by the number data, among pixel groups for which number data has been not produced yet; and control data output unit that outputs the produced number data as a control data which is used to control the formation of dots by the image generating device which forms images.

The present invention can be grasped as an image processing method corresponding to the above image processing device.

In the image processing device and image processing method of the present invention, a plurality of pixels is assembled into a pixel group, number data representing the number of dots formed in the pixel group is produced, and control data including the number data obtained for each pixel group is output.

As will be described below, data representing the number of dots in each pixel group can be in the form of far less data than data representing the dot on-off state on a per-pixel basis, allowing control to be output more rapidly.

In this image processing device and image processing method, the number data is produced based on the correspondence between the pixel group tone value and number data. The number data can thus be rapidly produced, and the control data can then be rapidly output.

In addition, the tone error that occurs when the number data is produced is diffused among pixel groups for which no number data has been produced. The resulting tone error can therefore be rapidly eliminated, allowing the picture quality to be improved that much more.

The number data may also be produced in the following manner in the image processing device and image processing method. That is, a number data producing table in which the number data is allotted to combinations of pixel group classification codes and pixel group tone values may be pre-recorded, and the table may be referenced to produce the number data.

Because this allows suitable number data to be easily produced, the control data can be appropriately and rapidly output. Because the number data is determined by the combination of pixel group classification codes and pixel group tone values, different number data will be produced for the same pixel group tone values when the pixel group classification codes are different. It will thus be possible to always obtain consistent picture quality, without any danger of multiple values being repeated in a constant pattern as happens in general multiple value processes.

The pixel group tone values for each pixel group may of course also be determined on the basis of the image data for each pixel in the pixel groups in the same manner as the image processing system, image outputting device, and image outputting method of the present application. This will allow the pixel group tone values to be appropriately determined.

The pixel group tone value may also be determined on the basis of the image data for each pixel in the pixel groups and on the tone error diffused among the pixel groups. When the pixel group tone value is determined in this way, the picture quality can be improved even more because the tone error occurring in other pixel groups can be rapidly eliminated when taking the tone error into consideration.

In this image processing device and image processing method, the pixel group classification codes may be assigned in the following manner. That is, the pixel groups may be classified into a number of categories according to the position in the image, and classification codes may be assigned according to the results.

In this way, not only is there no need to pre-assign classification codes to the pixel groups, but classification codes can be appropriately assigned according to position in the image.

The tone error for each pixel group may also be determined by calculating the tone difference between tone values represented by the number data and the pixel group tone values.

Tone errors occurring in pixel groups can be calculated by calculating the tone difference between the tone values represented by the number data and the pixel group tone values. Here, the tone values represented by the number data can be calculated from the number data based on the tone values represented by the formation of a dot. Alternatively, tone values that have already been calculated may be matched to the number data and recorded. Since there is no need to match the tone values to the number data and record them when the tone values represented by the number data are calculated, it is possible to economize on recording volume. On the other hand, in cases where the tone values represented by the number data are pre-recorded, the recorded tone values can be read out to directly calculate the tone difference from the pixel group tone value, allowing tone error to be determined more rapidly.

By contrast, tone errors in the pixel groups may be obtained by referencing a tone error producing table in the following manner instead of being calculated based on the pixel group tone value and the tone values represented by number data. That is, tone errors occurring in the pixel groups may be allotted to combinations of pixel group classification numbers and pixel group tone values, and recorded in a tone error producing table. The tone error may thus be obtained by referencing the table based on the pixel group classification codes and pixel group tone value.

As noted above, the number data is allotted to combinations of pixel group classification codes and pixel group tone values by unit of the number data producing table. When the number data is determined, the tone values represented by the number data will also be determined on their own. Here, because the tone error is obtained by calculating the tone difference between the pixel group tone value and the tone value represented by the number data, when the classification codes and pixel group tone value are determined, tone errors also end up being determined as a result of the production of number data. Because of this, the tone error can be allotted to combinations of pixel group classification codes and pixel group tone values, which can be recorded in a tone error producing table. This is desirable, as the tone error can be rapidly determined by referencing the tone error producing table.

Here, a table in which the tone error produced in the pixel groups is allotted to combinations of pixel group classification codes and pixel group tone values can be recorded as a table integrated with the number data producing table, allowing the tone error to be obtained at the same time that the number data is obtained by referencing the number data producing table.

The number data can thus be produced in more rapidly because the table is referenced a fewer number of times when the number data and tone error are obtained at the same time.

In the image processing device described above, data representing combinations of numbers of dots for a plurality of types of dots with differing tone values that are expressed may be produced as the number data representing the number of dots formed in the pixel groups. Here, the plurality of types of dots with differing tone values that are expressed can be, for example, a plurality of types of dots of differing dot sizes, or a plurality of types of dots with differing dot densities. Furthermore, when a pseudo-dot is formed by forming fine dots at a certain density, a plurality of types of dots with different fine dot densities can be produced.

When number data is produced by referencing the number data producing table, even though the number data indicates the combination of numbers of dots for a plurality of types of dots, the number data is as easy to produce as data that merely represents the number of dots. Ordinarily, when the dot on-off state is determined on a per-pixel basis, a greater variety of dots tends to make the process of determination more complicated, so referencing the table to produce number data allows the data to be produced relatively rapidly the more types of dots there are.

When number data is output as the control data to the image outputting device, it may be provided in coded form according to the combination of dot numbers for various types of dots. The data can be encoded after the number data has been produced, but number data can also be produced while encoded from the very beginning.

When number data corresponding to a combination of dot number of various types of dots is provided as the control data, the number data can be encoded to reduce the amount of data, which is desirable for making it possible to provide the control data more rapidly.

In the image processing device described above, rounded off error produced when the pixel group tone value is determined from image data may be obtained, and the resulting rounded off error may be diffused among the surrounding pixel groups.

Rounded off error is produced in the pixel groups when the pixel group tone values are calculated from the image data of the pixels in the pixel groups. In the same manner as the tone error, the rounded off error can be diffused to surrounding pixel groups, and the rounded off error can be eliminated at the same time as the tone error when taken into consideration during the calculation of the surrounding pixel group tone values. Particularly in cases where high-resolution image data is input and the resolution of the pixel group tone value is insufficient, rounded off error occurring during the calculation of the pixel group tone value can be diffused to compensate for the insufficient resolution, allowing images of high picture quality to be obtained.

The present invention can also be realized using a computer by having the computer read a program for executing the above image outputting method or image processing method. As such, the present invention includes embodiments in the form of the following programs or recording media on which such programs have been recorded.

The computer reads any of such programs, which may be recorded in the recording media, to attain the various functions described above. This ensures high-speed image output even when an object image has a large number of pixels.

BRIEF DESCRIPTION OF THE DRAWINGS

FIGS. 8a through 8d illustrate the way in which dithering is used to convert image data to data representing the dot on-off state.

FIGS. 9a through 9d illustrate the way in which data representing the dot on-off state is produced from the number data.

FIG. 11 illustrates an example of a method for calculating the pixel group tone value.

FIGS. 13a through 13d illustrate a way to determine classification codes for the pixel groups.

FIG. 14 illustrates a specific method for determining target pixel group classification codes.

FIGS. 16a through 16g schematically illustrate the way in which appropriate number data is determined according to the combination of pixel group classification codes and pixel group tone values.

FIG. 26 schematically illustrates the way in which the numbers of large, medium, and small dots formed in each pixel group are obtained.

FIG. 27 illustrates a correspondence table in which code data is allotted to combinations of numbers of large, medium, and small dots formed in pixel groups.

FIG. 29 schematically illustrates a number data producing table which is referenced in the process for producing number data in the second embodiment.

FIG. 31 schematically illustrates a decoding table which is referenced to decode number data that has been encoded during the process for determining pixel position in the second embodiment.

FIG. 33 schematically illustrates a decoding table which is referenced to decode encoded number data.

DESCRIPTION OF THE PREFERRED EMBODIMENTS

Embodiments of the invention will be illustrated in the following order in order to more clearly describe the action and the effects of the present invention.
A. Outline of Embodiments
B. First Embodiment
   B-1. Device Structure
   B-2. Outline of Image Printing Process of First Embodiment
   B-3. Principles Allowing Pixel Position to be Determined from Number Data
   B-4. Process for Producing Number Data in First Embodiment
      B-4-1. Method for Determining Classification Codes
      B-4-2. Number Data Producing Table
      B-4-3. Method for Diffusing Tone Error
   B-5. Process for Determining Pixel Position in the First Embodiment
   B-6. Variants
      B-6-1. First Variant
      B-6-2. Second Variant
C. Second Embodiment
   C-1. Image Printing Process of Second Embodiment
   C-2. Process for Producing Number Data in Second Embodiment
      C-2-1. Process Using Dithering Method to Determine Number of Large, Medium, and Small Dots Formed
      C-2-2. Process for Encoding Number of Large, Medium, and Small Dots Formed
      C-2-3. Process for Producing Number Data in Second Embodiment Using Conversion Table
   C-3. Process for Determining Pixel Position in Second Embodiment

A. Outline of Embodiments

Figure 1:
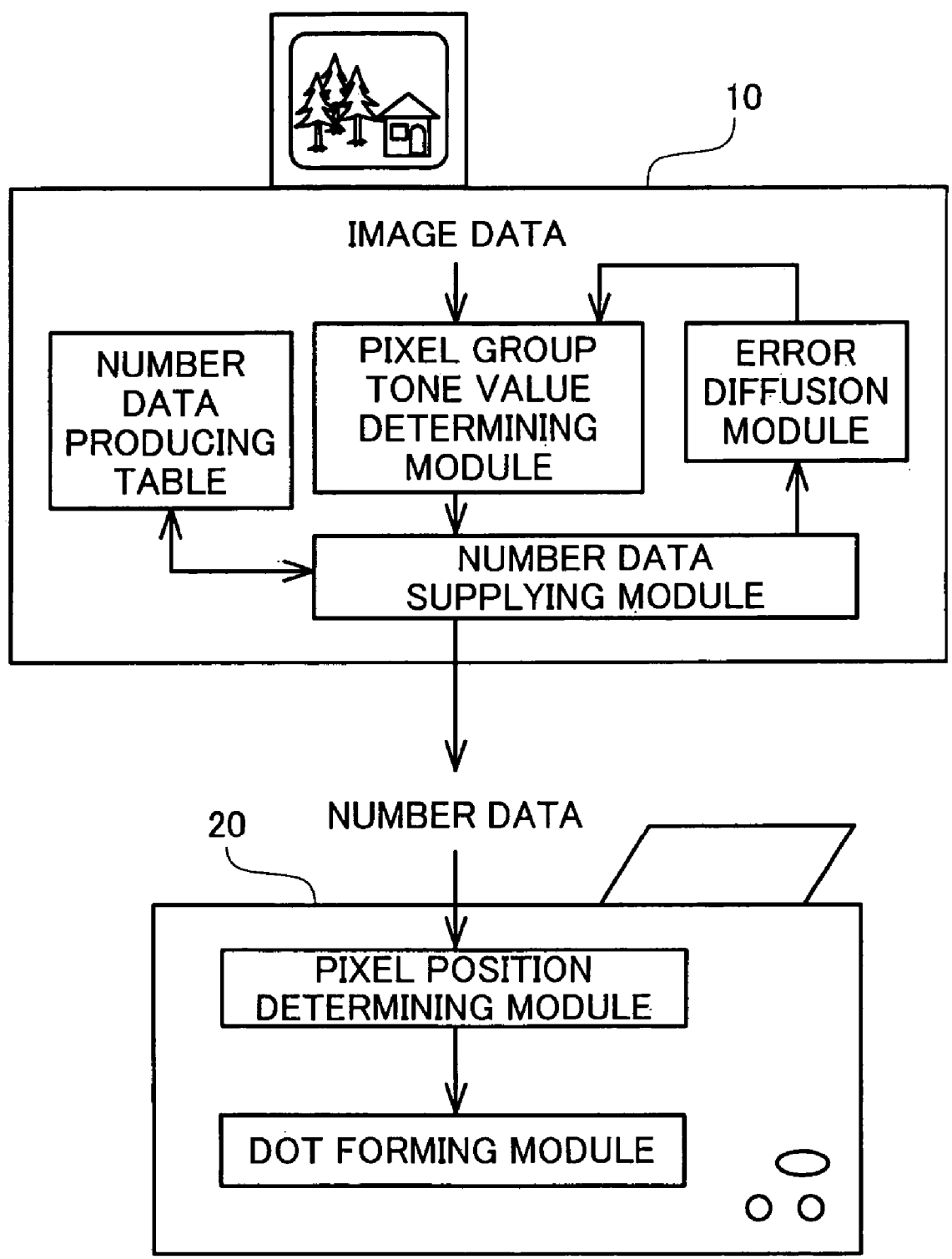
FIG. 1 schematically illustrates a printing system to explain the general outline of the invention.

An overview of the various embodiments will be given with reference to FIG. 1 before a more detailed description of the embodiment. FIG. 1 illustrates an overview of the embodiments. The illustrated printing system comprises a computer 10 serving as the image processing device, and a printer 20 or the like serving as the image outputting device. When a certain program is loaded and run by the computer 10, the computer 10 and printer 20 etc. as a whole function as an integrated image processing system. The printer 20 prints images by forming dots on printing media. The computer 10 carries out a certain image process on the image data of an image that is to be printed, so as to produce data allowing the printer 20 to control the formation of dots by pixels, and supplies the data to the printer 20.

Images are printed in the following manner by common printing systems. First, a certain image process is carried out by computer to convert the image data to data representing the dot on-off state on a per-pixel basis. The resulting data is then provided to the printer, and the printer prints images by forming dots according to the data that has been provided. Here, when the image that is to be printed has a large number of pixels, there is a corresponding increase in the time needed for the image process, making it difficult to print images rapidly. Because the quantity of data representing the dot on-off state on a per-pixel basis increases as the number of pixels increases, more time is needed to output the data from the computer to the printer, prolonging that much more the time needed for printing.

In that respect, images are printed in the following manner by the printing system illustrated in FIG. 1. First, the computer 10 produces pixel groups by assembling a plurality of adjacent pixels that form the image. For each pixel group, number data representing the number of dots formed in the pixel group is produced and sent to the printer 20. When the number data for each pixel group is received, the pixel position determining module of the printer 20 specifies for each pixel in the pixel groups the order in which dots are formed, and determines the pixel positions where dots are formed based on the number data and the hierarchy. At that time, the pixel positions can be rapidly determined if an order of the pixels forming a dots has been pre-recorded. Images are printed when the dot forming module forms dots at the pixel positions determined in this manner.

Here, the number data for each pixel group can be in the form of far less data than data representing the dot on-off state on a per-pixel basis. When the number data for each pixel is thus provided instead of data representing the dot on-off state on a per pixel basis from the computer 10 to the printer 20, the data can be transmitted far more rapidly.

The number data for the pixel groups is also produced in the following manner in the computer 10. First, the pixel group tone values are determined for a plurality of pixel groups produced from the image by the pixel group tone value determining module. The pixel group tone value is the tone value representing the pixel group, and can be determined based on the image data of each pixel contained in the pixel group. The number data for each pixel group is determined based on the correspondence between the pixel group tone value and the number data by the number data supplying module, and the resulting number data is then supplied to the printer 20. The tone error occurring in the pixel groups when the number data is determined is diffused by the error diffusing module to unprocessed pixel groups for which no number data has been determined. The pixel group tone value determining module determines the pixel group tone value for each pixel group while taking into consideration the diffused tone error from the surrounding pixel groups.

Number data can be determined rapidly when determined on the basis of the correspondence between the pixel group tone value and the number data. Thus, in the printing system illustrated in FIG. 1, images can be rapidly printed because, in conjunction with the ability to rapidly supply the number data to the printer 20, the rapidly produced number data can be rapidly supplied to the printer 20.

The number data may also be produced by referencing a table (number data producing table) in which combinations of classification codes assigned to pixel groups and pixel group tone values are allotted to the number data of the pixel groups having those combinations. More appropriate number data can be rapidly produced when the number data is allotted to combinations of pixel group tone values and classification codes. Here, the classification codes for the pixel groups can be set by classifying each pixel group to a variety of categories according to the position in the image, and in cases such as where the image is always subdivided in the same way, appropriate classification codes can be pre-assigned to each pixel group. Classification codes may also simply be assigned randomly using random numbers or the like.

The number data can also be produced by an extremely simple process because it is produced based on a corresponding relationship or with reference to a number data producing table. Number data can thus be produced in a printer 20, digital camera, or the like without using a machine with a high processing capacity such as a computer 10 to produce the number data.

In addition, because error occurring in the pixel groups is reflected in the production of the number data by being diffused to surrounding pixel groups, errors that are produced in pixel group units can be eliminated, allowing images of high picture quality to be printed. Furthermore, although described in greater detail below, when number data is produced while referencing a number data producing table, different tone errors can be produced even for pixel groups having the same pixel group tone value. It is thus possible to always print images of consistent picture quality because the diffusion of error ensures that dots will not be produced in a constant pattern. Various embodiments of the invention are described in greater detail below using such a printing system as an example.

B. First Embodiment

B-1. Device Structure

Figure 2:
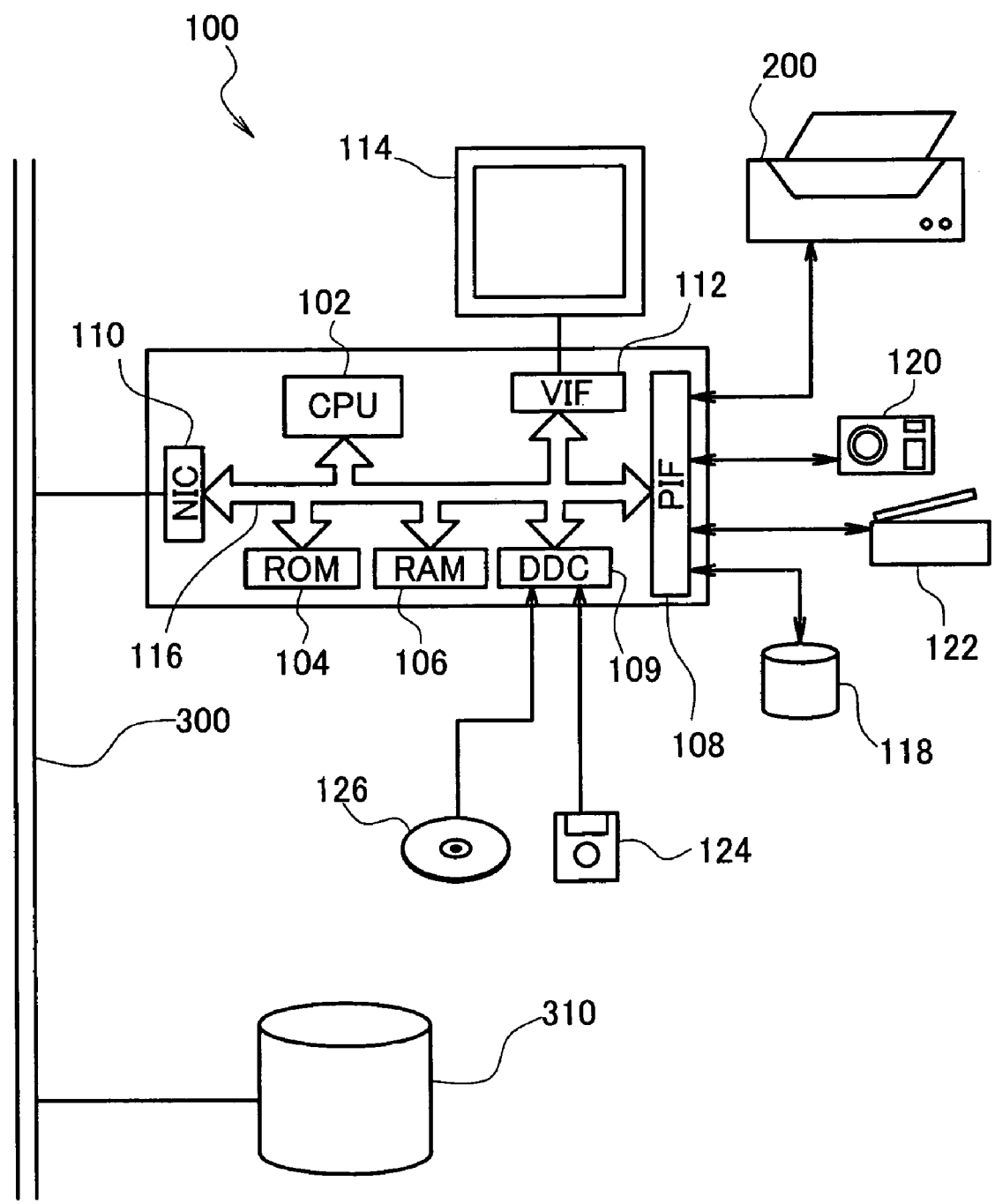
FIG. 2 illustrates the configuration of a computer as an image processing device of an embodiment.

FIG. 2 illustrates the structure of a computer 100 as the image processing device in this embodiment. The computer 100 is a well known computer composed of a CPU 102 as the center, and ROM 104 or RAM 106, etc., connected together by a bus 116.

A disk controller DDC 109 for reading data from a floppy disk 124, compact disk 126, or the like, a peripheral device interface PIF 108 for exchanging data with peripheral devices, a video interface VIF 112 for driving a CRT 114, and the like are connected to the computer 100. A color printer 200 described below, hard disk 118, and the like are connected to the PIF 108. A digital camera 120, color scanner 122, or the like can be connected to the PIF 108 to print images taken from the digital camera 120 or color scanner 122. A network interface card NIC 110 can also be connected to connect the computer 100 to a communications line 300 so as to retrieve data stored on a storage device 310 connected to the communications line.

Figure 3:
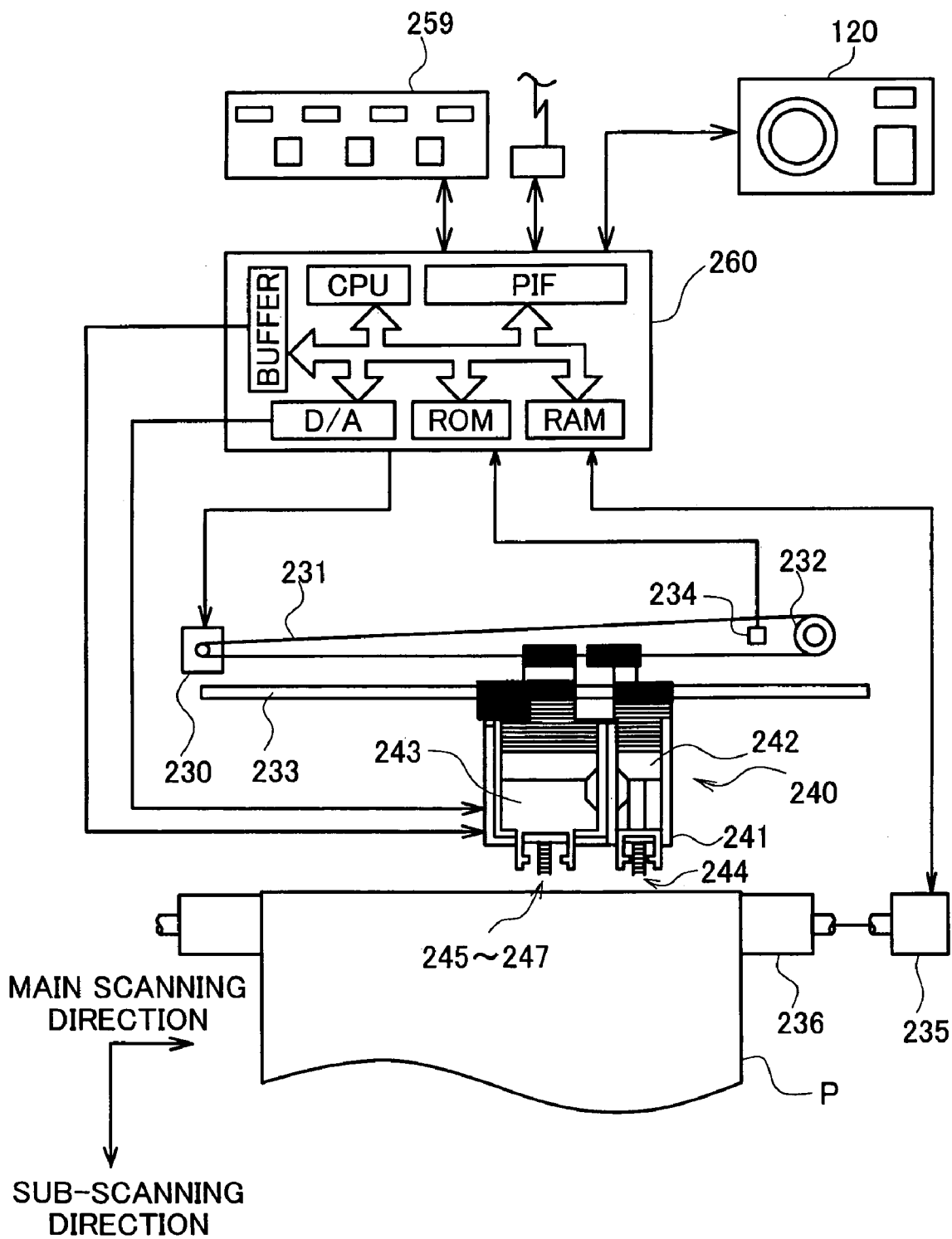
FIG. 3 schematically illustrates the structure of a printer as an image output device of the embodiment.

FIG. 3 illustrates the general structure of the color printer 200 in this embodiment. The color printer 200 is an ink jet printer capable of forming dots with ink of the four colors of cyan, magenta, yellow, and black. Of course, it would also be possible to use an ink jet printer capable of forming ink dots of a total of six colors including, in addition to inks of these four colors, low dye density cyan (light cyan) ink and low dye density magenta (light magenta) ink. Cyan ink, magenta ink, yellow ink, black ink, light cyan ink, and light magenta ink may sometimes be denoted as C ink, M ink, Y ink, K ink, LC ink, and LM ink, respectively, below.

As shown in the drawing, the color printer 200 is composed of a mechanism for driving a print head 241 riding on a carriage 240 to eject ink and form dots; a mechanism for reciprocating this carriage 240 in the axial direction of a platen 236 by means of a carriage motor 230; a mechanism for feeding printing paper P by means of a paper feed motor 235; and a control circuit 260 for controlling the formation of dots, the movement of the carriage 240, and the printing paper feed.

On the carriage 240 are installed an ink cartridge 242 containing K ink, and an ink cartridge 243 containing the various inks of C ink, M ink, and Y ink. When the ink cartridges 242, 243 are installed on the carriage 240, the inks inside the cartridges are supplied through guiding tubes (not shown) to the ink ejecting heads 244 through 247 for each color which are disposed on the lower face of the print head 241.

Figure 4:
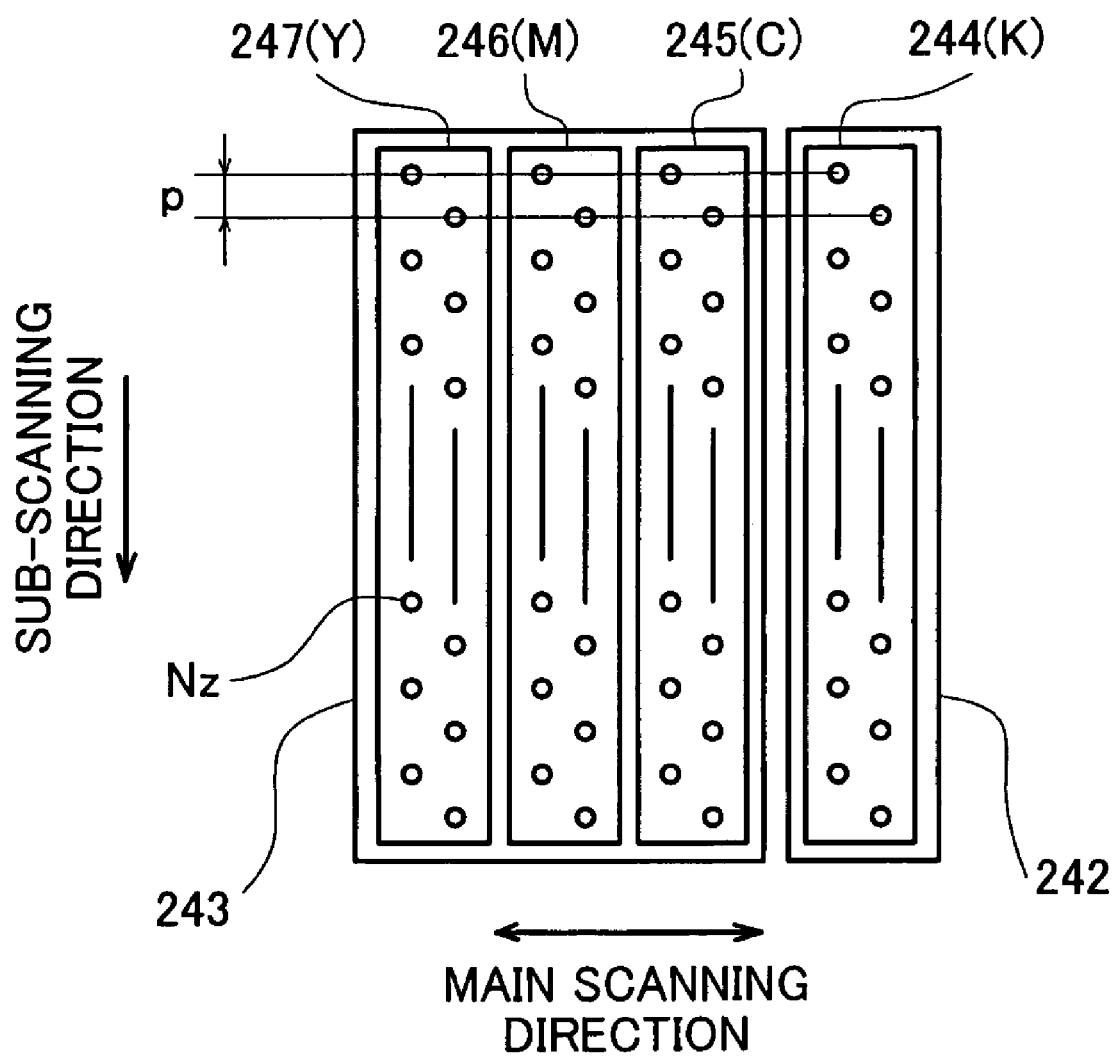
FIG. 4 shows an arrangement of nozzles Nz on respective ink ejection heads.

FIG. 4 illustrates an array of ink jet nozzles Nz in the ink ejecting heads 24 through 247. As illustrated, four sets of nozzle rows ejecting C, M, Y, and K colored ink are formed on the lower faces of the ink ejecting heads, where 48 nozzles Nz per nozzle row are disposed at a given nozzle pitch k.

The control circuit 260 is composed of a CPU, ROM, RAM, PIF (peripheral device interface), and the like connected to each other by a bus. By controlling the operation of the carriage motor 230 and paper feed motor 235, the control circuit 260 controls the main scanning and sub-scanning of the carriage 240, and also controls the ejection of ink drops at appropriate timing from the nozzles on the basis of control data supplied from the computer 100. In this way, ink dots of each color are formed at appropriate locations on the printing medium under the control of the control circuit 260, allowing the color printer 200 to print color images.

The drive signal waveform supplied to the nozzles in order to eject the ink drops can be controlled to modify the size of the ejected ink drops and form ink dots of varying size. Controlling the size of the ink dots in this way will allow images of higher picture quality to be printed through the varied use of ink dots of different sizes according to the area of the image that is being printed.

Various methods can be used as the method for ejecting ink drops from the ink ejecting heads of each color. Specifically, a format in which inks are ejected using piezo elements, or a method in which a bubble is generated in the ink passage by means of a heater disposed in the ink passage in order to eject the ink can be used. It is also possible to use a printer having a format in which ink dots are formed on printing paper through the phenomenon thermal transfer or the like instead of ejecting ink, or a format in which an electrostatic charge is utilized to deposit toner of each color onto a printing medium.

The color printer 200 having a hardware arrangement such as the above moves the ink ejection heads 244 through 247 for each color in the main scanning direction relative to the printing paper P by driving the carriage motor 230, and moves the printing paper P in the sub-scanning direction by driving the paper feed motor 235. The control circuit 260 drives the nozzles at appropriate timing to eject ink drops while repeating the main scanning and sub-scanning of the carriage 240 so that the color printer 200 prints color images on the printing paper.

Because the CPU, RAM, ROM, and the like are installed in the control circuit 260 of the color printer 200, processes carried out by the computer 100 can also be carried out in the color printer 200. In such cases, the image data of images taken by a digital camera 120 or the like can be supplied directly to the color printer 200, and the necessary image process can be carried out in the control circuit 260, allowing images to be printed directly from the color printer 200.

B-2. Outline of Image Printing Process of First Embodiment

An image process (image printing process) carried out inside the above computer 100 and color printer 200 to print images is described below. The general overall image printing process will first be briefly described to facilitate a better understanding. The process will then be described in greater detail.

The first half of the image printing process described below is carried out by the computer 100, and the second half is carried out by the color printer 200, but the process carried out by the computer 100 can also be carried out in the color printer 200, and can also be carried out in a machine for producing image data such as a digital camera 120. That is, according to the image printing process in this embodiment, as will be described greater detail below, the first half of the process can be extremely simple, and can therefore be rapidly implemented even with the use of a CPU having no high processing capacity.

Figure 5:
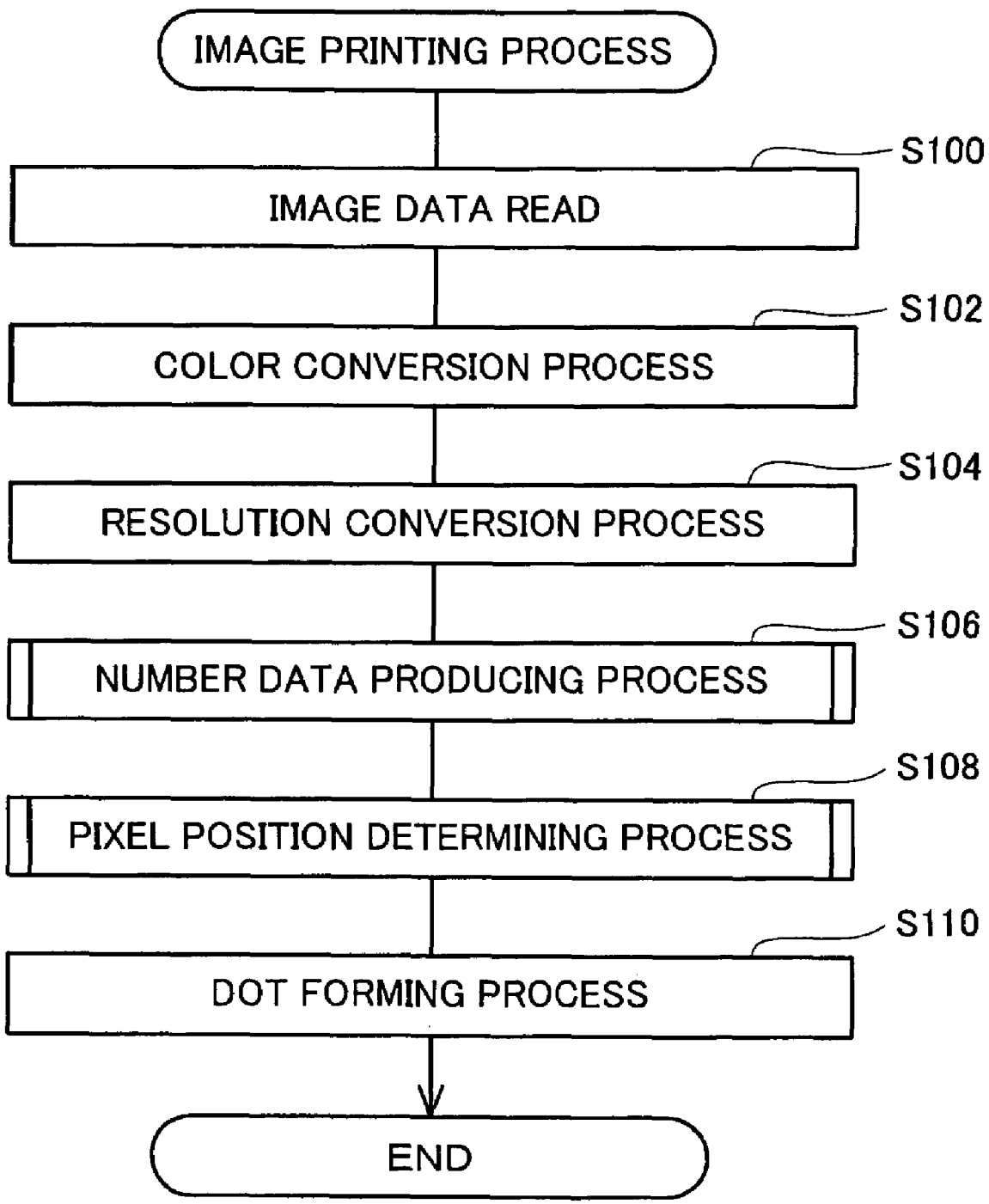
FIG. 5 is a flow chart showing an outline of the image printing process in a first embodiment.

FIG. 5 is a flow chart showing an outline of the image printing process in the first embodiment. The outline of the image printing process is described below with reference to FIG. 5. When the image printing process of the first embodiment is started, the computer 100 first starts to read the image data (Step S100). In this example the image data is RGB color image data but is not limited to color image data, and the process can similarly be applied to monochromatic image data. The process also applies to monochromatic printers, not just color printers.

A color conversion process is carried out after the color image data is read (Step S102). The color conversion process is a process for converting RGB color image data represented by a combination of R, G, B tone values into image data represented by a combination of tone values for the ink colors used to print the images. As described above, the color printer 200 prints images using ink of the four colors C, M, Y, and K. In the color conversion process in the first embodiment, the image data represented by RGB colors is converted into data represented by the tone values of the C, M, Y, and K colors. The color conversion process can be carried out by referencing a three dimensional numerical table termed a color conversion table (LUT). The tone values of the C, M, Y, and K colors obtained by the color conversion relative to the RGB color image data are pre-recorded in the LUT. in the process at Step S102, the LUT is referenced to allow the RGB color image data to be rapidly converted to image data of the C, M, Y, and K colors.

When the color conversion process is complete, a resolution conversion process is begun (Step S104). The resolution conversion process is a process in which the resolution of the image data is converted to the resolution at which the printer 200 prints images (print resolution). When the resolution of the image data is lower than the print resolution, new image data is produced between pixels by interpolation, and conversely when the image data resolution is higher than the print resolution, data is thinned out in regular proportions to make the image data resolution consistent with the print resolution.

When the resolution has thus been converted to the print resolution, the computer 100 begins the number data producing process (Step S106). The details of the process for producing number data will be discussed more specifically below, but will here only an overview will be given. In the number data producing process, certain numbers of adjacent pixels are assembled as pixel groups to divide an image into a plurality of pixel groups. Data representing the number of dots to be formed in the pixel groups, that is, number data, is determined for each pixel group. Because the determination of whether dots are formed on given pixels generally depends on the image data of the pixels, number data representing the number of dots formed in pixel groups can also be determined based on the image data for the image groups. The number data determined for the pixel groups is then output to the color printer 200. The image data is also converted to number data, resulting in some tone error in the pixel groups. In the number data producing process, when the tone error is diffused to surrounding pixel groups and the process is carried out on the surrounding pixel groups, the number data is produced while taking this into account so that the diffused error is eliminated. In the number data producing process, the number data is produced in this way for each pixel group based on the number data for each pixel, and is then supplied to the color printer 200. The details of the number data producing process are described below.

The pixel position determining process is started when the CPU housed in the control circuit 260 of the color printer 200 receives the number data supplied by the computer 100 (Step S108). Although the process is described in greater detail below, generally speaking, the following process is carried out in the pixel position determining process. As noted above, the number data supplied by the computer 100 represents the number of dots to be formed in pixel groups but the matter of which pixel groups the number of dots will be formed on the pixels is undetermined. When the image is then printed, the pixel position where the dots will actually be formed in the pixel groups must be determined from the number data that is supplied. In the pixel position determining process, the pixel positions where the dots are to be formed are determined while referencing a recorded order of the pixels in the pixel groups indicating the likelihood of dots being formed, in other words, the order of pixels indicating the order in which the dots are formed in the plurality of pixels in the pixel groups. The process for determining pixel positions is described in greater detail below.

When the pixel positions were dots are to be formed have been determined as described above, a process for forming dots at the determined pixel positions is carried out (Step S110). That is, as described with reference to FIG. 3, ink ejecting heads are driven to eject ink drops as the carriage 240 repeatedly scans in the main scanning and sub-scanning directions, so the ink dots are formed on the printing paper. Dots are thus formed, so that an image is printed in accordance with the image data.

In this way, only data on the number of dots to be formed in the pixel groups is given by the computer 100 to the printer 200 in the image printing process in the first embodiment, not data on the pixel positions where the dots are formed in the pixel groups. Because the number of dots formed in the pixel groups composed of a plurality of pixels can be represented with far lower quantities of data than when representing the dot on-off state per pixel forming the image, this method can be used to provide data far more rapidly from the computer 100 to the color printer 200.

For example, 8 pixels may be assembled to form one pixel group, with formable dots of one type. In such cases, each pixel has a data length of one bit per pixel because only the dot on-off state is obtained. A data length of 8 bits results when the pixel positions where dots are formed are included in representing all the pixels included in a pixel group. On the other hand, there are only 9 kinds of numbers of dots formed in a pixel group, from 0 to 8. Because 9 kinds and 4 bits can be represented, the number of dots formed in a pixel groups can be represented with a data length of 4 bits. Because the number of dots formed in pixel groups can be represented with far lower quantities of data than data representing the dot on-off state on a per-pixel basis, data can be provided from the computer 100 to the color printer 200 far more rapidly.

Although described in greater detail below, when the pixel positions where dots are formed are appropriately determined, the picture quality will not suffer, even when only data on the number of dots is provided. When tone error occurring in pixel groups is diffused to surrounding pixel groups and number data on the surrounding pixel groups is produced, the error is rapidly eliminated because the number data is produced in such a way that the diffused error is eliminated. Furthermore, because the number data is produced by referencing a number data producing table, the same number data will not always be produced even when pixel groups have the same pixel group tone values, for example. In other words, changes in the errors produced in the pixel groups will always be complex, thus ensuring that there will be no danger of dots being produced in a constant repeating pattern. This will be discussed in greater detail below.

The process for producing the number data can be carried out in an extremely simple and rapid manner using the algorithm described below. the number data can thus be produced at a practical speed even when using image processing devices with relatively low processing capacity.

B-3. Principles Allowing Pixel Position to be Determined from Number Data

The following is a description of the principles allowing images to be printed without a loss of picture quality when applying the methods described above, namely, when data on the number of dots formed in pixel groups is provided by the computer 100, and the pixel positions where dots are actually formed are determined on the color printer 200 side based on the dot number data.

Dithering will first be described to facilitate the description. Dithering is a typical procedure used to convert image data to data representing the dot on-off state on a per-pixel basis. In this procedure, a threshold is established in a matrix referred to as the dither matrix, and the tone value of the image data and the threshold established in the dither matrix are compared for each pixel to determine the formation of dots in pixels that have greater image data tone values and to determine that no dots should be formed in pixels that do not. Making such determinations for all the pixels in an image will allow the image data to be converted to data representing the dot on-off state on a per-pixel basis.

Figure 6:
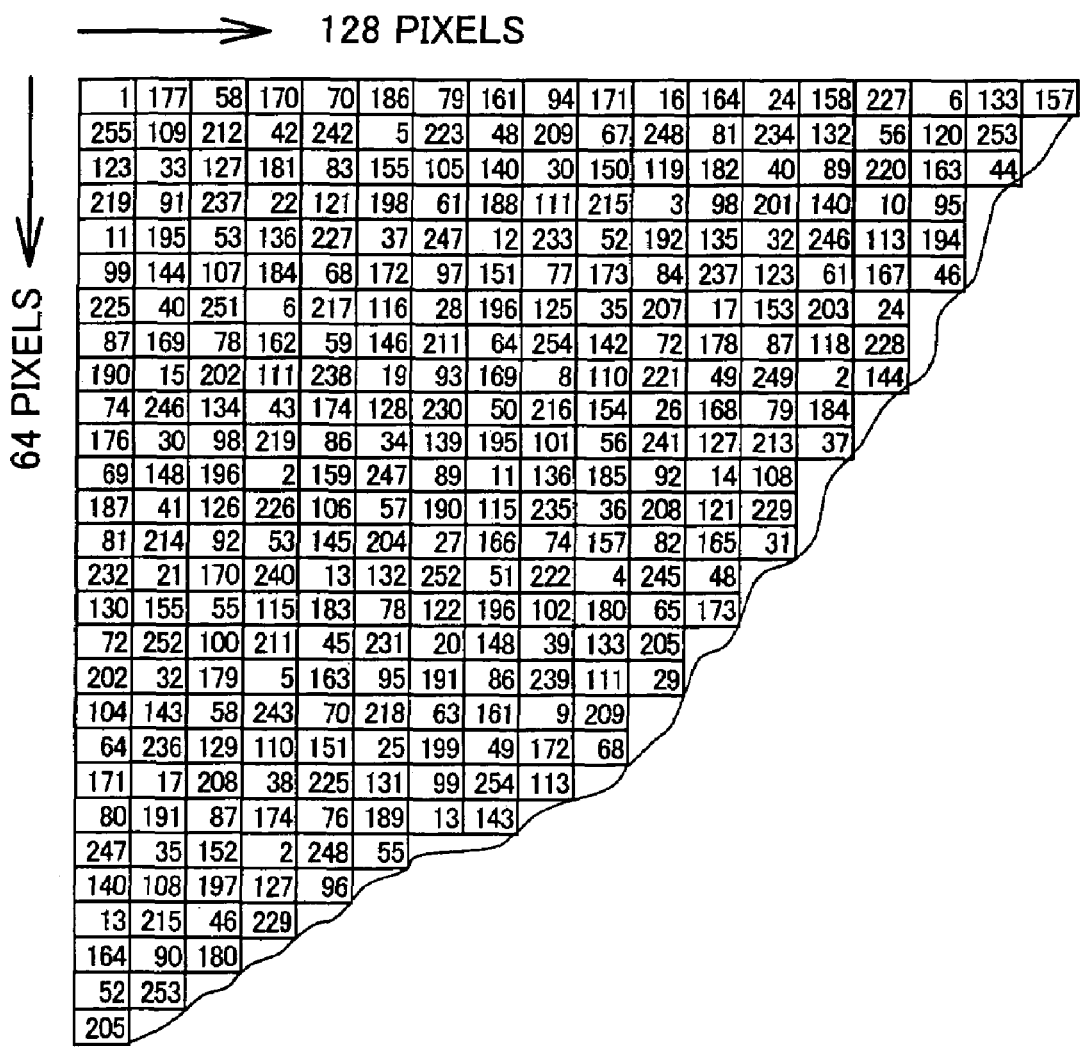
FIG. 6 schematically illustrates an example of a portion of a dither matrix.

FIG. 6 schematically illustrates an example of a portion of a dither matrix. Thresholds uniformly selected from a range of tone values 1 through 255 are randomly stored for a total of 8192 pixels in the illustrated matrix, with 128 pixels in the horizontal direction (main scanning direction) and 64 pixels in the vertical direction (sub-scanning direction). Here, the threshold tone values are selected from the range of 1 to 255 because, in this embodiment, the image data is in the form of 1-byte data which can take a tone value of 0 to 255, and because it is determined that dots are formed in those pixels where the image data tone value and threshold are equivalent.

That is, when the formation of dots is limited to pixels in which the image data tone value is greater than the threshold (that is, no dots are formed in pixels where the tone value and threshold are equivalent), absolutely no dots will be formed in pixels having a threshold equal to the maximum obtainable tone value of the image data. In order to avoid producing pixels in which not dots would be formed, the obtainable threshold range should be a range in which the maximum tone value is subtracted from the obtainable image data range whenever dots are to be formed only in pixels where the tone value of the image data is greater than the threshold. Conversely, when dots can be formed even in pixels where the tone value of the image data is equivalent to the threshold, dots will always end up being formed in pixels where the threshold is the same as the minimum obtainable tone value of the image data. To avoid producing pixels in which dots always end up being formed in this way, the obtainable threshold range should be a range in which the minimum threshold is subtracted from the obtainable image data range whenever dots are to be formed even in pixels where the image data tone value is the same as the threshold. In this embodiment, the obtainable threshold range is 1 to 255 because the obtainable tone values of the image data are 0 to 255, and dots are formed in pixels where the image data and threshold are equivalent. The size of the dither matrix is not limited to that of the example illustrated in FIG. 6, and can vary in size, including matrices with the same number of vertical and horizontal pixels.

Figure 7:
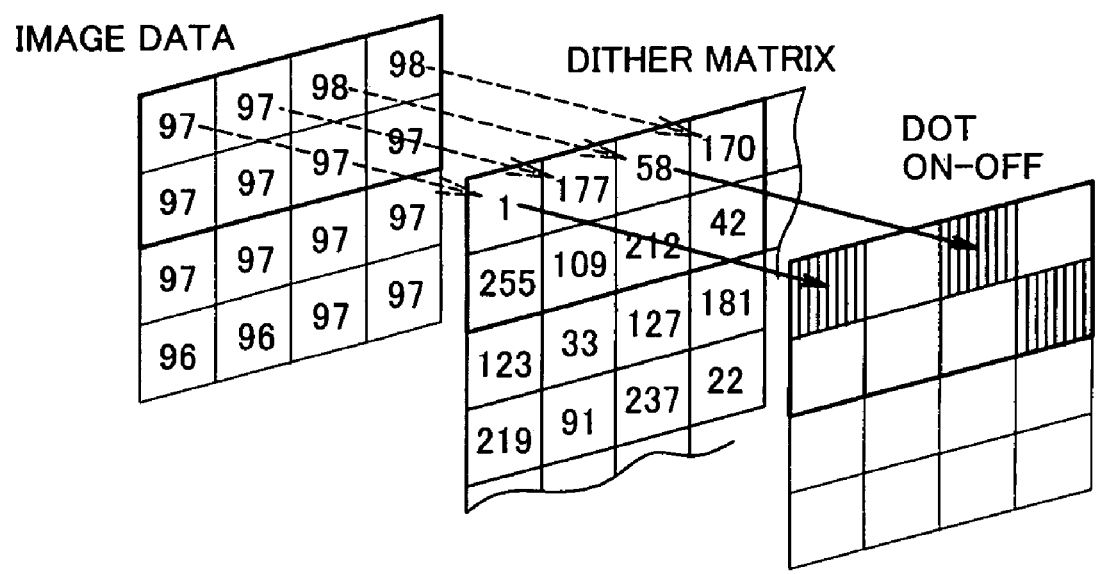
FIG. 7 schematically illustrates the way in which it is determined whether or not dots are formed for each pixel while referencing the dither matrix.

FIG. 7 schematically illustrates the way in which it is determined whether or not dots are formed for each pixel while referencing the dither matrix. When it is determined whether or not dots are formed, the pixels which are to be determined are first selected, and the tone values of the image data for the pixels are compared to the thresholds stored in the corresponding positions in the dither matrix. The fine broken line arrows in FIG. 7 schematically represent a pixel-by-pixel comparison of image data tone levels and thresholds stored in the dither matrix. Because the pixel in the upper left corner of the image data, for example, is 97, and the threshold in the dither matrix is 1, it is determined that a dot will be formed on that pixel. The solid line arrows in FIG. 7 schematically represent the way in which the results of the determination on the formation of dots are written to memory. The tone value of the image data for the pixel to the right of the above pixel is 97, and the threshold in the dither matrix is 177. Since the threshold is greater, it is determined that no dot will be formed on this pixel. Dithering is thus used to convert the image data to data representing the dot on-off state on a per-pixel basis by determining whether or not dots are formed on each pixel while thus referencing the dither matrix.

FIGS. 8*a* through 8*d* illustrate the way in which dithering is used to convert image data to data representing the dot on-off state. FIG. 8*a* is an enlargement of a portion of the image data, where the small squares in the figure represent pixels, and the numbers in the squares represent the tone values of the image data. As illustrated, in the image data, similar (or the same) tone values tend to be allocated between adjacent pixels. Despite a trend toward higher image data resolution in recent years from the demand for higher picture quality, the tendency for similar or the same tone values to be allocated between adjacent pixels becomes more pronounced as the image data resolution increases.

FIG. 8*b* illustrates the way in which thresholds are established at the corresponding positions of the dither matrix. The dot on-off state is determined by a pixel-by-pixel comparison of the image data tone values in FIG. 8*a* with the dither matrix thresholds in FIG. 8*b*. FIG. 8*c* shows the results of the determination of the dot on-off state on a per-pixel basis. The pixels indicated by the diagonal lines in the figure are pixels where it has been determined that dots will be formed.

Here, a certain number of adjacent pixels are assembled as pixel groups, and the number of pixels determined to be where dots will be formed in the pixel groups are counted. As an example, portions of 8 total pixels are assembled as pixel groups from 4-pixel segments in the main scanning direction (horizontal direction in FIG. 8*a*) and 2-pixel segments in the sub-scanning direction (vertical direction in FIG. 8*a*). FIG. 8*d* shows the number of dots obtained by counting pixels determined to be where dots are formed. In the image printing process in the first embodiment, the data supplied from the computer 100 to the color printer 200 shows the number for each pixel group. The number data does not include data related to the pixel positions where dots are formed, but data on the pixel positions where dots are formed can be reconstructed from the number data in the following manner to produce data representing the dot on-off state on a per-pixel basis.

FIGS. 9a through 9d illustrate the way in which data representing the dot on-off state is produced from the number data. FIG. 9a shows the values obtained by counting the number of dots formed in each pixel group in FIG. 8d. FIG. 9b shows the dither matrix referenced to determine the dot on-off state on a per-pixel basis in FIG. 8b. In the dithering described above, the image data tone values are compared with the thresholds established in the corresponding pixel positions of the dither matrix to determine that a dot is formed on a given pixel if the image data tone value is greater. A dot is more likely to be formed the lower the dither matrix threshold. The dither matrix can thus represent the order of pixels on which dots are formed.

In light of this property of the dither matrix, the pixel positions where dots are formed can be determined from the number of dots formed in pixel groups. For example, the pixel group in the first upper left corner of FIG. 9a shows that the number of dots formed in that pixel group is 3. By referencing the dither matrix in FIG. 9b, it can be said that the pixel position in the upper left corner, that is, the pixel position where a threshold of "1" has been established, is the pixel where a dot is most likely to be formed in the pixel group. It can thus be concluded that one of the three dots formed in this pixel group will be formed at the pixel in the upper left corner. It can similarly be concluded that the other two dots will be formed at the second most likely pixel where a dot would be formed (namely, the pixel where a threshold of "42" has been established in the dither matrix in FIG. 9b) and the third most likely pixel where a dot would be formed (namely, the pixel where a threshold of "58" has been established).

Of course, since the dot on-off state is also affected by the image data tone value and not just the threshold established in the dither matrix, it can happen that dots will be formed earlier than pixels with smaller thresholds if the image data tone level is extremely high. However, since similar (or the same) tone values tend to be allocated between adjacent pixels in the image data as described above, in virtually all cases it can be concluded that dots will be formed based on pixels where dots are likely to be formed (that is, pixels with low thresholds in the dither matrix).

The pixel positions where dots are formed in the other pixel groups in FIG. 9a can also be similarly determined based on the dot number and the dither matrix threshold. For example, since the number of dots in the pixel group (second pixel groups from the top left end) under the pixel group described above in FIG. 9a is 3, it can be concluded by referencing the dither matrix in FIG. 9b that these three dots will be formed at the pixels with thresholds of "22,", "33," and "91."

When the pixel positions where dots are formed in the four pixel groups in FIG. 9a are determined in this manner based on the number data, the results shown in FIG. 9c can be obtained. The pixels indicated by diagonal lines in FIG. 9c are where it is determined dots will be formed. Comparison of FIGS. 9c and 8c will show that the pixel positions determined from the number data are consistent with the pixel positions determined on a per-pixel basis. This shows that pixel positions where dots are formed can be appropriately determined from the dither matrix and dot number by determining the dot on-off state on a per-pixel basis with reference to the dither matrix and recording just the number of dots formed in the pixel groups, without the need to record the pixel positions. In the image printing process in this embodiment, images are printed by determining the pixel positions where dots are formed from the number data based on these principles. That is, images of high picture quality can be printed by having the computer 10 produce number data for each pixel group, and by appropriately determining pixel positions where dot are to be formed based on the number data on the color printer 200 side.

In order to appropriately determine pixel positions where dots will be formed based on the number data, the tone values of the image data should not vary significantly within the pixel group. Because, as noted above, a characteristic feature is that the image data has similar tone values between adjacent pixels, such conditions will prevail in virtually all cases, allowing images to be printed without a loss of picture quality even when only number data is provided to the color printer 200. In addition, as will be described below, when tone value error occurring as a result of the production of the number data is diffused to surrounding pixel groups in the process for producing number data in this embodiment and the number data is produced with the surrounding pixel groups, the number data is produced in such a way that the diffused error is eliminated. Error produced in the pixel groups can thus be rapidly eliminated, and the print quality can be substantially improved.

In the dithering method illustrated in FIG. 7, the dot on-off state was determined depending on which of the compared image data tone value or threshold in the dither matrix was greater. In contrast, when determining the pixel positions where dots are to be formed in pixel groups based on the number data, the pixel positions where dots are to be formed are determined in sequence starting from pixels with lower dither matrix thresholds. That is, to determine the pixel positions, the sequence in which dots are likely to be formed in the pixel group should also be known, not just the threshold values. A matrix with values showing the sequence in which dots are formed (sequence values) in the pixels of the pixel groups such as the one illustrated in FIG. 9d (in the present Specification, such a matrix is referred to as an order matrix) can thus be stored instead of the dither matrix shown in FIG. 9b, and the pixel positions can be determined from the number data while referencing the order matrix on a per-pixel basis.

B-4. Process for Producing Number Data in First Embodiment

Figure 10:
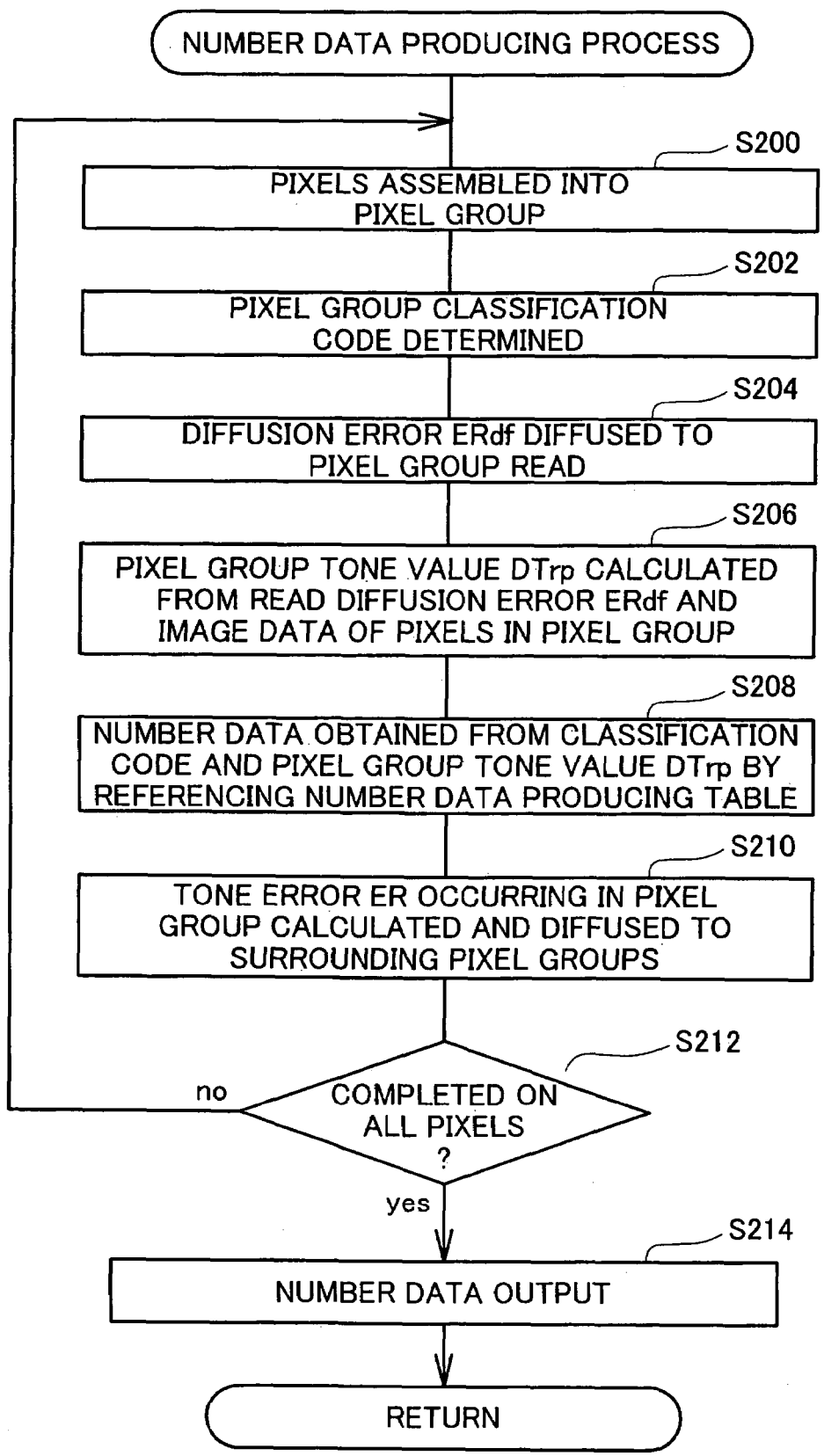
FIG. 10 is a flow chart of the process for producing the number data in the first embodiment.

The process for producing number data from the image data (Step S106) in the image printing process of the first embodiment illustrated in FIG. 5 is described below. FIG. 10 is a flow chart of the process for producing the number data in the first embodiment. In this description the process for producing number data is carried out by the computer 100, but as will be described below, the process for producing number data can be an extremely simple process, which can thus be carried out in the color printer 200 or digital camera 120. The description below will follow the flow chart.

When the number data producing process of the first embodiment starts, certain numbers of adjacent pixels are assembled into pixel groups (Step S200). Here, the pixel groups are assembled with a total of 8 pixels, with 4-pixel segments in the main scanning direction and 2-pixel segments in the sub-scanning direction. The pixels assembled into pixel groups do not have to be organized in the rectangular vertical and horizontal positions in this manner. Pixel groups may be assembled from any pixels that are adjacent to each other in a given positional relationship.

The classification codes of the pixel groups are then determined (Step S202). Although described in greater detail below, the pixel groups are classified into a number of types, and are assigned classification codes, according to their position in the image. The classification codes can be extremely easy to determine using the method described below.

The diffusion error ERdf diffused to the pixel groups is then read (Step S204). Diffusion error ERdf is error that accumulates through the diffusion of tone error ER, occurring as a result of the production of number data, to surrounding pixel groups. The details of tone error ER resulting from the production of the number data, and the process for diffusing the tone error ER, are described below.

At this time, the pixel group tone value DTrp of the pixel groups are calculated when the diffusion error ERdf diffused to the pixel groups in the process is read out (Step S206). The pixel group tone value DTdf is the tone value representing the pixel group, which is calculated in the following manner from the image data DTpx of each pixel assembled as the pixel group, and the diffusion error ERdf of the pixel group.

Figure 11:
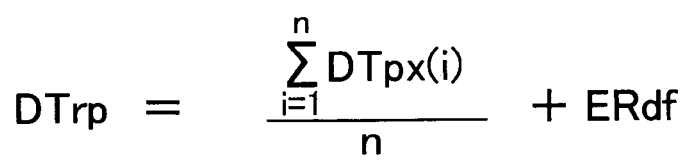

FIG. 11 illustrates an example of a method for calculating the pixel group tone value DTrp. In the figure, DTpx indicates the image data of the pixels forming the pixel group. As illustrated in FIG. 11, the mean value is calculated by dividing the total of image data DTpx (i) (where n is the number of pixels forming the pixel group)for each pixel forming the pixel group by the number n of pixels, and the diffusion error ERdf described below is added to the resulting mean value, giving the pixel group tone value DTrp. When the pixel group is made of 8 pixels as in this embodiment, the sum of the image data of all the pixels is determined, and the resulting binary number data can be shifted laterally in 3-bit segments to obtain the mean value of the image data for all the pixels in the pixel group. Shifting the binary number data laterally in 3-bit segments corresponds to division by 8. The diffusion error ERdf may be added to the resulting mean value to determine the pixel group tone value DTrp. The pixel group tone value DTrp can be determined for the pixel group in the above manner in Step S206 in FIG. 10.

The number data for the pixel group is then determined (Step S208) by referencing the number data producing table described below based on the classification code and pixel group tone value which have been determined in Steps S202 and S206, respectively. Although described in greater detail below, the appropriate number data is allotted to combinations of pixel group classification codes and pixel group tone levels DTrp and is pre-recorded in the number data producing table. The number data can thus be determined directly by referencing the number data producing table if the pixel group classification code and pixel group tone value have been determined. This is further elaborated below.

When the image data has been determined in this way for a pixel group, the tone error occurring in that pixel group is determined, and a process for diffusing the error to the surrounding pixel groups is carried out (Step S210). Although the details of the tone error ER occurring in pixel groups is described in greater detail below, here it may be considered conversion error occurring in the pixel group as a result of the conversion of the pixel group tone value DTrp to number data. In Step S210, the tone error ER occurring in the pixel group is calculated, and a process is carried out to diffuse the tone error ER to pixel groups for which no number data has been produced which are located around the pixel group in question. The method for calculating the tone error ER and the method of diffusion are described in detail below along with the description of the tone error ER.

When the number data has thus been produced for a pixel group and the resulting tone error ER has been diffused, it is determined whether or not such a process has been carried out on all the pixels in the image (Step S212). When unprocessed pixels still remain (Step S212: No), the process returns to Step S200 to produce a new pixel group and then repeat the process. This is done repeatedly until it is determined that all the pixels have been processed (Step S212: Yes), and the number data obtained for each pixel group is output to the color printer 200 (Step S214), concluding the number data producing process of the first embodiment illustrated in FIG. 10.

The method for determining the classification codes of the pixel groups (process details of Step S202 in FIG. 10) is described below, followed by a description of the method for producing number data from the classification codes and pixel group tone levels (process details in Step S208 of FIG. 10). Lastly, the method for determining the tone error ER occurring as a result of the production of the number data and a method for diffusing the tone error (process details of Step S210 in FIG. 10) will be described.

B-4-1. Method for Determining Classification Codes

A method for determining classification codes for pixel groups during the above process for producing number data will be described first. For a better understanding, the concept of assigning classification codes to pixel groups will be described below, and a specific method for assigning classification codes will then be described.

Figure 12A:
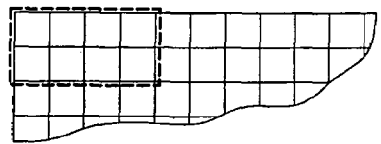
FIGS. 12a through 12c illustrate a way to determine classification codes for each pixel.
Figure 12B:
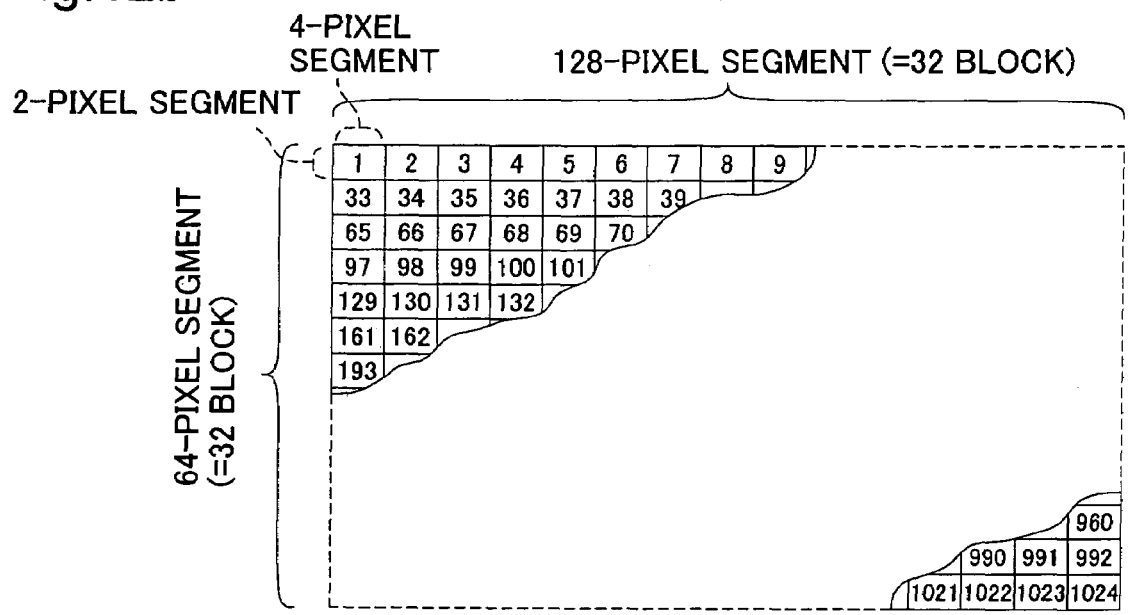
Figure 12C:
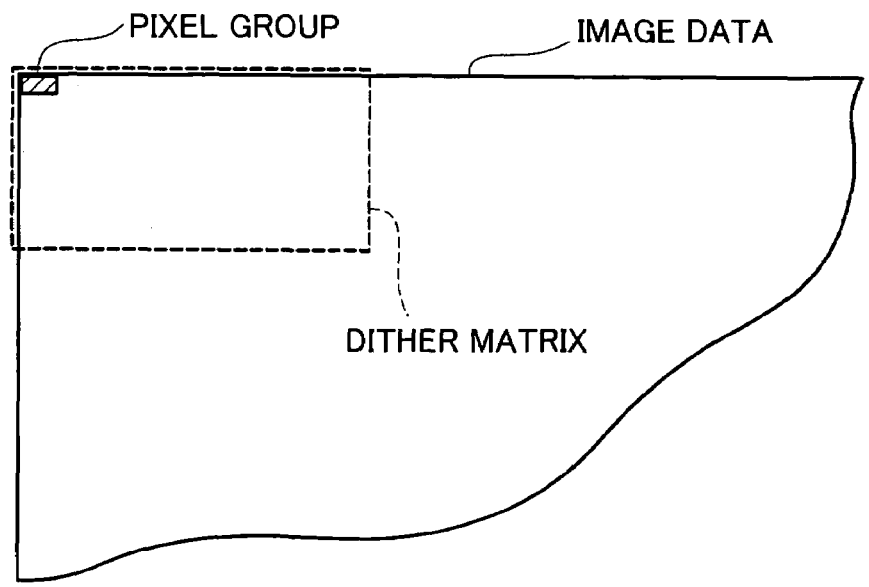

FIGS. 12a through 12c illustrate a way to determine classification codes for each pixel. FIG. 12a schematically illustrates a way to produce a pixel group by assembling a total of 8 pixels, with 4-pixel segments in the horizontal direction and 2-pixel segments in the longitudinal direction, in the first upper left corner of the image.

As illustrated previously with reference to FIGS. 6 and 7, the dot on-off state was determined on a per-pixel basis by comparing the tone level of the image data allocated to pixels by dithering and the thresholds established for the corresponding positions in the dither matrix. In the present embodiment, on the other hand, because a certain number of adjacent pixels have been assembled into pixel groups, blocks of the thresholds established in the dither matrix are also produced by assembling certain numbers corresponding to the pixel groups. FIG. 12b illustrates a way in which a plurality of blocks of thresholds in the dither matrix of FIG. 6 are produced from 4 in the horizontal direction and 2 in the vertical direction. Since the dither matrix in FIG. 6 has thresholds for a total of 8192 pixel portions, with 128 pixel portions in the horizontal direction (main scanning direction) and 64 pixel portions in the vertical direction (sub-scanning direction), when the thresholds are assembled in blocks of 4 in the horizontal direction and 2 in the vertical direction, the dither matrix is divided into a total of 1024 bocks, 32 in each of the vertical and horizontal directions.

As illustrated in FIG. 12b, these blocks are numbered 1 to 1024. The pixel groups are classified by the number of the block applied to the position of each pixel group when the dither matrix is applied to the image data. As shown in FIG. 12c, for example, Because the No. 1 block in FIG. 12b is applied to the first upper left corner pixel group in the image, that pixel group is classified as the classification No. 1 pixel group.

The above is the basic concept for the classification of pixel groups. When the dither matrix is applied to the image data in this way in Step S202 of FIG. 10, the pixel groups are classified by the numbers of the blocks applied to the pixel groups, and the corresponding classification codes are determined and given to the pixel groups.

A specific method for determining the classification numbers of pixel groups is described next. FIGS. 13a through 13d illustrate a way to determine classification codes for the pixel groups. FIG. 13a shows a pixel group produced in an image.

A method for determining the classification code in light of this pixel group will be described here. The pixel group of interest for determining the classification code is referred to below as the pixel group of interest.

Taking the first upper left corner pixel of the image as the starting point, pixel positions will be represented the number of pixels in the main scanning and sub-scanning directions from the starting point. Pixel group positions are represented by means of the pixel position of the pixel in the upper left corner of the pixel group. In FIG. 13a, a black circle indicates the pixel showing the position of the pixel group of interest. The pixel position of that pixel is (X,Y). Because the size of each pixel group is 4 pixels in the main scanning direction and 2 pixels in the sub-scanning direction, n and m (where n and m are positive integers of 0 or greater) are such that:

$$X=4n+1, Y=2m+1$$

In other words, a pixel group of n is parallel to the left side of the pixel of interest, and a pixel group of m is parallel to the upper side of the pixel of interest.

As described above, because a pixel group is classified based on the number of the block applied to the pixel of interest when the dither matrix is applied to the image data (see FIG. 12b), the same pixel group may be classified with different classification codes by a method in which the dither matrix is applied, while moving, to image data. In fact, the method for applying the dither matrix, while moving, to image data may be any method, although here, for the sake of convenience, the simplest method will be described, namely, while the dither matrix is moved in the horizontal direction. FIG. 13b schematically illustrates the repeated application of the dither matrix, while moved in the horizontal direction, to image data.

FIG. 13c schematically illustrates the dither matrix being applied to the pixel group of interest shown in FIG. 13a as the dither matrix is repeatedly used as shown in FIG. 13b. As the dither matrix is thus moved, any of the blocks in the dither matrix may end up being applied to the pixel group of interest. Here, a block in row M, column N in the dither matrix is applied to the pixel group of interest. Because a pixel group of n is on the left side of the pixel of interest as illustrated in FIG. 13a, and a pixel group of m is on the upper side, the result is the following relationships between N and n and between M and m.

$$N=n-\text{int}(n/32)\times 32+1$$

$$M=m-\text{int}(n/32)\times 32+1$$

Here, int is an operator indicating that integers are produced by cutting off the decimal point. That is, int(n/32) represents an integer value obtained by cutting off the number below the decimal point for the calculated results of n/32. When the position of the pixel group of interest is thus known, the numerical values M and N are determined from the above relational expressions in FIG. 13d, and the block number of the block at M and N in the dither matrix should be used as the classification code of the pixel group of interest. Of course, the values of M and N can in fact be determined with extreme ease without the calculations in FIG. 13d. This is described below.

FIG. 14 illustrates a specific method for determining classification codes for a pixel group of interest. X and Y represent the location of the pixel group of interest in 10 bits as (X,Y). FIG. 14(a) schematically illustrates 10 bits of binary data representing numerical value X. To distinguish the bits in the figure, they are numbers from 1 to 10 from the highest bit to the lowest bit.

As illustrated previously with FIG. 13d, the number n of the pixel group on the left side of the pixel group of interest can be obtained by subtracting 1 from the numerical value X and dividing by 4. Here, since the division by 4 can be done by shifting 2 bits worth to the right, 1 should be subtracted from the numerical value X, and the resulting binary data should be shifted 2 bits worth to the right. Furthermore, since the numerical value X cannot be any number, but can be only a number which can be expressed by the formula 4n+1, the number n of the pixel group can be obtained simply by shifting the binary data 2 bits worth to the right without subtracting 1. FIG. 14(b) schematically represents n binary data obtained by thus shifting the numerical value X in bits.

Next, int(n/32) is calculated. That is, n is divided by 32, and the number is cut off below the decimal point. The division by 32 can be done by shifting the binary data 5 bits worth to the right, and if the data is treated in the form of integers, the number is automatically cut off below the decimal point. As a result, the binary data of int(n/32) can be obtained by shifting the n binary data 5 bits worth to the right. FIG. 14(c) schematically illustrates the binary data of int(n/32) obtained by shifting n in bits.

The resulting int(n/32) is multiplied by 32. The multiplication by 32 can be done by shifting the binary data 5 bits worth to the left. FIG. 14(d) schematically illustrates the int(n/32)×32 binary data obtained by shifting n in bits.

Next, int(n/32)×32 can be subtracted from n to obtain the numerical value N described above. A comparison of the n binary data (FIG. 14(b)) and int(n/32)×32 binary data (FIG. 14(d)) will show that that the two sets of binary data share the upper 5 bits, and that the last 5 bits of the numerical value on the subtraction side are all 0. The determined numerical value M can thus be obtained by extracting the last 5 bits of the numerical value on the subtraction side as such. That is, the numerical value N can be obtained with extreme ease simply by applying mask data such as that in FIG. 14(f) to the binary data in FIG. 14(b). Alternatively, mask data such as that in FIG. 14(g) can be applied to the binary data of numerical value X indicating the position of the pixel group of interest shown in FIG. 14(a), and the $4^{th}$ through $8^{th}$ bit data can be directly extracted, giving the numerical value N.

FIG. 14 illustrates a case in which the numerical value N indicating a block position in the dither matrix is determined from the numerical value X of the coordinates (X,Y) indicating the position of the pixel group of interest, but the numerical value M indicating the block position can be determined from the numerical value Y in exactly the same way. As a result, when the position of the pixel group of interest is known, it can be learned to which row and column in the dither matrix the block to which the pixel group of interest corresponds simply by extracting the data of specific bit positions form the binary data, and the classification code of the pixel group of interest can be rapidly determined based on the block number.

B-4-2. Number Data Producing Table

The following description is of a process for obtaining number data from the pixel group classification code and pixel group tone value DTrp by referencing the number data producing table during the process for producing number data in the first embodiment (Step S208 in FIG. 10).

Figure 15:
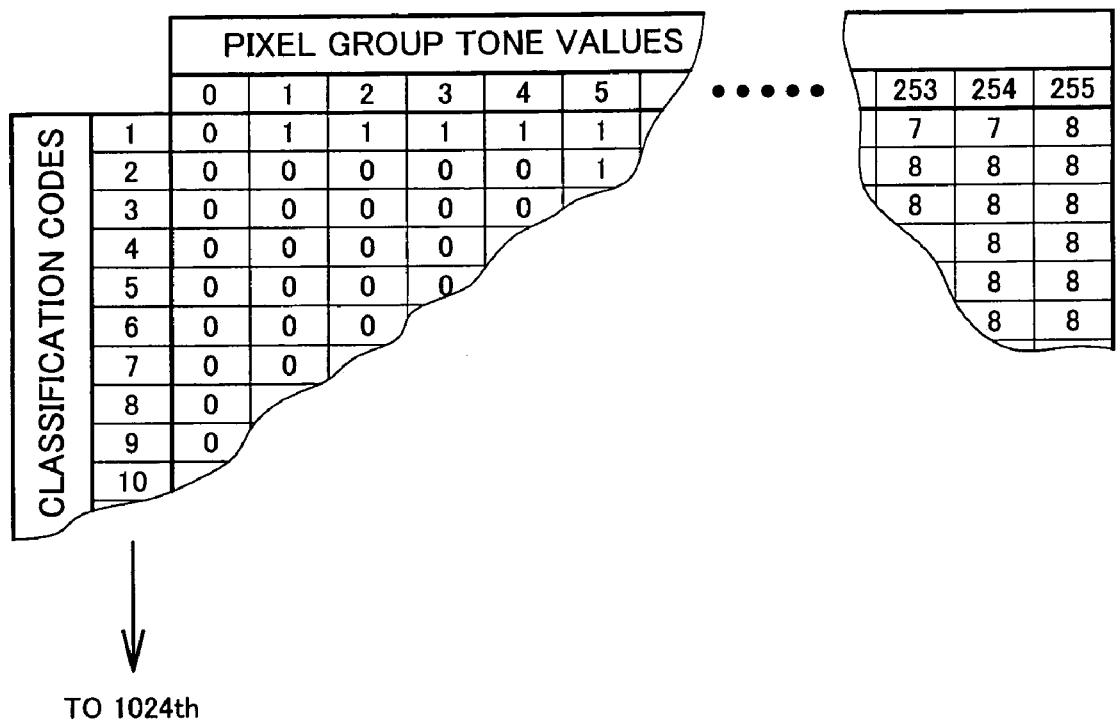
FIG. 15 schematically illustrates a number data producing table which is referenced to obtain number data from the pixel group classification codes and the pixel group tone values.

FIG. 15 schematically illustrates a number data producing table which is referenced to obtain number data from the pixel group classification codes and the pixel group tone values. As illustrated, appropriate number data matched to combinations of pixel group classification codes and pixel group tone values is pre-recorded in the number data producing table. As noted above with reference to FIGS. 12a through 12c, the pixel groups here are classified into classification codes 1 through 1024, and when the pixel group tone value is 1-byte data, because any tone value from 0 to 255 can be obtained, the combination of pixel group classification code and pixel group tone value can be a combination of 1024×256=262,144. The number data for all combinations is established in the number data producing table, and the number data is established in the following manner.

FIGS. 16a through 16g schematically illustrate the way in which appropriate number data is determined according to the combination of pixel group classification codes and pixel group tone values. As an example, the classification code of the pixel group can be 1. The block with the number 1 in the dither matrix is applied to the pixel group with a classification code of 1. The threshold established for the block with the number 1 is shown in FIG. 16a.

Now assume the pixel group tone value is 0. Because the pixel group tone value is the tone value representing the pixel group, all the pixels of the pixel group are considered to have image data with a tone value of 0. The tone values (namely, "0") of the pixels are compared to the thresholds shown in FIG. 16a, and it is determined that a dot is formed on pixels with a greater (or equivalent) tone value. After the determination has thus been made for all the pixels of the pixel group, the number of dots is counted, and the resulting value is used as the number data. Because all the thresholds in FIG. 16a are greater than the tone value 0, there are no pixels which can be determined to be where dots are formed. Number datum 0 is established for the combination of a classification code of 1 and a pixel group tone value of 0. FIG. 16b schematically represents the way in which the number data is determined when the pixel group tone value is 0. in this case, no dots are formed on any of the pixels in the pixel group, and the number datum is thus 0.

FIG. 16c schematically represents the way in which number data is determined when the pixel group tone values is 1. In this case, all the pixels in the pixel group have image data with a tone value of 1, and the tone values of the pixels are compared to the thresholds shown in FIG. 16a. As a result, it is determined that the image data tone value and the threshold are equivalent in the pixel in the upper left corner of the pixel group, and that a dot is formed there, while it is otherwise concluded that no dots are formed on the other pixels. The circle filled in with diagonal lines in FIG. 16c shows that a dot has been determined to be formed on the pixel. As a result, number datum 1 is established for the combination of a classification code of 1 and a pixel group tone value of 1.

This process is repeated for all of the pixel group tone values from 0 to 255 to determine the number data. When the pixel group tone value is 2, for example, the number data is 1, as illustrated in FIG. 16d, and when the pixel group tone value is 100, the number data is 3, as illustrated in FIG. 16e. FIGS. 16f and 16g schematically illustrate the way in which the number data is determined when the pixel group tone value is 200 and 255, respectively. In the row (horizontal in the table) corresponding to classification code 1 in FIG. 15, the number data established in relation to the pixel group tone values is number data that has been determined in this way. This process is repeated for all the classification codes from 1 to 1024, ultimately allowing number data to be determined for all combinations of all classification codes and all pixel group tone values. The corresponding number data matching the combinations of classification codes and pixel group tone values DTrp have been pre-established in the number data producing table in FIG. 15. In Step S208 shown in FIG. 10, the pixel group tone value DTrp can be rapidly converted to number data by referencing the number data producing table.

B-4-3. Method for Diffusing Tone Error

As noted above, tone error ER is produced in pixel groups when the pixel group tone value DTrp is converted to number data. In the process described above for producing number data, the tone error ER is diffused to surrounding pixel groups (Step S210 in FIG. 10), and the pixel group tone value DTrp is calculated while taking into consideration the diffused error (diffused error ERdf) in the surrounding pixel groups. The following is a description of the meaning of tone error ER which occurs when pixel group tone values DTrp are converted to number data, a method for calculating the error, and a method for diffusing the tone error ER.

As noted above with reference to FIG. 15 and FIGS. 16a through 16g, the number data is 0 when the pixel group tone value DTrp is the minimum value (tone value: 0), and the number data is 8 when the pixel group tone value DTrp is the maximum value (tone value: 255). Within this range, the number data increases as the pixel group tone value increases. Here number data only up to a gray scale of 9, from 0 to 8, can be obtained because the pixel groups are made of 8 pixels in this embodiment. By contrast, when the pixel group tone level is 1-byte data, 256 gray scale pixel group tone values are available, from 0 to 255. That is, some type of error is produced because 256 gray scale pixel group tone values are converted to 9 gray scale number data.

The tone value expressed by the pixel group can also increase 8 levels, from a state in which no dots are formed (corresponding to number data of 0) to a state in which dots are formed on all the pixels (number data of 8). From a tone value of 0, which is expressed by a pixel group in which the number data is 0, the tone values expressed each time the number of dots increases by 1 will increase by 32, until a pixel group in which dots are formed on all pixels expressed a tone value of 255. This being the case, error occurs between the tone values expressed by the pixel groups (expressed tone value) relative to the pixel group tone value DTrp. Tone error ER is the type of error that occurs when the pixel tone value DTrp is converted to number data, and can be determined by subtracting the expressed tone value from the pixel group tone value. That is, the tone error ER can be calculated as:

$$ER=DTrp-(\text{number of dots})\times(\text{tone value expressed per dot}).$$

FIGS. 17a through 17d schematically illustrate how tone values expressed by pixel groups (expressed tone values) increase in stages as the pixel group tone values increase, and how tone error ER changes as a result. Here, the number of dots that are produced when certain pixel group tone values are given, namely, the number data for the pixel group tone values, varies depending on the threshold established for the corresponding block in the dither matrix. FIGS. 17a through 17d show tone error ER produced in corresponding pixel groups, using as an example the four blocks in FIG. 8b.

Figure 17A:
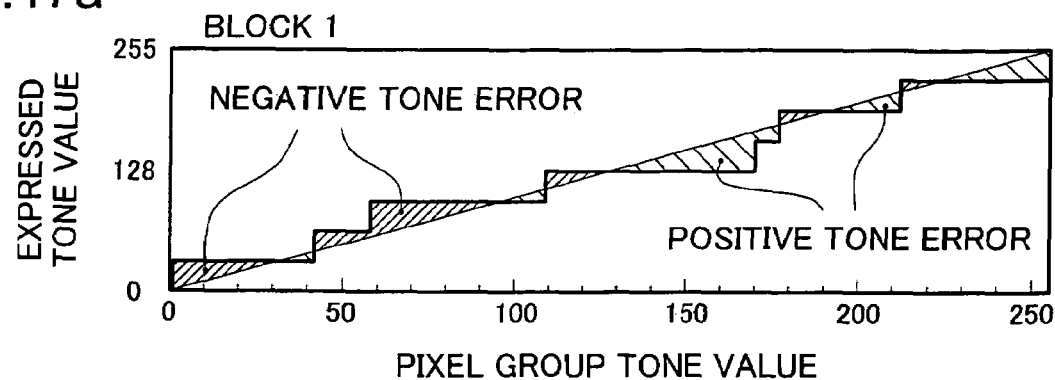
FIGS. 17a through 17d schematically illustrate the way in which tone values expressed by pixel groups and tone error change as the pixel group tone values increase.

FIG. 17a shows the tone values expressed by the pixel group, and the resulting tone error ER, when the pixel group tone value is increased from 0 to 255 using the block in the upper left corner of the four blocks in FIG. 8b (block No. 1 according to the numbers in FIG. 12b). For example, when the pixel group tone value is 45, dots are formed on the pixel with a threshold of 1 and the pixel with a threshold of 42 in block No. 1, and the tone value expressed by the pixel group is therefore 64. The tone value that is actually expressed is 64, as opposed to the pixel group tone value of 45, resulting in tone error ER of a tone value "−9," where 45−64=−9. FIG. 17a thus shows the results that are obtained when the tone error ER that has occurred is determined in relation to all the pixel group tone values from 0 to 255.

Figure 17B:
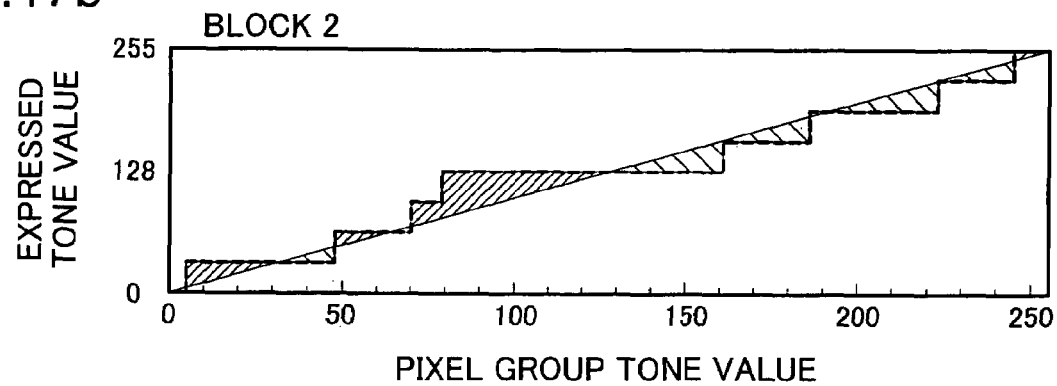

FIG. 17b shows the expressed tone value relative to the pixel group tone value, and the tone error ER, for the adjacent block to the right (block No. 2 according to the numbers in FIG. 12b) of the above block. In the case that is described, the pixel group tone value is 45 in the same manner as the first block described above. For this pixel group tone value 45, in block No. 2, a dot is formed only on the pixel with a threshold of 5. The tone value expressed by the pixel group is thus 32, resulting in tone error ER with a tone value of 13.

Figure 17C:
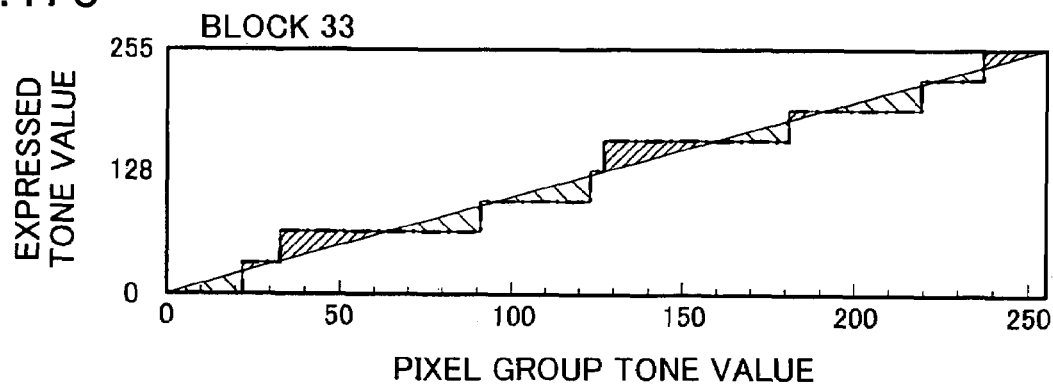
Figure 17D:
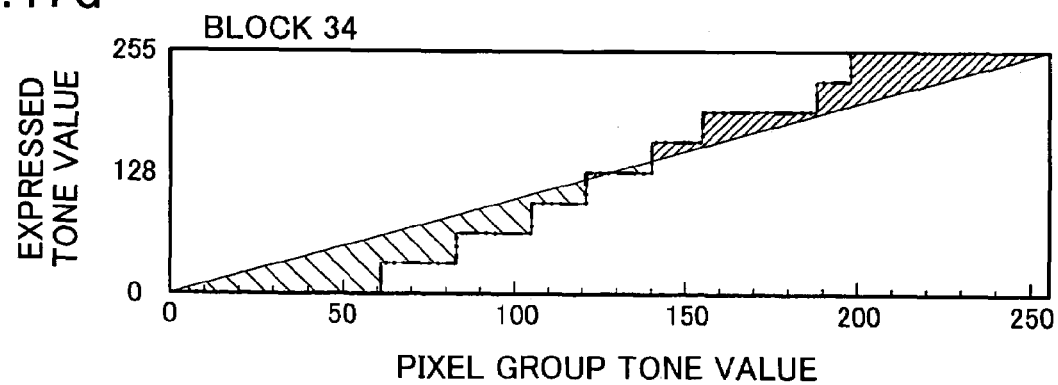

In FIG. 17c, the tone error ER is similarly determined for the block directly under the first block (block No. 33 according to the numbers in FIG. 12b), and in FIG. 17d, the tone error ER is determined for the block directly under the second block (block No. 34). A comparison of FIGS. 17a through 17d shows that the pattern of the resulting tone error ER changes in a complex manner, and that the tone error ER that occurs relative to the same pixel group tone value is different for each pixel group.

As noted above, the tone values expressed by the pixel groups change in steps from 0 gray scale to 255 gray scale. The fact that the pixel group number data is determined in light of this allows it to be concluded that multiple values are produced for pixel groups. That is, it can be concluded that multiple values of the image data in the pixel groups is produced while error is diffused. When such multiple values are produced while the error is thus diffused, the multiple values that are produced may result in a constantly repeated pattern, which can affect picture quality. However, as illustrated in FIGS. 17a through 17d, when the multiple values are produced in this embodiment, the results are different even for the same pixel group tone value if the pixel group classification code is different. As the method for determining the classification codes of the pixel groups described above with reference to FIGS. 13a through 13d clearly shows that the same classification codes are not given to pixel groups, the pattern of tone error that occurs will also change in a complex manner, resulting in no danger of a loss of picture quality due to a constantly repeated pattern in the multiple values that are produced.

Figure 18A:
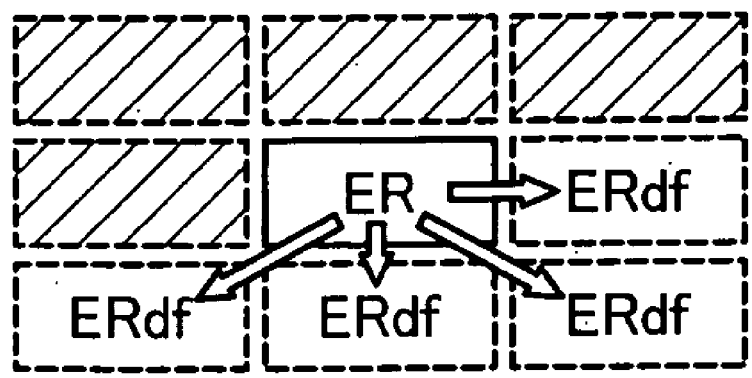
FIGS. 18a and 18b schematically illustrate the way in which tone error occurring in pixel groups is diffused among surrounding pixel groups.
Figure 18B:
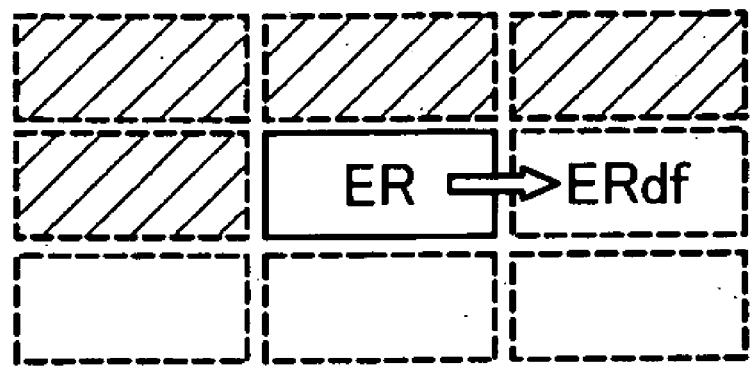

When the tone error ER occurring in pixel groups is thus calculated in the above manner, the resulting tone error ER is diffused to surrounding unprocessed pixel groups. FIGS. 18a and 18b schematically illustrate the way in which tone error ER occurring in certain pixel groups is diffused among surrounding pixel groups. The rectangles in the figure schematically illustrate pixel groups, where the pixel group indicated by the solid line shows the pixel group being processed. The hatched pixel groups indicated by broken lines indicate pixel groups for which number data has already been produced, and the unhatched pixel groups indicated by broken lines represent pixel groups for which no number data has yet been produced. As illustrated in FIGS. 18a and 18b, there are four unprocessed pixel groups adjacent to the pixel group being processed. In the example in FIG. 18a, the tone error ER produced in the pixel group is equally distributed to these four pixel groups. The white arrows in the figure schematically show how the tone error ER is equally divided as diffusion error ERdf to these pixel groups. The tone error ER need not necessarily be partitioned equally, but may also be partitioned while weighted. Alternatively, the error may also be diffused to pixel groups that are farther away and not just to adjacent pixel groups. The weighting factor for surrounding pixel groups when the diffusion error ER is diffused can be pre-established in the form of an error diffusion matrix.

The examples of the blocks in FIGS. 17a through 17d show that the magnitude of the tone error ER occurring in the pixel groups does not increase as much as the tone error occurring in a single pixel. In the case of a single pixel, for example, the tone error ER can range from −254 to 254. That is, when the dither matrix threshold is 255 for a pixel with an image data tone value of 254, the result is tone error with a tone value of 254 because no dots are formed on the pixel. When the dither matrix threshold is 1 for an image data tone value of 1, the result is error with a tone value of −254 because a dot is formed on the pixel. On the other hand, because the tone error occurring in the pixels of a pixel group is not biased toward either positive or negative, the errors overall tend to cancel each other out, resulting in relatively lower tone error ER occurring in the pixel group. The process for diffusing error can be a simple one by diffusing all the tone error ER diffused to one pixel group as in FIG. 18b.

In Step S210 in FIG. 10, as noted above, the tone error occurring in a pixel group is calculated, and the resulting error is diffused to the surrounding pixel groups. The error diffused to the surrounding pixel groups accumulates in the form of diffusion error ERdf. When calculating the pixel group tone value DTrp for the pixel group, the diffusion error ERdf that has accumulated is read (Step s204), and the pixel group tone value DTrp is calculated while taking the diffusion error ERdf into account in Step S206.

When diffusing the diffusion error ERdf, the error may be diffused to pixels in certain locations in the pixel groups instead of to the surrounding pixel groups. That is, compensating image data can be determined by calculating the diffusion error ERdf in image data allocated to pixels in certain positions, and the average image data of pixel groups calculated with the compensation image included can be used as the pixel group tone value.

B-5. Process for Determining Pixel Position in the First Embodiment

Figure 19:
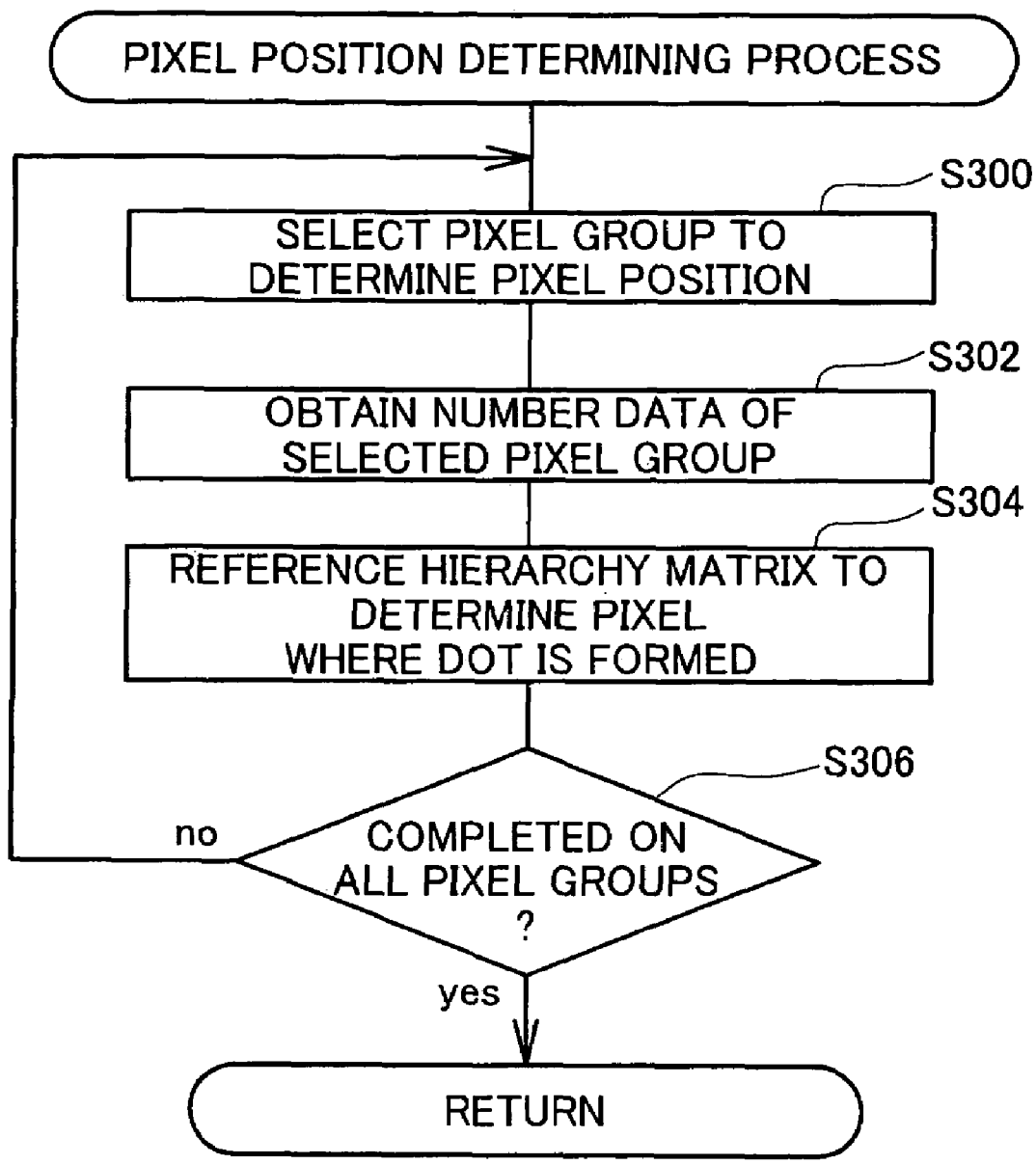
FIG. 19 is a flow chart of the process for determining pixel position in the first embodiment.

The following is a description of the process for determining pixel positions where dots are formed in pixel groups based on the number data in the image printing process of the first embodiment described above. FIG. 19 is a flow chart of the process for determining pixel position in the first embodiment. This is a process carried out by the CPU in the control circuit 260 of the color printer 200. The process for determining pixel positions in the first embodiment is described below according to the flow chart in FIG. 19 with reference to FIGS. 9a through 9d above. FIGS. 9a through 9d are used to describe the principles allowing pixel positions where dots are formed to be determined from the number data.

When the pixel position determining process is started, a pixel group targeted for processing is first selected (Step S300), and the number data of the pixel group is obtained (Step S302). Here, the number data illustrated in FIG. 9a is given. The first pixel group in the upper left corner of FIG. 9a is selected as the pixel group targeted for processing. In this case, 131 is obtained as the number data of the selected pixel group in Step S302 of FIG. 19.

The pixel positions where dots are formed in the pixel group are then determined by referencing an order table (Step S304). An order matrix is a matrix indicating the likelihood of dots being formed on each pixel in the pixel group, as illustrated in FIG. 9d. Because the pixel group targeted for processing here is the first pixel group in the upper left corner of the image, the order matrix refers to a corresponding location matrix (namely, the matrix of 8 pixel segments in the upper left corner in FIG. 9d). Because the number data is "3," the likelihood of dots being formed in the order matrix is concluded to be that dots will be formed on the first through third pixels. As a result, the pixel locations where dots will be formed in the pixel group targeted for processing are determined to be the first pixel in the upper left corner, the pixel that is two to the right from there, and the pixel that is three to the right from there and down, as illustrated in the first pixel group in the upper left corner in FIG. 9c. In FIG. 9c, the pixels where dots will be formed are indicated by diagonal lines. In Step S304 in FIG. 19, the pixel positions where dots will be formed are determined based on the number data while referencing the order matrix in this way.

In the description here, the pixel position is determined with reference to the order matrix. However, as described previously in FIGS. 9a through 9d, a dither matrix is the same as an order matrix in terms of showing the order of the pixels in the pixel groups. A dither matrix may thus be referenced instead of an order matrix.

When the pixel positions for the selected pixel group have been determined in this manner in Step S300, it is determined whether or not the process has been completed on all pixel groups (Step S306 in FIG. 19). When unprocessed pixel groups remain (Step S306: No), the process returns to Step S300, a new pixel group is selected, and the series of steps is repeated. The process is repeated until the number data shown in FIG. 9a has been converted to data indicating the pixel positions where dots are formed as illustrated in FIG. 9c. When the process has been completed on all the pixel groups (Step S306: Yes), the pixel position determining process in FIG. 19 is complete, and the process returns to the image printing process in FIG. 5.

The process for producing number data (Step S106 in FIG. 5) and the process for determining pixel positions (Step S108 in FIG. 5) in the process for printing images in the first embodiment have been described in detail. In the number data producing process described above, a certain number of pixels are assembled into pixel groups, and number data is produced for each pixel group. The number data can be produced based on the classification codes and pixel group tone values by referencing a number data producing table. The number data is extremely easy to produce because the classification codes and pixel group tone values can be easily determined. The number data produced in this way can be produced in far lower quantities than data representing the dot on-off state on a per-pixel basis, and the data can thus be output extremely rapidly from the computer 100 to the color printer 200. That is, the number data can be produced and output rapidly in the above number data producing process, allowing images to be printed that much more rapidly.

In the process for producing number described above, tone error occurring in each pixel group as a result of the production of the number data is diffused to surrounding pixel groups, and when number data is produced for the surrounding pixel groups, the number data is produced in such a way that the diffused error is eliminated. The tone error produced as a result of the production of the number data can thus be rapidly eliminated, and the picture quality can be improved. Furthermore, as described with reference to FIGS. 17a through 17d, the pattern in which the tone error occurs as pixel groups are switched changes in a complex manner, with no danger of the number data being produced in a constant pattern and having an adverse effect on picture quality.

In addition, the process for producing number data is merely a process for referencing a conversion table, and the classification codes and pixel group tone values used to reference the conversion table can be determined by an extremely simple process, allowing the process to be carried out at a sufficiently practical speed even when using a machine that is not equipped with a high data processing capacity such as the computer 100.

B-6. Variants

There are a number of variants of the process for producing number data in the first embodiment. These variants are briefly described below.

B-6-1. First Variant

In the process for producing number data in the first embodiment described above, the number data is obtained based on the pixel group classification and pixel group tone value DTrp by referencing a number data producing table. The pixel group tone values DTrp are also converted to number data to calculate the tone error ER occurring in the pixel groups and diffuse the error to the surrounding pixel groups. However, the tone error ER can be calculated if the pixel group tone value DTrp and number data are known, and the number data can be determined by referencing the number data producing table if the classification codes and pixel group tone values DTrp are known. In light of this, the tone error ER occurring in the pixel groups is already determined when the pixel group classification codes and pixel group tone levels DTrp are determined. In other words, when the pixel group classification codes and pixel group tone values are known, not only the number data but also the tone error ER occurring in the pixel groups has been determined. Not only can the tone error ER thus be calculated from the number data as in the first embodiment described above, but the tone error ER can also be recorded in the number data producing table, and the table can be referenced to obtain the tone error ER at the same time as the number data.

Figure 20:
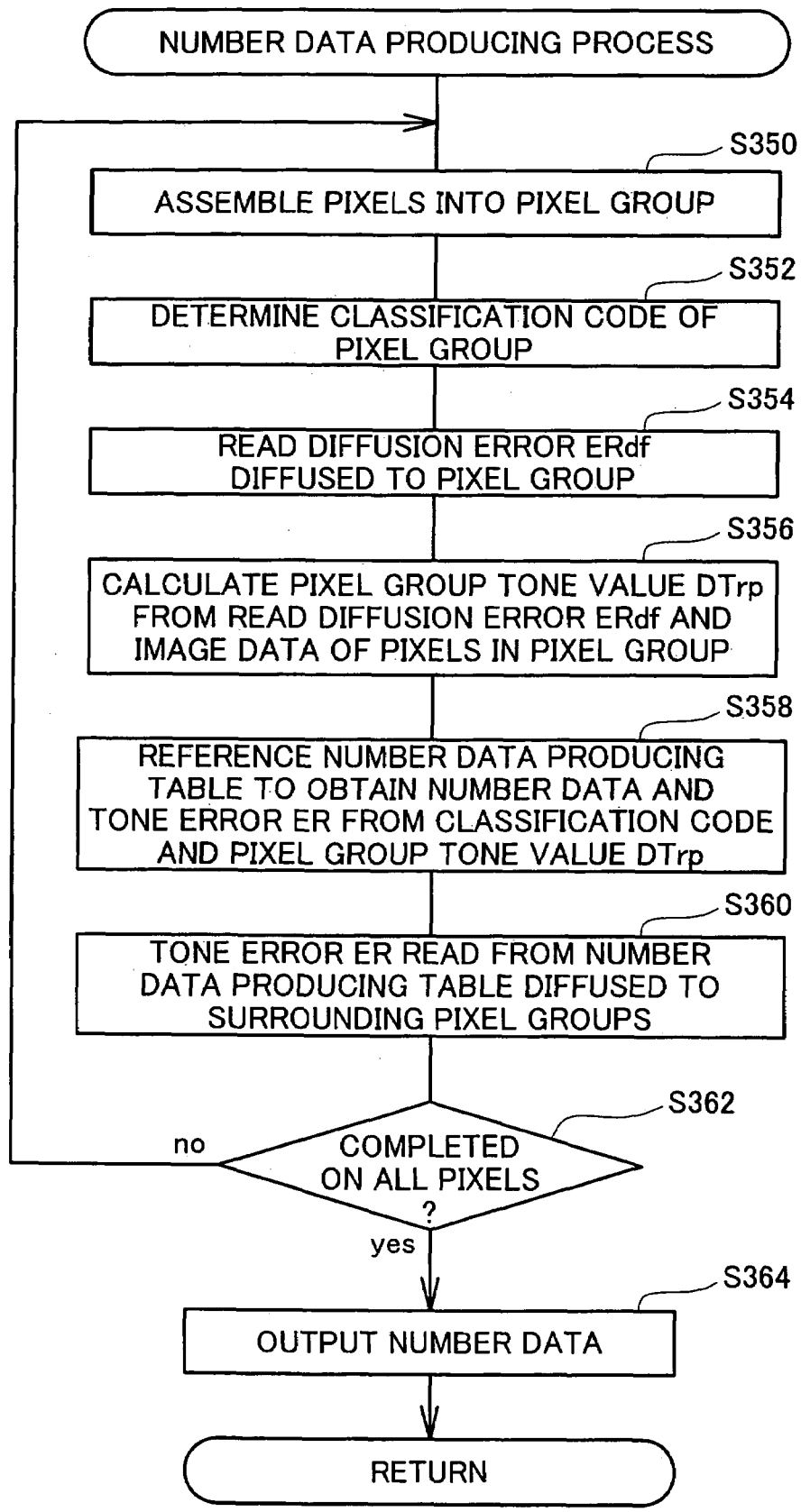
FIG. 20 is a flow chart of the process for producing number data in a first variant.

FIG. 20 is a flow chart of the process for producing number data in the first variant. The process for producing number data in the first variant differs significantly from the number data producing process of the first embodiment illustrated in FIG. 10 in that the number data and tone error ER are obtained at the same time by referencing a number data producing table. The process for producing number data in the first variant is briefly described below focusing on this difference.

When the process for producing number data in the first variant is started, a certain number of mutually adjacent pixels are assembled to produce pixel groups, and the classification codes of the pixel groups are then determined (Steps S350 and S352). The diffusion error ERdf that has been diffused to the pixel groups is read to calculate the pixel group tone value DTrp (Steps S354 and S356). As these processes are the same as in the first embodiment described above, they will not be further elaborated here.

The number data for the pixel group and the tone error ER occurring in the pixel group are then obtained based on the determined classification code and pixel group tone value by referencing the number data producing table (Step S358). The number data for combinations of classification codes and pixel group tone values was recorded in the number data producing table of the first embodiment in FIG. 15, but the tone error ER which has already been calculated is recorded in addition to the number data in the table that is referenced in the number data producing process in the first variant. Thus, in Step S358, the pixel group number data and the tone error ER are obtained at the same time based on the pixel group classification codes and pixel group tone values DTrp by referencing the number data producing table.

The tone error ER that has been obtained is then diffused to surrounding pixel groups (Step S360), and it is determined whether or not all the pixels in the image have been processed (Step S362). When unprocessed pixels remain (Step S362: No), the process returns to Step S350 to produce new pixel groups, and the process is repeated. The process is repeated, and when all of the pixels are determined to have been processed (Step S362: Yes), the number data obtained for the pixel groups is output to the color printer 200 (Step S364), and the process for producing number data in the first variant shown in FIG. 20 is complete.

In the process for producing number data in the first variant described above, the pixel group number data and tone error ER can be simultaneously obtained by referencing the number data producing table. As it is thus not necessary to calculate the error, the number data can be produced even more rapidly.

B-6-2. Second Variant

In the various types of processes for producing number data described above, the tone error that occurs when the pixel group tone values are converted to number data is diffused to surrounding pixel groups. However, some rounded off error occurs when the pixel group tone value is calculated from the pixel group number data. Alternatively, rounded off error is also produced when the resolution of the image data supplied to the image processing device is greater than the resolution of the pixel group tone value. When the resulting rounded off error is diffused to surrounding pixel groups and the pixel group tone values of the surrounding pixel groups are calculated, this may be taken into account. The process for producing number data in the second variant is briefly described below.

Figure 21:
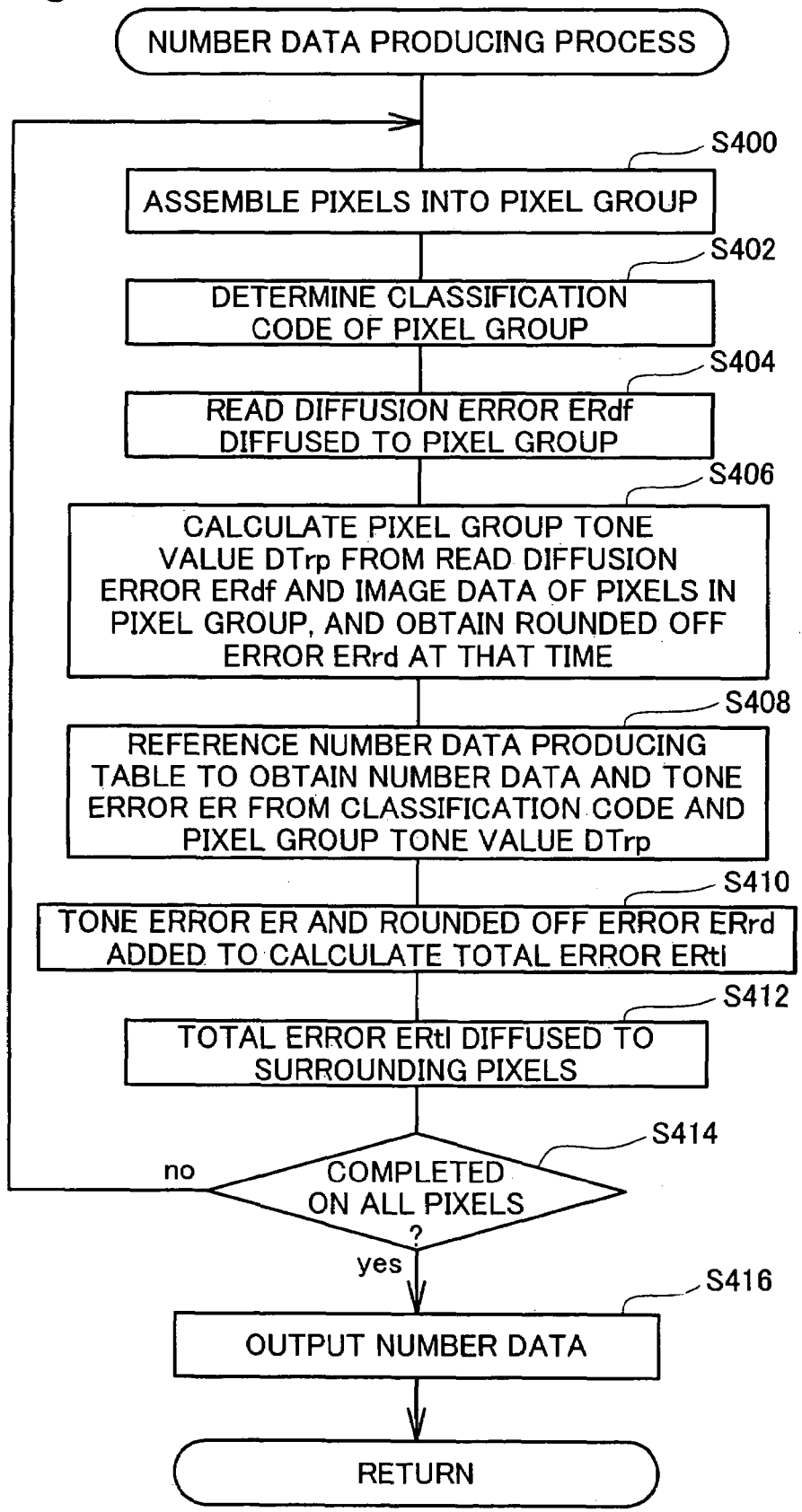
FIG. 21 is a flow chart of a process for producing number data in a second variant.

FIG. 21 is a flow chart of a process for producing number data while rounded off error produced during the calculation of the pixel group tone value is diffused to surrounding pixel groups in the second variant. The process for producing number data in the second variant differs from the number data producing process of the first variant in that rounded off error ER is diffused in addition to the tone error ER occurring in the pixel groups. The process for producing number data in the second variant is briefly described below focusing on this difference.

In the second variant, when the number data producing process is started in the same manner as in the first variant, a certain number of mutually adjacent pixels are assembled into pixel groups, and the classification codes of the pixel groups are then determined (Steps S400 and S402). The diffusion error ERdf diffused to the pixel groups is read (Step S404). The diffusion error ERdf read at this time is different in that the tone error ER occurring in the pixel groups in the above embodiments is the diffused error, whereas in the second variant, the total error ERtl includes the rounded off error ERrd described below in addition to the tone error ER.

The diffusion error ERdf and the image data of the pixels in the pixel group are then used to calculate the pixel group tone value DTrp of the pixel group, and the rounded off error ERrd produced during the calculations is obtained (Step S406). The method for calculating the pixel group tone value DTrp from the diffusion error ERdf and the image data of the pixels is the same as in the above embodiments. In the second variant, however, in conjunction with the calculation of the pixel group tone value DTrp, the rounded off error ERrd which occurs during the multiplication for calculating the pixel group tone value DTrp is obtained.

The number data for the pixel group and the tone error ER occurring in the pixel group are then obtained based on the determined classification code and pixel group tone value by referencing the number data producing table (Step S408). Here, in the second variant, because the rounded off error ERrd occurring during the calculation of the pixel group tone value DTrp is taken into consideration, rounded off error ERrd is produced in addition to the tone error ER in the pixel group. When the tone error ER is obtained by referencing the number data producing table in the number data producing process of the second variant, the rounded off error ERrd obtained earlier is added to the tone error ER so as to calculate the total error ERtl occurring in the pixel group (Step S410).

The total error ERtl that is thus obtained is diffused as the diffusion error ERdf to the surrounding pixel groups (Step S412). The proportion in which the total error ERtl is diffused should be pre-established in an error diffusion matrix. Because the value of the total error ERtl is relatively small for the same reasons that the tone error ER is relatively small, the total error ERtl can be diffused to just one adjacent pixel group rather than a plurality of pixel groups.

When the total error ERtl occurring in the pixel group, that is, the tone error ER and rounded off error ERrd, have been diffused to surrounding pixel groups, it is determined whether or not all the pixels in the image have been processed (Step S414). When unprocessed pixels remain (Step S414: No), the process returns to Step S400 to produce a new pixel group, and the process is repeated. When the process is repeated until the process is completed on all the pixels (Step S414: Yes), the number data obtained for the pixel groups is output to the color printer 200 (Step S416), and the number data producing process of the second variant illustrated in FIG. 21 is complete.

When, as described above, not only the tone error ER is diffused but the rounded off error ERrd produced during the calculation of the pixel group tone value is also diffused, number data which is that much more accurate in reflecting the number data can be produced, allowing the picture quality that is obtained to be improved.

Rounded off error ERrd occurs when the pixel group tone value ERrp is calculated in cases such as when the resolution of the input image data is higher than the resolution of the pixel group tone value. When the rounded off error ERrd is diffused to surrounding pixel groups and is reflected in the calculation of the pixel group tone value of the surrounding pixel groups, the insufficiency of the pixel group tone value resolution relative to the image data can be corrected, allowing smoother changes in gray scale to be expressed. Accordingly, when no pixel group tone error ER is diffused, the insufficient resolution can be compensated to improve the picture quality by diffusing just the rounded off error ERrd.

C. Second Embodiment

The first embodiment described above was a type in which dots could be formed by the color printer 200. However, widespread use has recently been made of printers capable of printing many types of dots (referred to as variable dot printers) such as dots of different size or dots with different ink concentrations for the purpose of improving printed picture quality. The invention of the present application can also provide substantial effects when applied to such variable dot printers.

C-1. Image Printing Process of Second Embodiment

The flow chart of the image printing process in the second embodiment is the same as the image printing process of the first embodiment illustrated in FIG. 5. An over view of the image printing process in the second embodiment is described briefly with reference to the flow chart in FIG. 5.

When the image printing process of the second embodiment is started, the computer 100 first reads the image data and then carries out a color conversion process (Steps S100 and S102 in FIG. 5). A resolution conversion process is then carried out to convert the resolution of the image data to the printing resolution (corresponding to Step S104), and the number data producing process is then started (corresponding to Step S106).

As described above, the first embodiment was a type in which dots could be formed by the color printer 200, and in the number data producing process, number data representing the number of dots formed in the pixel groups was produced for each pixel group and output to the color printer 200. By contrast, in the second embodiment, the color printer 200 is capable of forming three types of dots of various sizes, such as large, medium, and small dots. To deal with this, in the number data producing process of the second embodiment, the number data that is produced represents the number of large, medium, and small dots formed in the pixel groups. As described in further detail below, the number of large, medium, and small dots is not output as such but is output while encoded so as to more efficiently output the number data in lower data quantities. The process for producing number data in the second embodiment is described in further detail below.

The process for determining pixel position begins when the CPU in the control circuit 260 of the color printer 200 receives the number data from the computer 100 (corresponding to Step S108 in FIG. 5). Although elaborated in greater detail below, in the pixel position determining process of the second embodiment, the number data that is supplied while encoded is decoded into data representing the number of large, medium, and small dots, and the pixel positions where the dots are to be formed re then determined.

When the pixel positions where the large, medium, and small dots are to be formed have thus been determined, the dots are formed at the determined positions (corresponding to Step S110 in FIG. 5). Images corresponding to the image data are thus printed upon the formation of large, medium, and small dots.

C-2. Process for Producing Number Data in Second Embodiment

The process for producing number data encoding the number of large, medium, and small dots formed in pixel groups during the image printing process of the second embodiment is described next. As described below, the encoded number data can also be extremely easy to produce based on the pixel group classification codes and pixel group tone values by referencing a conversion table. To explain the reasons making this possible, the process by which dithering is used to determine the number of large, medium, and small dots formed in pixel groups will first be described briefly. The process for encoding the number of large, medium, and small dots will then be described, and the process for carrying out the number data producing process of the second embodiment will then be described in detail.

Figure 22:
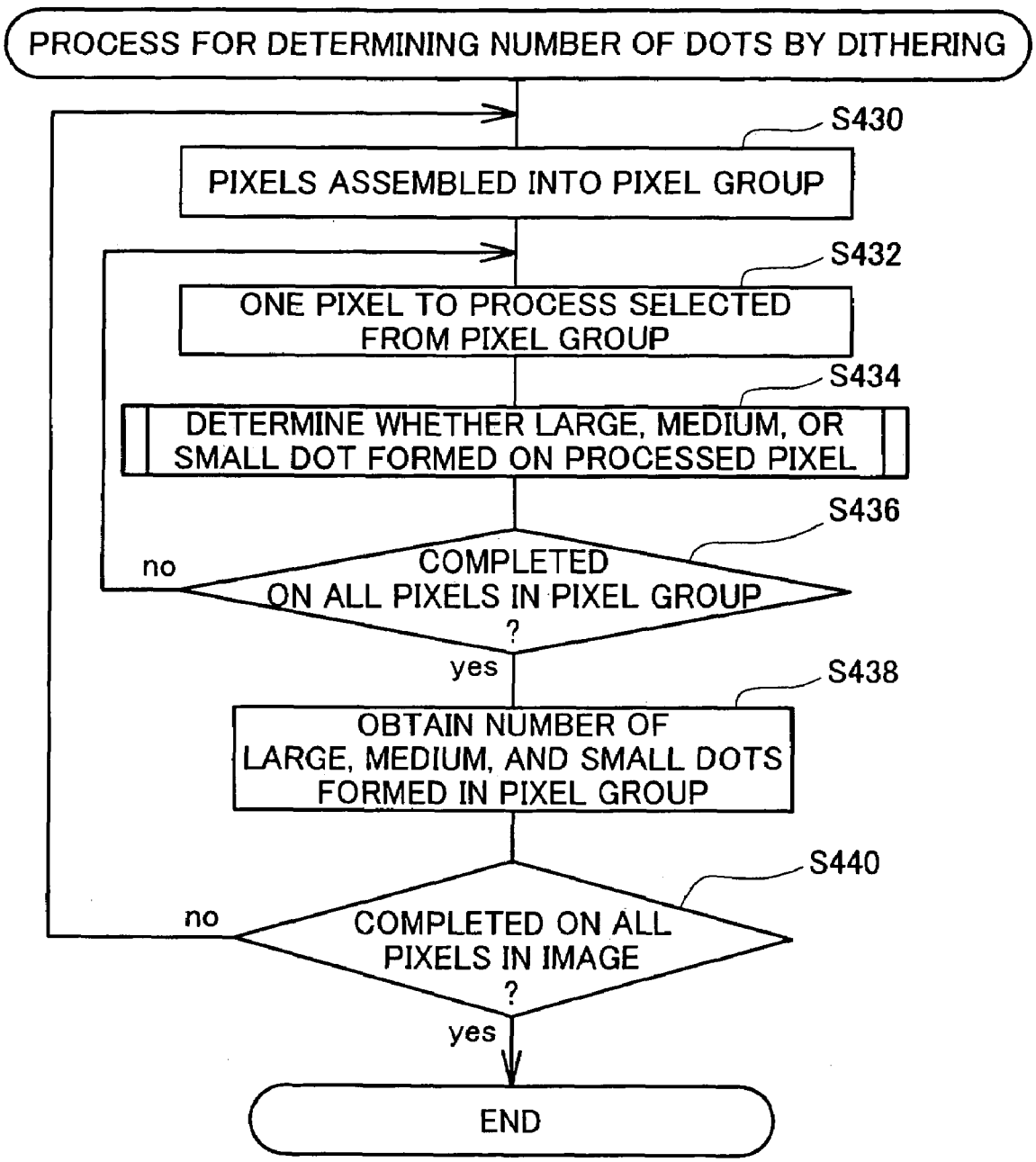
FIG. 22 is a flow chart of a process in which the numbers of large, medium, and small dots formed in pixel groups are determined using the dithering method.

C-2-1. Process Using Dithering Method to Determine Number of Large, Medium, and Small Dots Formed FIG. 22 is a flow chart of a process in which the numbers of large, medium, and small dots formed in pixel groups are determined using the dithering method. Details of the process are disclosed in U.S. Pat. No. 3,292,104. To determine the numbers of large, medium, and small dots, a certain number of mutually adjacent pixels are first assembled into pixel groups when the process is begun (Step S430). Here, a total of 8 pixels are assembled from 4 pixels in the main scanning direction and 2 pixels in the sub-scanning direction to form pixel groups in the same manner as in the previous embodiments.

A pixel group targeted for process is then selected in order to determine whether or not dots are formed in a pixel group (Step S432), and it is determined whether or not large, medium, and small dots are formed on the selected pixels being processed (Step S434). The formation of large, medium, and small dots is determined in the following manner.

Figure 23:
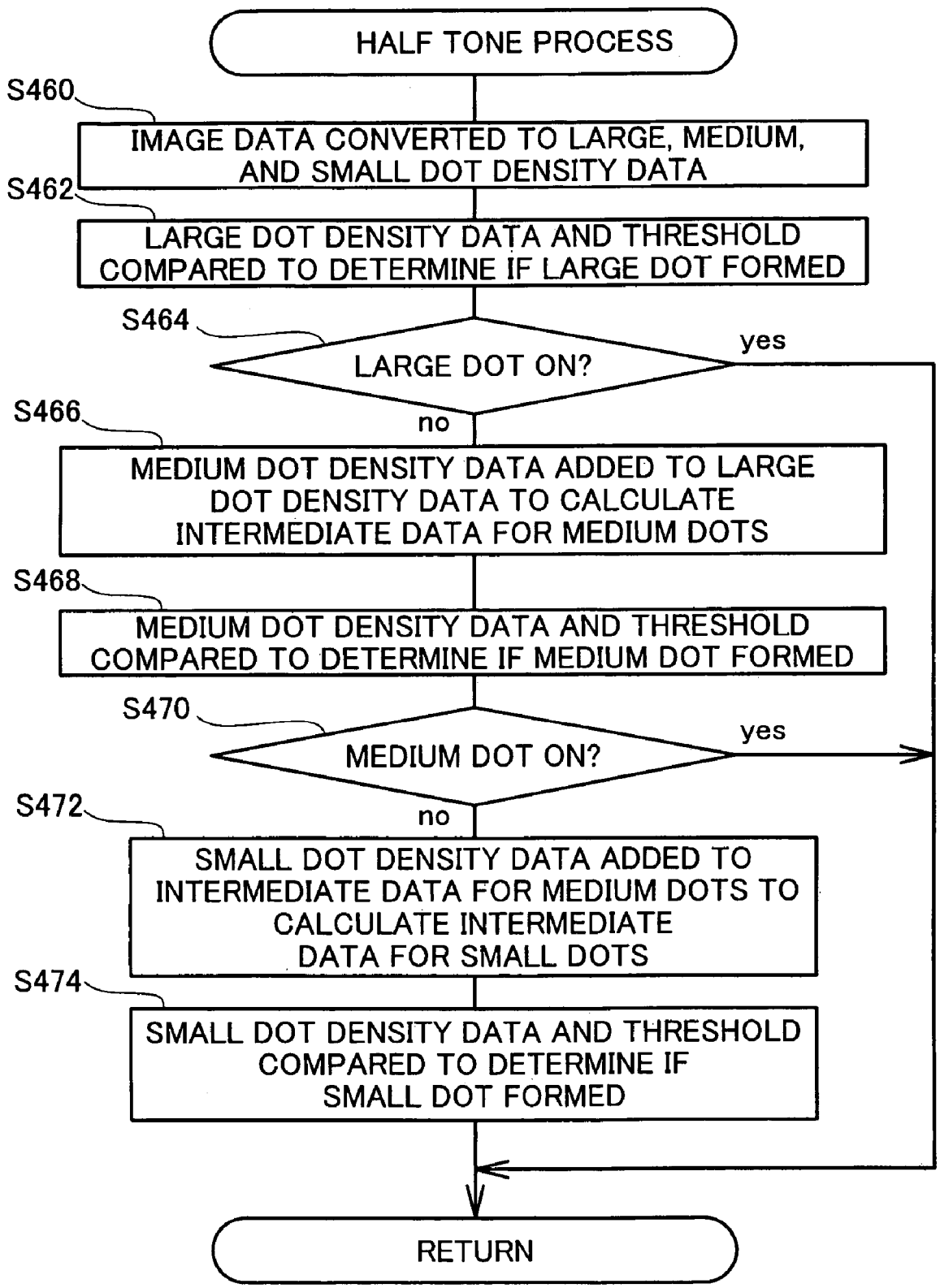
FIG. 23 is a flow chart of a process for determining whether or not large, medium, and small dots are formed by implementing a halftone process on a selected pixel.

FIG. 23 is a flow chart of a process for determining whether or not large, medium, and small dots are formed by implementing a halftone process on a selected pixel. When the half tone process of the large, medium, and small dots is begun, the image data for the pixels targeted for processing is first converted to density data on each of the large, medium, and small dots (Step S460). Here, density data is data representing the density with which dots are formed. Dots are formed with higher density the greater the tone value. For example, a density data tone value of 255 indicates a dot-forming density of 100%, namely, that dots are formed on all pixels. A density data tone value of 0 indicates a dot-forming density of 0%, namely, that no dots are formed on any pixels. The conversion to density data can be done by referencing a number table referred to as a dot density conversion table.

Figure 24:
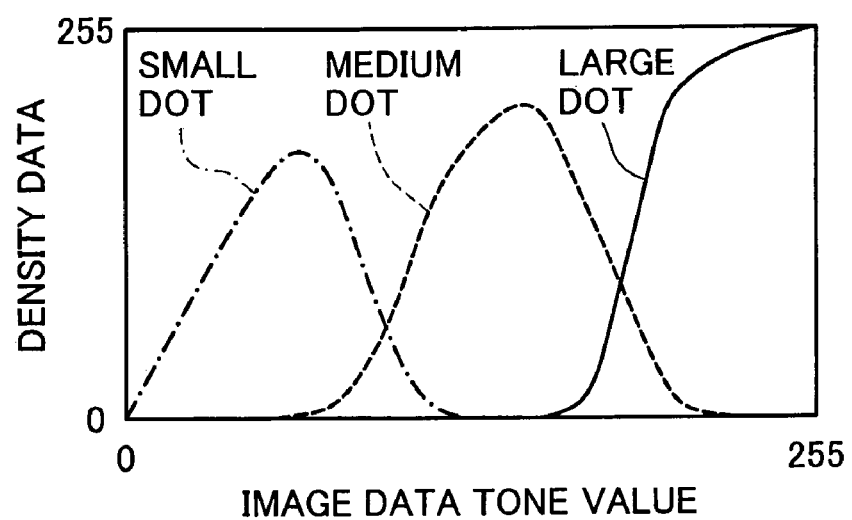
FIG. 24 schematically illustrates a dot density conversion table which is referenced when converting the tone values of image data to density data for large, medium, and small dots.

FIG. 24 schematically illustrates a dot density conversion table which is referenced when converting the tone values of image data to density data for large, medium, and small dots. As illustrated, in the dot density conversion table, density data for small, medium, and large dots is established relative to the image data tone values obtained by color conversion. The density data for medium and large dots are both established at a tone value of 0 in areas where the image data is around a tone value of 0. The density data for small dots increases as the image data tone value increases, but when the image data reaches a certain tone value, the density data begins to decrease, and instead the medium dot density data begins to increase. When the image data tone values increases further, reaching a certain tone value, the small dot density data has a tone value of 0, and the medium dot density data beings to decrease, while the large dot density data instead goes on increasing a little at a time. In Step S460 of FIG. 23, image data tone values are converted to large dot density data, medium dot density data, and small dot density data as the dot density conversion table is referenced.

When the large, medium, and small dot density data have thus been obtained for the pixels targeted for processing, it is first determined whether or not large dots are formed (Step S462 in FIG. 23). The determination can be made by comparing the large dot density data and the threshold of the dither matrix established for the corresponding position of the pixel targeted for processing. When the density data is greater, it is determined that a large dot is formed on the pixel targeted for processing. When it has been determined that a large dot is formed, "Yes" is determined in Step S464, the half tone process is dropped, and the process returns to the process for determining the number of dots in FIG. 22.

When, on the other hand, the threshold is greater than the large dot density data, it is determined in Step S462 that a large dot is not formed on the pixel targeted for processing. As a result, when no large dot is formed, "No" is determined in Step S464, and the process for determining whether or not a medium dot is formed then starts. To determine whether or not a medium dot is formed, the large dot density data and medium dot density data are added to calculate the intermediate data for medium dots (Step S466). The resulting intermediate data for medium dots and the dither matrix threshold are compared to determine whether or not a medium dot is formed (Step S468). When the intermediate data for medium dots is greater, it is determined that a medium dot is formed on the pixel targeted for processing. When the results indicate that a medium dot is formed, "Yes" is determined in Step S470, the half tone process is dropped, and the process returns to the process for determining the number of dots in FIG. 22.

When, on the other hand, the threshold is greater than the medium dot density data, it is determined in Step S468 that a medium dot is not formed on the pixel targeted for processing. As a result, when no medium dot is formed, "No" is determined in Step S470, and the process for determining whether or not a small dot is formed then starts. To determine whether or not a small dot is formed, the intermediate data for medium dots and the small dot density data are added to calculate the intermediate data for small dots (Step S472). The resulting intermediate data for small dots and the dither matrix threshold are compared to determine whether or not a small dot is formed (Step S474). When the intermediate data for small dots is greater, it is determined that a small dot is formed on the pixel targeted for processing, and when the threshold is greater than the intermediate data for small dots, it is determined that no dots are formed. As the above process can be carried out to determine whether large, medium, or small dots are formed on a pixel targeted for processing, or to determine if no dots are formed, the half tone process in FIG. 23 is dropped, and the process returns to the process for determining the number of dots in FIG. 22.

Figure 25:
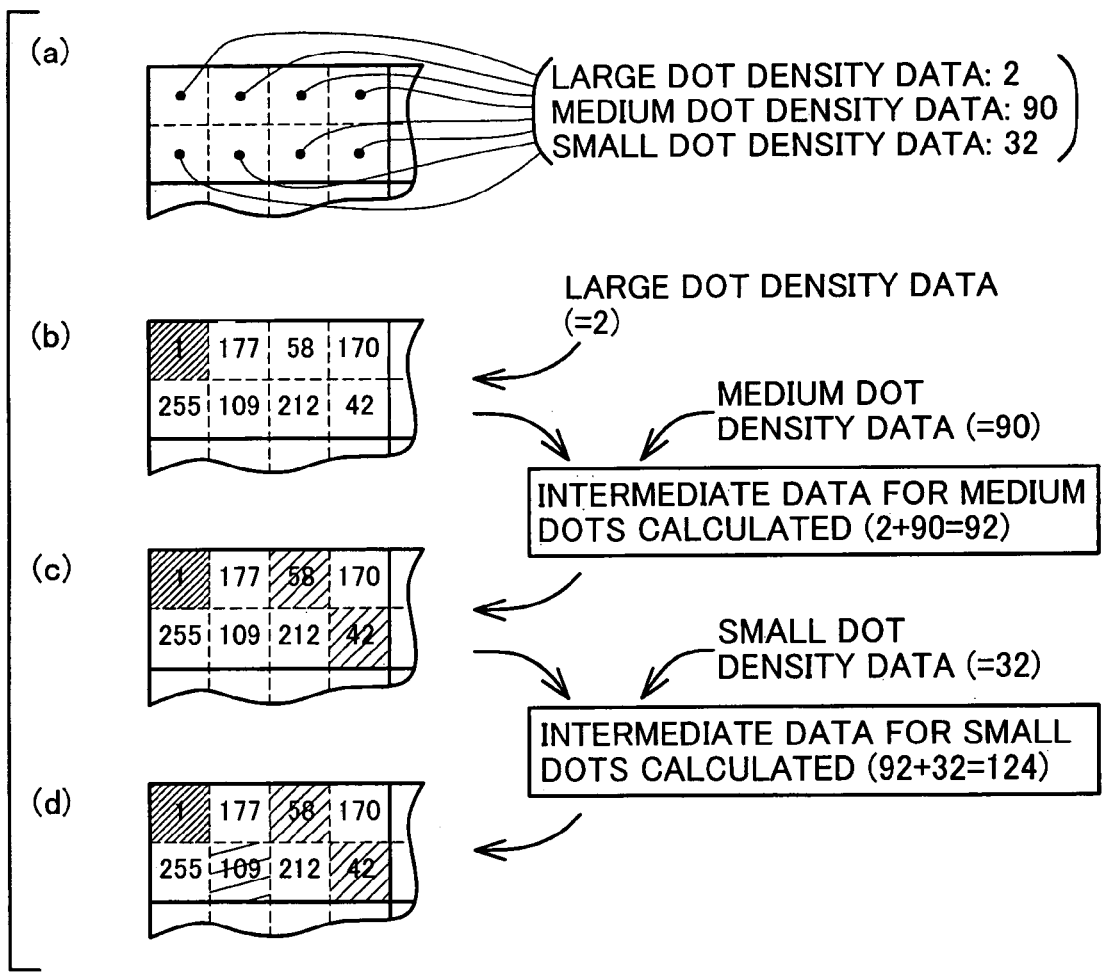
FIG. 25 schematically illustrates the way in which it is determined whether or not large, medium, and small dots are formed while applying the dithering method to each pixel in a pixel group.

FIG. 25 will be referenced to elaborate on the way in which it is determined whether or not large, medium, or small dots are formed while carrying out the above process. FIG. 25 schematically illustrates the way in which it is determined whether or not large, medium, and small dots are formed while applying the dithering method to each pixel in a pixel group. Here, in order to avoid complicating the description, all the pixels in the pixel group have the same tone value, and the density data of the large, medium, and small dots thus have the same tone values. FIG. 25(a) shows the density data of large, medium, and small dots obtained for each pixel in a pixel group, where the large dot density data of all the pixels is 2, the medium dot density data is 90, and the small dot density data is 32.

FIG. 25(b) shows the thresholds for the corresponding positions in the pixel group in a dither matrix. When it is determined whether or not a large dot is formed, the large dot density data and the thresholds are compared. Since the large dot density data for all the pixels here is 2, the pixel in which the threshold is 1 is determined to be the only pixel where a large dot is formed. In FIG. 25(b), fine diagonal lines indicate the pixel determined to be where a large dot is formed. It can be concluded that either medium or small dots are formed on the other pixels, or that no dots are formed. It is then determined whether or not medium dots are formed.

When determining whether or not a medium dot is formed, the large dot density data 2 and medium dot density data 90 are added to calculate the intermediate data for medium dots, and the resulting intermediate data 92 is compared with the dither matrix thresholds. As a result, it is determined that medium dots are formed on only two pixels, which are the pixel in which the threshold is 42 an the pixel in which threshold is 58. In FIG. 25(c), the somewhat coarser diagonal lines indicate pixels determined to be where medium dots are formed. It is then concluded that either small dots or no dots at all are formed on pixels where no large or medium dots are formed. The small dot density data 32 is then added to the intermediate data 92 for medium dots to calculate the intermediate data for small dots, and the resulting intermediate data 124 is compared with the dither matrix thresholds. It is thus determined that a small dot is formed only on the pixel in which the threshold is 109. In FIG. 25(d), the coarse diagonal lines indicate the pixel where the small dot is formed.

In Steps S432 through 436 of the process for determining the number of dots illustrated in FIG. 22, intermediate data is calculated in the foregoing manner for each of the pixels in the pixel group to determine whether or not large, medium, or small dots are formed. When determinations have been made for all the pixels in the pixel group (Step S436: Yes), the number of large, medium, and small dots formed in the pixel group is obtained (Step S438). One large dot, two medium dots, and one small dot are formed in the pixel group illustrated in FIG. 25.

When the number of large, medium, and small dots formed in the pixel group has been obtained, sit is determined whether or not the above process has been carried out on all the pixels of the image (Step S440). When unprocessed pixels remain, the process returns to Step S430 and the process is repeated until it is determined that the process has been completed on all the pixels of the image, and the process for determining the number of dots by dithering illustrated in FIG. 22 is complete. the image data is thus divided into a plurality of pixel groups, and the number of large, medium, and small dots formed in each pixel group is obtained. FIG. 26 schematically illustrates the way in which the numbers of large, medium, and small dots formed in each pixel group are obtained.

C-2-2. Process for Encoding Number of Large, Medium, and Small Dots Formed

When the number of dots for each pixel group has been determined in the manner above, the number of dots that has been determined is encoded and output to the printer. That is, when dots comes in the three types of large, medium, and small as illustrated in FIG. 26, for example, three dot numbers at a time must be output for each pixel group in the output of the number formed per type of dot. This will cancel the effect of printing images more rapidly through the rapid output of data from the computer 100 to the color printer 200. The numbers of dots therefore are not output individually, but combinations of the number of each dot, for example, combinations of (K large dots, L medium dots, and N small dots) are converted to individual codes established for each combination, and the resulting codes are output.

The process for encoding the combinations of large, medium, and small dots is carried out by referencing a correspondence table in which combinations of numbers of dots are allotted to code data. FIG. 27 illustrates a correspondence table in which code data is allotted to combinations of numbers of large, medium, and small dots formed in pixel groups. In the correspondence table given as an example in FIG. 27, for example, code data 0 is allotted to the combination in which the number of large, medium, and small dots is 0. Code data 1 is allotted to the combination of 0 large dots, 0 medium dots, and 1 small dot. In this way, unique code data is pre-assigned to each combination of dot numbers in the correspondence table.

The number of combinations of numbers of large, medium, and small dots is as follows. Although a dot which is any of a large, medium, or small dot can be formed on each pixel in a pixel group, a plurality of dots cannot be formed on one pixel, and the total number of dots therefore cannot exceed the number of pixels in the pixel group (8 in the above embodiments). The combination of numbers of large, medium, and small dots is therefore equal to the number of combinations when making 8 selections, including overlapping, from the four states in which "a large dot is formed," "a medium dot is formed," "a small dot is formed," and "no dots are formed," and can thus be determined by $4H8(=4+8-1C8)$, resulting in 165 combinations. Here, nHr is an operator for determining the number of combinations (number of overlapping combinations) that are obtained when making r number of selections, including overlapping, from n types of objects. In addition, nCr is an operator for determining the number of combinations that are obtained when making r number of selections, not including overlapping, from among n types of objects.

Because there are thus 165 combinations of numbers of large, medium, and small dots, there should also be 165 kinds of code data, from 0 to 164. With 165 kinds, data length of 8 bits can be expressed. As a result, the number of each type of dot formed in a pixel group can be output simply by means of the single output of 8-bit encoded number data rather than outputting three separate times a number of large dots, a number of medium dots, and a number of small dots. The number data can be rapidly supplied to permit rapid printing of images by converting the combination of numbers of dots obtained for each pixel group as shown in FIG. 26 to number data that has been encoded while referencing the corresponding table such as the one in FIG. 27, and sending the encoded data to the printer.

C-2-3. Process for Producing Number Data in Second Embodiment

The above description was of what can be referred to as a two-step process, where the number of large, medium, and small dots formed in a pixel group are determined by dithering, and the resulting combination of dot numbers is encoded and then sent to the printer. However, in the process for producing number data in the second embodiment, the number data producing table is referenced to convert the pixel group image data directly to encoded number data which is then output to the color printer 200. The number data can thus be produced extremely rapidly, and the process for producing number data is extremely simple.

Furthermore, in the process for producing number data in the second embodiment, tone error occurring in pixel groups when the number data is produced is diffused to surrounding pixel groups in the same manner as in the first embodiment, allowing error to be rapidly eliminated and thus better picture quality to be obtained. The process for producing number data in the second embodiment is described below.

Figure 28:
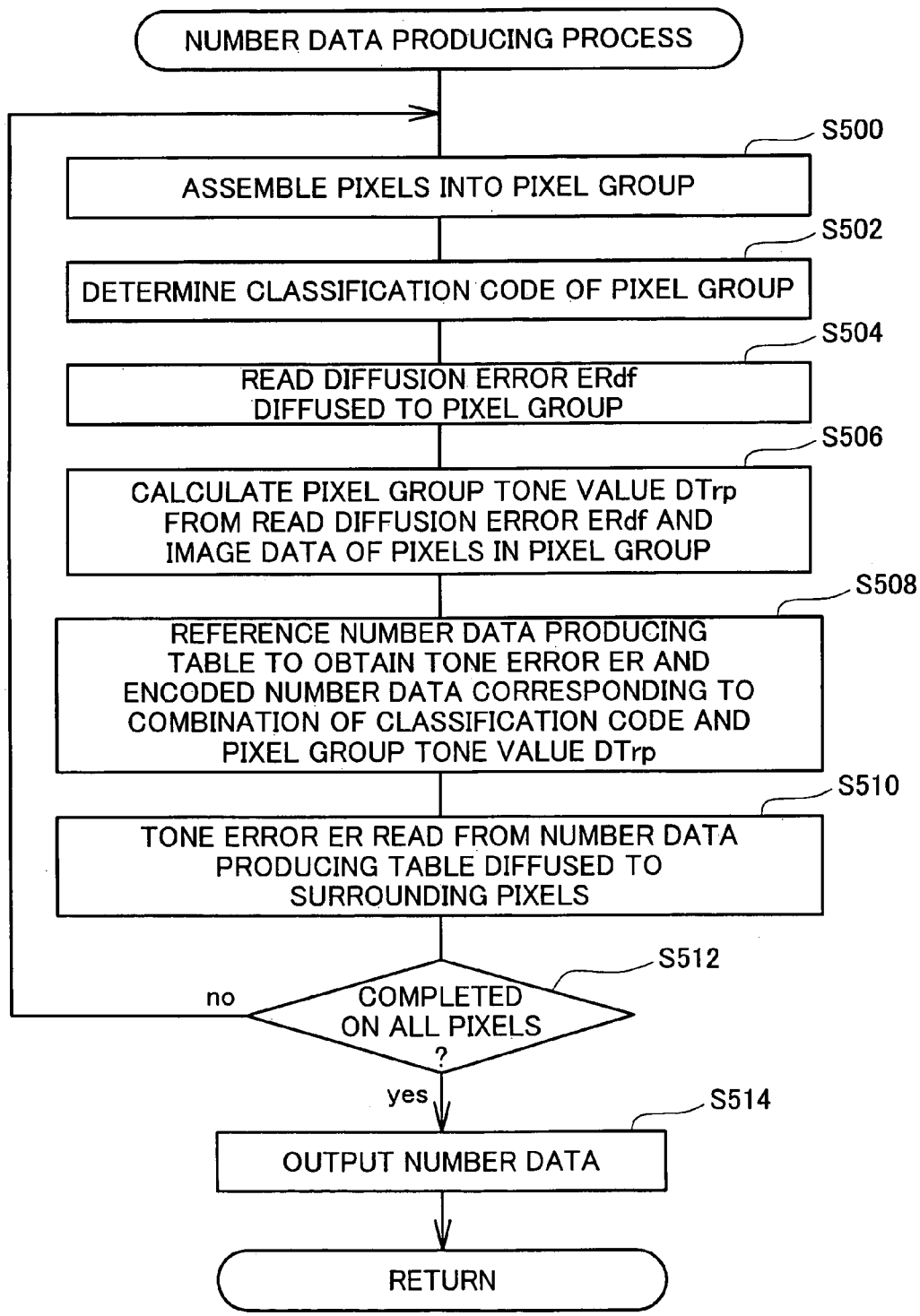
FIG. 28 is a flow chart of a process for producing number data in a second embodiment.

FIG. 28 is a flow chart of a process for producing number data in the second embodiment. The following is a description of the number data producing process of the second embodiment being run on the computer 100, but as the number data producing process of the second embodiment can be done in an extremely easy manner in the same way as the first embodiment, it can also be run by the color printer 200 or digital camera 120. The flow chart is referenced in the following description.

When the process for producing number data in the second embodiment is started, a certain number of mutually adjacent pixels is assembled into pixel groups (Step S500). Here, a total of 8 pixels are assembled from 4 pixels in the main scanning direction and 2 pixels in the sub-scanning direction to form pixel groups in the same manner as in the previous embodiments. The pixel group classification codes are then determined (Step S502). The method for determining the pixel group classification codes is the same as in the first embodiment and therefore will not be further elaborated here. The diffusion error diffused to the pixel groups is then read (Step S504), and the pixel group tone value DT4rp is calculated from the read diffusion error ERdf and the image data of each pixel in the pixel group (Step S506). The method for calculating the pixel group tone value is the same as in the first embodiment, and therefore will not be further elaborated here.

The coded number data and tone error ER are then obtained from the pixel group classification codes and pixel group tone values by referencing the number data producing table (Step S508). As described above, tone error ER is tone expression error occurring in pixel groups when the pixel group tone values are converted to number data, and can be calculated by subtracting the tone values expressed by the pixel group (expressed tone values) from the pixel group tone value when dots are formed in the pixel group according to the number data.

FIG. 29 schematically illustrates a number data producing table which is referenced in the process for producing number data in the second embodiment. As illustrated, encoded number data and tone error ER are allotted to combinations of pixel group classification codes and pixel group tone values and are pre-recorded in the number data producing table of the second embodiment. Thus, in the process for producing number data in the second embodiment, the pixel group classification codes and pixel group tone values are determined, and number data in an encoded state and the tone error ER can be directly determined simply by referencing the conversion table.

A process is then carried out to diffuse the tone error ER obtained at the same time as the number data to surrounding pixel groups (Step S510). That is, as noted above with reference to FIGS. 18*a* and 18*b*, the tone error ER is portioned off at a certain ratio to surrounding pixel groups for which no number data has yet been produced, and is accumulated in the form of diffusion error ERdf. The ratio in which the tone error ER is diffused to the pixel groups can be preset in the form of an error diffusion matrix. Of course, the tone error ER can also be portioned off to one pixel group, or can be diffused to pixels at certain positions in the pixel groups when the error is diffused to surrounding pixel groups, in the same manner as in the first embodiment. The diffusion error ERdf read out in Step S504 of FIG. 28 is diffusion error that has been diffused from the pixel groups and has accumulated, as noted above.

When the encoded number data has been produced for a pixel group and the resulting tone error has been diffused as noted above, it is determined whether or not the process has been completed on all the pixels of the image data (Step S512). When unprocessed pixels remain (Step S512: No), the process returns to Step S500, a new pixel groups is produced, and the process is repeated. When the process is repeated until it is determined that the process has been completed on all the pixels (Step S512: Yes), the encoded number data that has been obtained for each pixel group is output do the color printer 200 (Step S514), and the process for producing number data in the second embodiment illustrated in FIG. 28 is complete.

C-3. Process for Determining Pixel Position in Second Embodiment

Figure 30:
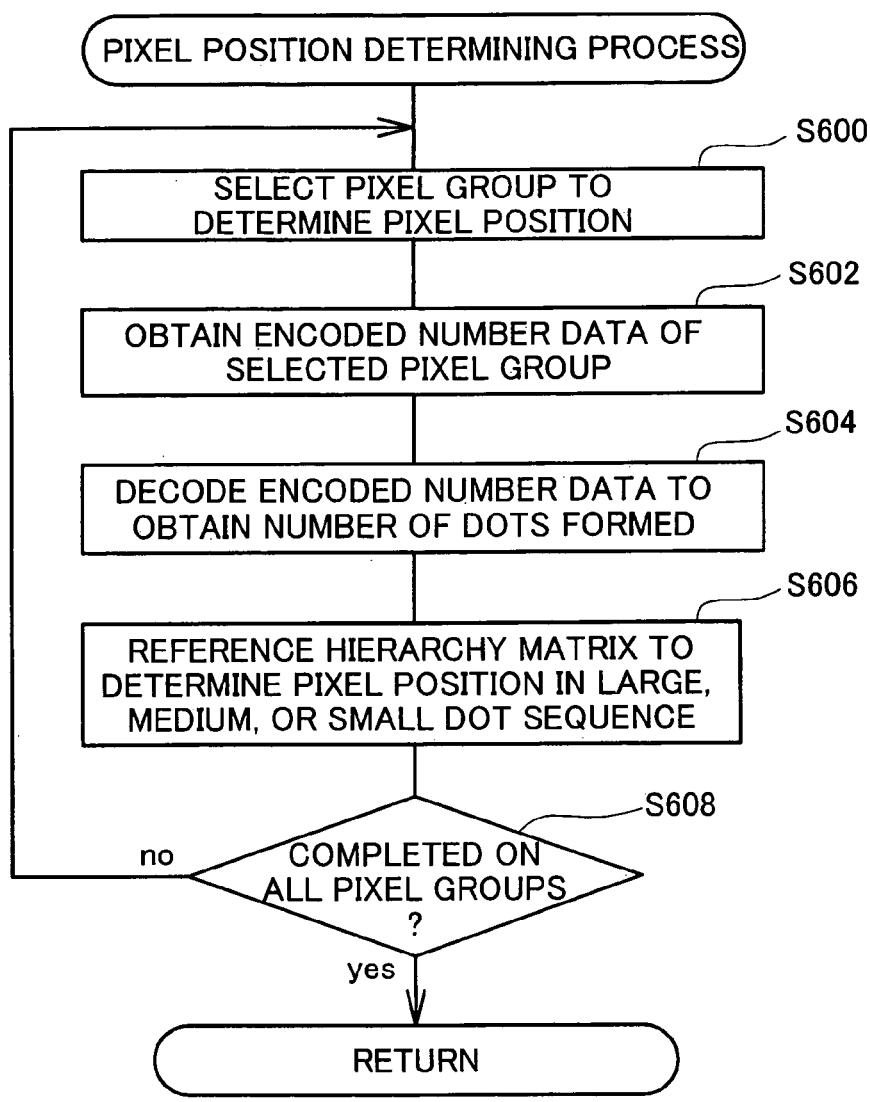
FIG. 30 is a flow chart of a process for determining pixel position in the second embodiment.

The following description is of a process for determining pixel positions where large, medium, and small dots are to be formed upon receipt of the encoded number data by the color printer 200 in the second embodiment. FIG. 30 is a flow chart of a process for determining pixel position in the second embodiment. This process is significantly different from the pixel position determining process in the first embodiment described above with reference to FIG. 19 in that the number data is decoded and converted to data representing the number of large, medium, and small dots that are formed, and that the pixel positions of the large, medium, and small dots are determined. The process for determining pixel positions in the second variant is described below focusing on these differences.

When the pixel position determining process of the second embodiment is started, a pixel group for which the pixel positions are to be determines is first selected (Step S600), and the number data for the pixel group is obtained (Step S602). The number data that has been obtained is data that has been encoded. The number data is then decoded and converted to data indicating the number of large, medium, and small dots (Step S604). The process for decoding the number data can be done while referencing a decoding table. FIG. 31 schematically illustrates a decoding table which is referenced to decode number data that has been encoded during the process for determining pixel position in the second embodiment.

As illustrated, combinations of numbers of large, medium, and small dots corresponding to the encoded number data are established in the decoding table. For example, encoded number data 1 is decoded to a combination of 0 large and medium dots and 1 small dot. In Step S604 in FIG. 30, the decoding table is referenced to convert the coded number data to data representing the number of large, medium, and small dots.

Figure 32:
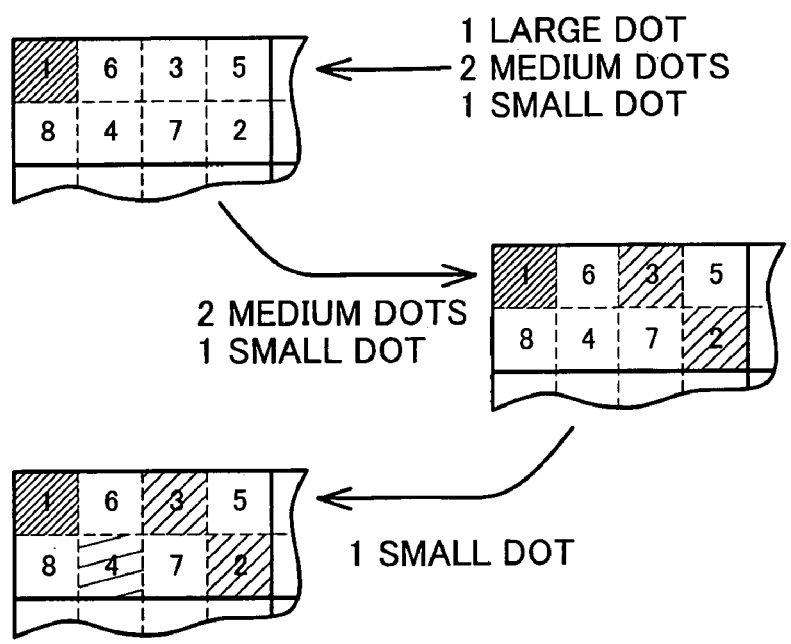
FIG. 32 schematically illustrates the way in which pixel positions for forming large, medium, and small dots are determined while referencing an order matrix.

In the following process, an order matrix in which positions corresponding to the pixel group of interest have been recorded is referenced to determine the pixel positions where dots are formed based on the number of large, medium, and small dots (Step S606). As noted in the example in FIG. 9d, the order matrix is a matrix indicating the likelihood of dots being formed on each pixel in the pixel group. FIG. 32 schematically illustrates the way in which pixel positions for forming large, medium, and small dots are determined while referencing the order matrix. For example, the number data can be decoded to obtain a combination in which there is 1 large dot, 2 medium dots, and 1 small dot.

The pixel positions where large dots are formed are first determined when determining pixel positions. Here, because there is 1 large dot, it is determined that a large dot is formed on the pixel where a dot is most likely to be formed, namely, the pixel with a sequence value of 1 in the order matrix. When there are N large dots, it is determined that large dots are formed in those pixels in which the sequence value of the order matrix ranges from 1 to N. In FIG. 32, the pixel position where the large dot is to be formed has been indicated by fine diagonal lines.

The pixel positions where medium dots are formed are then determined. Because a large dot is formed at the pixel position with the sequence value 1, the two medium dots are formed at the pixel positions with the sequence numbers 2 and 3. In FIG. 32, somewhat coarser diagonal lines indicate the pixel positions where medium dots are formed.

Lastly, the pixel positions where small dots are formed are determined. Because the large dot is formed at the pixel position with the sequence number 1 and medium dots are formed at the pixel positions with sequence numbers 2 and 3, the one small dot is formed at the pixel position with the sequence number 4. In FIG. 32, coarse diagonal lines indicate the pixel position where the small dot is formed. In Step S606 of FIG. 30, the pixel positions where dots are formed in the sequence of large, medium, and small dots are determined while referencing the order matrix in the manner described above.

When the encoded number data has thus been decoded for a pixel group and the pixel positions where large, medium, and small dots are formed have been determined, it is determined whether or not the process has been completed for all the pixel groups Step S608 in FIG. 30). When unprocessed pixel groups remain (Step S608: No), the process returns to Step S600, and the process is repeated on a new pixel group. When it is determined that the pixel positions have been determined in all the pixel groups (Step S608: Yes), the pixel position determining process in the second embodiment illustrated in FIG. 30 is dropped, the process returns to the image printing process, and the various dots are formed on printing paper. As a result, an image corresponding to the image data is printed.

In the above description, the encoded number data was decoded into data on the numbers of various types of dots. However, as noted above, because the pixel positions are determined in the sequence of large, medium, and small dots, the data may also be decoded into the number of large dots, the total number of large and medium dots, or the total number of large, medium, and small dots instead of the numbers of the various types of dots. In the example illustrated in FIG. 32, for example, 1 large dot and a total of 3 large and medium dots may be decoded, or a total of 4 large, medium, and small dots may be decoded, instead of 1 large dot, 2 medium dots, and 1 small dot.

FIG. 33 schematically illustrates a decoding table which is referenced to thus decode encoded number data. When decoded in this manner, the following process for determining pixel positions can be accelerated. With reference to the determination of pixel positions for medium dots in FIG. 32, because a total number of 3 large and medium dots is decoded, the pixels with sequence numbers from 1 to 3 are selected. The pixel where the other dot (large dot) has already been formed is excluded, and it is determined that medium dots are formed on the selected pixels.

When 1 large dot, 2 medium dots, and 1 small dot are decoded, the sequence values of the pixels where medium dots are formed depends on the number of large dots, and the sequence value of the pixel where the small dot is formed depends on the number of large and medium dots. Thus, when determining the pixel positions where medium and small dots are formed, pixels with suitable sequence numbers must always be selected while taking into consideration the number of large dots or the number of large and medium dots. On the other hand, when 1 large dot, a total of 3 large and medium dots, and a total of 4 large, medium, and small dots are decoded, the process for determining the pixel positions is faster because pixels of the appropriate sequence numbers can be selected without taking into consideration the large dot or the number of large and medium dots.

When the classification codes and pixel tone values of the pixel group have been determined in the process for producing number data in the second embodiment described above, the encoded number data and the tone error ER occurring in the pixel group can be immediately be determined simply by referencing the number data producing table. The encoded number data can thus be produced in an extremely rapid manner, and the details of the process are extremely simple. Error can also be rapidly eliminated, resulting in better picture quality, by diffusing the tone error ER to surrounding pixel groups and calculating the pixel group tone value DTrp in the surrounding pixel groups by taking the diffused error into consideration.

By viewing pixel groups as clusters, the process for producing number data in the second embodiment can be considered a process for producing multiple values for the pixel group tone values DTrp in the same manner as the number data producing process in the first embodiment. Of course, in the number data producing process of the first embodiment, multiple values may be produced to a gray scale of 9 with 0 to 8 dots for all the pixel groups, whereas in the number data producing process of the second embodiment, the gray scale resulting from the production of multiple values will be different for each pixel group. This is further elaborated below.

Figure 34:
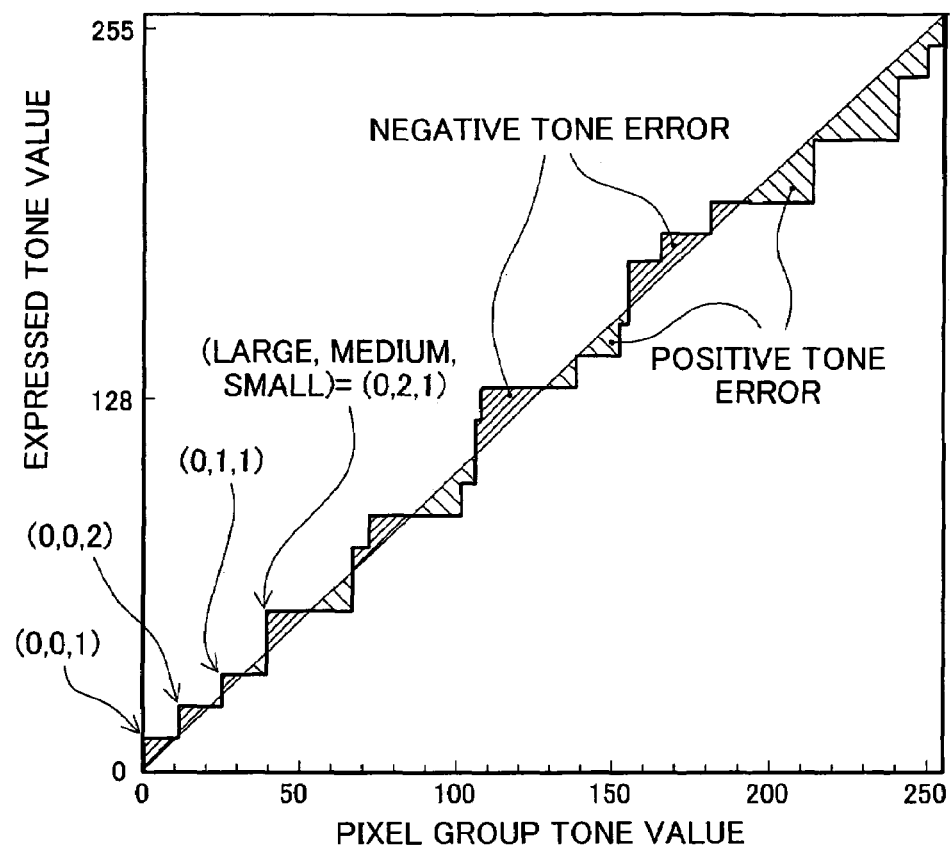
FIG. 34 schematically illustrates the way in which the tone values expressed by the pixel groups and the tone error change as the pixel group tone values increase in the process for producing number data in the second embodiment.

FIG. 34 schematically illustrates the way in which, in the number data producing process in the second embodiment, the number of dots formed in pixel groups changes as the pixel group tone value increases, and the tone values expressed by the pixel groups (expressed tone values) as a result increases in stages. When the classification codes of pixel groups are different, the number of dots formed relative to the pixel group tone value changes, in the same manner in the first embodiment. FIG. 34 shows the changes in the expressed tone value relative to the pixel group tone value in pixel groups with certain randomly selected classification codes.

In the second embodiment, because three types of large, medium, or small dots can be formed in the pixel groups, the combination of numbers of dots changes as the pixel group tone value increases. For example, when the pixel group tone value is 0, no dots are formed in the pixel group. The tone value expressed by the pixel group is thus 0. When the pixel group tone value increases, small dots are eventually formed. In the pixel groups illustrated in FIG. 34, one small dot is formed at the point in time where the pixel group tone value is 1. That is, when the pixel group tone value in that pixel group is 1, 0 large dots, 0 medium dots, and 1 small dot are formed. In the figure, the combinations of the numbers of these dots are represented by (number of large dots, number of medium dots, number of small dots). Thus, (0,0,1) indicates that 1 small dot is formed in the pixel group.

In the pixel groups illustrated in FIG. 34, when the pixel group tone value is 1, a first small dot is immediately formed, but the pixel group tone value in which the small dot begins to form will differ according to the classification code of the pixel group. That is, as described above, because the number of dots formed in the pixel group is determined according to the combination of the pixel group classification code and pixel group tone value, the number of dots that are formed relative to the same pixel group tone value will differ if the classification code is different.

When the first small dot is formed in a pixel group, the tone value expressed by that pixel group increases one small dot worth from a tone value of 0. The increase will vary depending on the size of the small dot, the ink concentration, or the like, but will be set to a predetermined suitable value by the printer specifications. When the expressed tone value increases one small dot worth, tone error will be produced in the pixel group. In the example illustrated in FIG. 34, because a small dot is immediately formed when the pixel group tone value is 1, the expressed tone value is greater than the pixel group tone value, thus resulting in negative ton error (that is, tone error having a negative tone value). In FIG. 34, negative tone error is indicated by fine hatching.

After the formation of the one small dot at a pixel group tone value of 1, no other dots are formed for a time as the pixel group tone value increases. That is, the tone error occurring in the pixel groups gradually increases from a negative tone value as just the pixel group tone value increases and the expressed tone value remains constant. A second small dot is formed when the pixel group tone value increases to 11. That is, the number of dots formed in the pixel group increases from (0,0,1) to (0,0,2). The expressed tone value of the pixel group as a result increases one small dot worth, resulting in tone error on the negative side again.

As the pixel group tone value further increases, one medium dot is formed when the pixel group tone value reaches 26, and one small dot is subtracted. That is, the combination of dots changes from (0,0,2) to (0,0,1). As the tone value expressed by the medium dot is greater than the tone value expressed by the small dot, the medium dot replaces the small dot, so that the expressed tone value of the pixel group increases.

Here, from the standpoint of the increase in the expressed tone value as the pixel group tone value increases, the number of small dots formed can also be increased from 2 to 3, that is, to change the combination of dot numbers from (0,0,2) to (0,0,3), rather than having a medium dot formed instead of a small dot, that is, changing the combination of dot numbers from (0,0,2) to (0,1,1). In the pixel groups illustrated in FIG. 34, however, the number of small dots formed is not increased, but the small dot is replaced by the medium dot, to increase the pixel group tone value expressed by the pixel group. This is based on the establishment of the dot density data conversion table in FIG. 24 and the establishment of the dither matrix thresholds corresponding to the pixel groups. The expressed tone value can also increase when the combination of dot numbers is changed from (0,0,2) to (0,0,3) if the classification code of the pixel group is different.

When the pixel group tone value further increases to 39, the number of medium dots increases by one, and the combination of dot numbers changes from (0,1,1) to (0,2,1). Because the tone values expressed by the medium dots is greater than the tone value expressed by the small dot, the number of medium dots increases by one so that the expressed tone value of the pixel group significantly increases. Of course, increasing the expressed tone value of the pixel groups is not limited to thus changing the combination of dot numbers from (0,1,1) to (0,2,1). The combination can also be changed from (0,1,1) to (0,1,2). In the pixel groups illustrated in FIG. 34, the expressed tone value increases by changing the combination of dot numbers from (0,1,1) to (0,2,1).

In conjunction with the increase in the pixel group tone value in this manner, the way in which the combination of dot numbers changes and the way in which the expressed tone values change as a result are determined by the establishment of the dot density data conversion table in FIG. 24 and the establishment of the dither matrix thresholds corresponding to the pixel groups. The combination of dot numbers can also be changed from (0,1,1) to (0,1,2) if the classification code of the pixel group is different. The expressed tone value of the pixel group will vary depending on whether the combination of dot numbers changes to (0,2,1), (0,1,2), or (0,2,0).

In FIG. 34, the expressed tone value is shown as increasing in linear fashion in conjunction with the increase in the pixel group tone value. However, small dots are primarily formed in ranges where the pixel group tone value is a low value (such as when the image is bright), and larger dots are primarily formed in ranges where the pixel group tone value is greater (such as when the image is dark). Because the tone value expressed by one dot is lower with small dots than with large dots, there tends to be a need to express finer tones in areas of low pixel group tone values where primarily smaller dots are formed than in areas of higher pixel group tone values where primarily larger dots are formed. In other words, the need for expressed tone value resolution tends to be stronger in areas where the pixel group tone value is low rather than in areas where it is greater. In this respect, the expressed tone value may be increased according to a curve that is convex at the bottom rather than increasing the expressed tone value as the pixel group tone value increases. This will allow the expressed tone value resolution to be increased in areas where the pixel group tone value is low.

As described above with reference to FIG. 34, the pixel group tone value, by which the expressed tone values of pixel groups increase in stages, will differ depending on the classification code of the pixel group in the number data producing process of the second embodiment. Even when the pixel group classification code is the same, the range of increase as the expressed tone value increases in stages does not increase constantly.

Figure 35A:
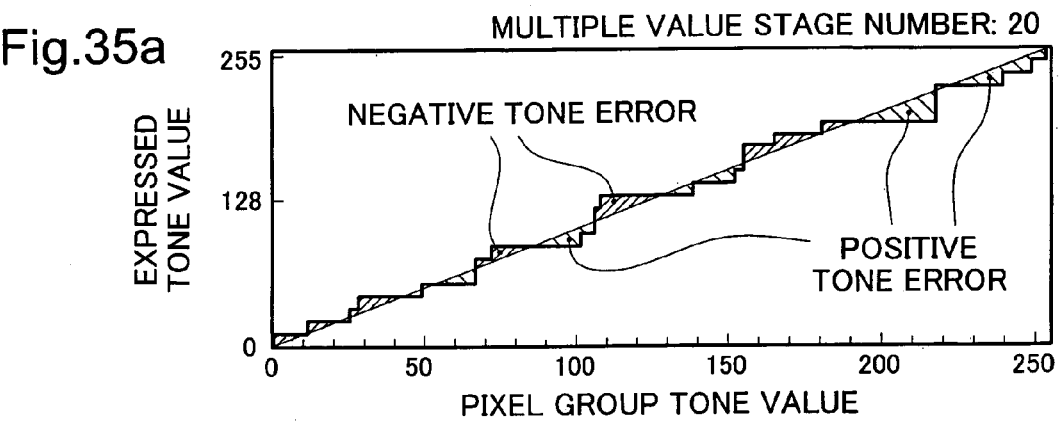
FIGS. 35a through 35c illustrate examples of the way in which tone values expressed by the pixel groups increase as pixel group tone values increase for pixel groups with different classification codes.
Figure 35B:
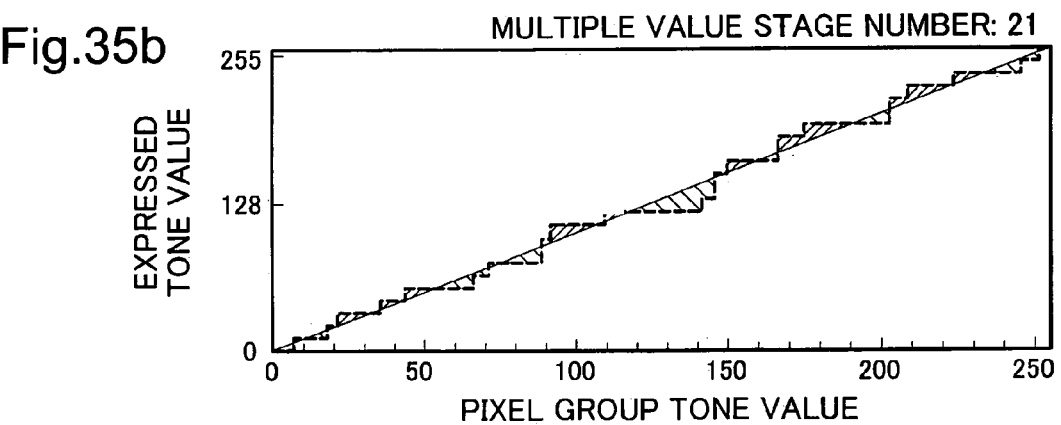
Figure 35C:
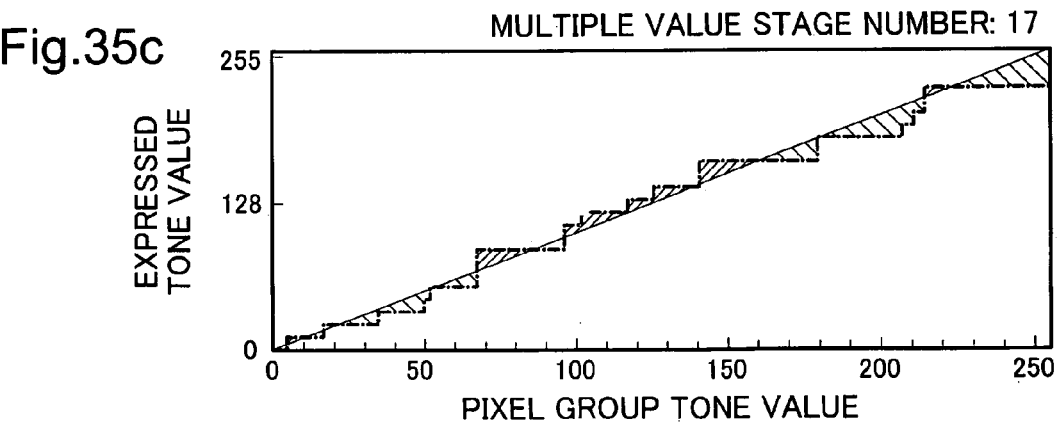

FIGS. 35a through 35c illustrate examples of the way in which tone values expressed by the pixel groups increase as pixel group tone values increase for pixel groups with three different classification codes. As illustrated in FIGS. 35a through 35c, the expressed tone value increases in stages in all pixel groups, but the pixel group tone value by which the expressed tone values increase varies depending on the pixel group. The increase in the expressed tone value is not constant, but changes in a complex manner. In response to this, the pattern in which tone error occurs as a result of the conversion of pixel group tone values to number data is also complex.

Comparison of the three examples in FIGS. 35a through 35c reveals that the number of stages by which the expressed tone values increased are also different for each pixel group. In the pixel groups illustrated in FIG. 35a, for example, the expressed tone value changes in 19 stages from a tone value of 0 to 255. This shows that including a tone value of 0 allows the pixel group tone values to be increased to expressed tone values of 20 tones. The expressed tone values change in 20 stages in the pixel groups in FIG. 35b, and in 16 stages in the pixel groups in FIG. 35c. The pixel group tone values can be increased to 21 and 17 tones, respectively.

In view of the above, the process for producing number data in the second embodiment has the following characteristics, viewed as a type of process for producing multiple values. That is, when the classification codes of the pixel groups are different, different multiple values can be obtained for the same pixel group tone values. In addition, when the pixel group classification codes are different, the number of tones (number of stages by which the expressed tone value increases) when multiple values are created is different. Here, because the same classification codes are not continuously given to pixel groups, as described above, the pattern by which tone error is produced will change in a complex manner when the tone values after the production of multiple values and the tone values during the production of multiple values are different for each classification code. Thus, in the second embodiment as well, it is possible to avoid any adverse effects on picture quality which might result from a constantly repeated pattern in the results of the multiple values.

Although various embodiments were described above, the invention is not limited by any of the above examples, and can be worked in a variety of embodiments without departing from the spirit. For example, images were printed by the formation of dots on printing paper in the above embodiments, but the scope of the invention is not limited to the printing of images. For example, the invention is suitable for applications such as liquid crystal display devices, in which bright spots are dispersed at a suitable density on a liquid crystal display screen to represent images in which the tones continuously change.

What is claimed is:

1. An image processing system for processing images, comprising:
    an image processing device for implementing a certain image process on image data and an image generating device for outputting images by forming dots based on the results of the image process,
    the image processing device comprising:
    pixel group tone value determining unit that determines pixel group tone values representing individual pixel groups, each of pixel groups is composed of a plurality of mutually adjacent pixels;
    number data producing unit that produces number data for each of pixel groups based on a predetermined correspondence between the pixel group tone value and the number data representing the number of dots formed in the pixel group;
    error diffusing unit that diffuses a tone error, which occurs between the pixel group tone value and the tone value represented by the number data, among pixel groups for which number data has been not produced yet; and
    control data output unit that outputs the produced number data as a control data which is used to control the formation of dots by the image generating device which forms images;
    the image generating device comprising:
    pixel position determining unit that specifies an order in which dots are formed for each of pixels in the pixel groups, and determines dot position formed in each of the pixel groups based in the specified order and the number data of the pixel groups extracted from the control data that has been provided; and
    dot forming unit that forms dots based on the determined pixel positions.

2. An image processing system in accordance with claim 1, wherein
    the number data producing unit produces the number data for the pixel groups by referencing a number data producing table in which the number data representing the number of dots formed in the pixel groups is allotted to combinations of classification numbers assigned to the pixel groups and the pixel group tone values of the pixel groups.

3. An image processing system in accordance with claim 1, wherein
    the pixel group tone determining unit determines the pixel group tone values based on tone values of the pixels in each of the pixel groups.

4. An image processing system in accordance with claim 1, wherein
    the pixel group tone determining unit determines each of the pixel group tone values based on the image data of the pixels in the pixel groups and the tone error diffused among the pixel groups.

5. An image processing device for adding a certain image process to image data representing an image, comprising:
    pixel group tone determining unit that assembles certain numbers of mutually adjacent pixels which are handled as pixel groups for a plurality of pixels forming the image, and determining the tone value representing individual pixel group for each of pixel groups;
    number data producing unit that produces number data for each of pixel groups based on a predetermined correspondence between the pixel group tone value and the number data representing the number of dots formed in the pixel group;
    error diffusing unit that diffuses a tone error, which occurs between the pixel group tone value and the tone value represented by the number data, among pixel groups for which number data has been not produced yet; and
    control data output unit that outputs the produced number data as a control data which is used to control the formation of dots by the image generating device which forms images.

6. An image processing device in accordance with claim 5, wherein the number data producing unit produces the number data for the pixel groups by referencing a number data producing table in which the number data representing the number of dots formed in the pixel groups is allotted to combinations of classification numbers assigned to the pixel groups and the pixel group tone values of the pixel groups.

7. An image processing device in accordance with claim 5, wherein
the pixel group tone determining unit determines the pixel group tone values based on tone values of the pixels in each of the pixel groups.

8. An image processing device in accordance with claim 5, wherein
the pixel group tone determining unit determines each of the pixel group tone values based on the image data of the pixels in the pixel groups and the tone error diffused among the pixel groups.

9. An image processing device in accordance with claim 5, further comprising
classification number assigning unit that assigns classification numbers to each of the pixel groups by classifying the pixel groups into a plurality of categories according to the position in the image.

10. An image processing device in accordance with claim 5, wherein
error diffusing unit diffuses a tone error, which occurs between the pixel group tone value and the tone value represented by the number data, among pixel groups for which number data has been not produced yet.

11. An image processing device in accordance with claim 6, wherein
the error diffusing unit obtains pixel group tone errors by referencing a tone error producing table in which tone differences that occur in the pixel groups are allotted to combinations of classification numbers assigned to the pixel groups and the pixel group tone values of the pixel groups, and then diffuses the tone errors among pixel groups for which no number data has been produced.

12. An image processing device in accordance with claim 6, wherein
the number data producing table is a table in which the number data and tone errors are allotted to combinations of classification numbers and pixel group tone values;
the control data outputting unit references the number data producing table so as to produce the tone error in addition to the number data; and
the error diffusing unit obtains the tone error produced along with the number data and diffuses the errors among pixel groups for which number data has been not produced yet.

13. An image processing device in accordance with claim 6, wherein
the number data producing table is a table in which combinations of classification numbers and pixel group tone values are allotted to number data representing the number of data for a plurality of types of dots represented different tone values; and
the number data producing unit references the number data producing table to produce number data representing combinations of dot numbers for various types of dots.

14. An image processing device in accordance with claim 13, wherein
the control data outputting unit outputs the control data encoded according to the combination of dot numbers for the various types of dots.

15. An image processing device in accordance with claim 5, further comprising
quantized error acquiring unit that acquires a quantized error occurring when the pixel group tone value is determined from the image data,
wherein the error diffusing unit diffuses the quantized error and the tone error among pixel groups for which number data has been not produced yet.

16. An image outputting device for forming dots according to image data so as to output images corresponding to the image data, comprising:
pixel group tone value determining unit that determines pixel group tone values representing individual pixel groups, each of pixel groups is composed of a plurality of mutually adjacent pixels;
number data producing unit that produces number data for each of pixel groups based on a predetermined correspondence between the pixel group tone value and the number data representing the number of dots formed in the pixel group;
error diffusing unit that diffuses a tone error, which occurs between the pixel group tone value and the tone value represented by the number data, among pixel groups for which number data has been not produced yet;
pixel position determining unit that specifies an order in which dots are formed for each of pixels in the pixel groups, and determines dot position formed in each of the pixel groups based in the specified order and the number data of the pixel groups; and
dot forming unit that forms dots based on the determined pixel positions.

17. An image outputting device in accordance with claim 16, wherein
the number data producing unit produces the number data for the pixel groups by referencing a number data producing table in which the number data representing the number of dots formed in the pixel groups is allotted to combinations of classification numbers assigned to the pixel groups and the pixel group tone values of the pixel groups.

18. An image outputting method for outputting images by implementing a certain image process on image data and forming dots based on the results, the method comprising:
determining pixel group tone values representing individual pixel groups, each of pixel groups is composed of a plurality of mutually adjacent pixels;
producing number data for each of pixel groups based on a predetermined correspondence between the pixel group tone value and the number data representing the number of dots formed in the pixel group;
diffusing a tone error, which occurs between the pixel group tone value and the tone value represented by the number data, among pixel groups for which number data has been not produced yet;
specifying an order in which dots are formed for each of pixels in the pixel groups, and determining dot position formed in each of the pixel groups based in the specified order and the number data of the pixel groups; and
forming dots based on the determined pixel positions.

19. An image outputting method in accordance with claim 18, wherein
the number data is produced with reference to a number data producing table in which the number data representing the number of dots formed in the pixel groups is allotted to combinations of classification numbers assigned to the pixel groups and the pixel group tone values of the pixel groups.

20. An image processing method for processing image data representing an image to produce control data that is used to control the formation of dots by an image outputting device for forming dots to output images, the method comprising:

determining pixel group tone values representing individual pixel groups, each of pixel groups is composed of a plurality of mutually adjacent pixels;

producing number data for each of pixel groups based on a correspondence between the pixel group tone value and the number data representing the number of dots formed in the pixel group, and then outputting the number data as control data; and diffusing a tone error, which occurs between the pixel group tone value and the tone value represented by the number data, among pixel groups for which number data has been not produced yet.

21. An image processing method in accordance with claim 20, wherein the number data is produced with reference to a number data producing table in which the number data representing the number of dots formed in the pixel groups is allotted to combinations of classification numbers assigned to the pixel groups and the pixel group tone values of the pixel groups.

22. A program product for using a computer to realize a method for outputting images by forming dots based on the results that are obtained when a certain image process is implemented on image data, the product comprising:

recording media and program code recorded on the recording media, the program code comprising:

a first program code for determining pixel group tone values representing individual pixel groups, each of pixel groups is composed of a plurality of mutually adjacent pixels;

a second program code for producing number data for each of pixel groups based on a predetermined correspondence between the pixel group tone value and the number data representing the number of dots formed in the pixel group;

a third program code for diffusing a tone error, which occurs between the pixel group tone value and the tone value represented by the number data, among pixel groups for which number data has been not produced yet;

a fourth program code for specifying an order in which dots are formed for each of pixels in the pixel groups, and determining dot position formed in each of the pixel groups based in the specified order and the number data of the pixel groups; and a fifth program code for forming dots based on the pixel positions that have been determined.

23. A program product in accordance with claim 22, wherein the second program code comprises code for producing the number data for the pixel groups by referencing a number data producing table in which the number data representing the number of dots formed in the pixel groups is allotted to combinations of classification numbers assigned to the pixel groups and the pixel group tone values of the pixel groups.

24. A program product for using a computer to realize a method for adding a certain image process to image data representing an image to produce control data that is used to control the formation of dots by an image outputting device for outputting images by forming dots, the method comprising:

recording media and program code recorded on the recording media, the program code comprising:

a first program code for determining pixel group tone values representing individual pixel groups, each of pixel groups is composed of a plurality of mutually adjacent pixels;

a second program code for producing number data for each of pixel groups based on the correspondence between the pixel group tone value and the number data representing the number of dots formed in the pixel group, and then outputting the number data as control data; and a third program code for diffusing a tone error, which occurs between the pixel group tone value and the tone value represented by the number data, among pixel groups for which number data has been not produced yet.

25. A program in accordance with claim 24, wherein the second program code comprises code for producing the number data for the pixel groups by referencing a number data producing table in which the number data representing the number of dots formed in the pixel groups is allotted to combinations of classification numbers assigned to the pixel groups and the pixel group tone values of the pixel groups.

* * * * *